(12) United States Patent
Lu et al.

(10) Patent No.: US 8,666,560 B2
(45) Date of Patent: *Mar. 4, 2014

(54) POWER CONTROL SYSTEM AND METHOD

(71) Applicant: Advanergy, Inc., Winnetka, CA (US)

(72) Inventors: Jin Lu, Oak Park, CA (US); Todd Scott Kelly, Winnetka, CA (US); Lee Cheung, Thousand Oaks, CA (US)

(73) Assignee: Advanergy, Inc., Winnetka, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,956

(22) Filed: Apr. 29, 2013

(65) Prior Publication Data

US 2013/0245842 A1    Sep. 19, 2013

Related U.S. Application Data

(63) Continuation of application No. 13/644,795, filed on Oct. 4, 2012, now Pat. No. 8,478,450, and a continuation of application No. PCT/US2012/058761, filed on Oct. 4, 2012.

(60) Provisional application No. 61/698,288, filed on Sep. 7, 2012, provisional application No. 61/667,477, filed on Jul. 3, 2012, provisional application No. 61/661,100, filed on Jun. 18, 2012, provisional application No. 61/655,099, filed on Jun. 4, 2012, provisional application No. 61/542,811, filed on Oct. 4, 2011.

(51) Int. Cl.
*G06F 1/28* (2006.01)

(52) U.S. Cl.
USPC ........... 700/295; 700/286; 700/289; 700/296; 726/12; 323/234; 709/223; 709/250; 709/248; 713/300; 713/340; 370/401; 340/870.02; 340/635; 340/286.01; 340/5.92

(58) Field of Classification Search
USPC .......................................... 700/289; 726/12
See application file for complete search history.

(56) References Cited

U.S. PATENT DOCUMENTS 6,301,674 B1 * 10/2001 Saito et al. .................... 713/340
6,993,417 B2 *  1/2006 Osann, Jr. ..................... 700/291

(Continued)

FOREIGN PATENT DOCUMENTS

| KR | 1020080095645 A | 10/2008 |
| WO | 2011087164 A1  |  7/2011 |
| WO | 2011087165 A1  |  7/2011 |

OTHER PUBLICATIONS

Saito et al, "Gateway Technologies for Home Network and Their Implementations", 2001, IEEE, pp. 175-180.*

(Continued)

*Primary Examiner* — Kavita Padmanabhan
*Assistant Examiner* — Olvin Lopez Alvarez
(74) *Attorney, Agent, or Firm* — David W. Carstens; Kevin M. Klughart; Carstens & Cahoon, LLP

(57) ABSTRACT

A power control system/method implementing Internet based access to hybrid home automation networks is disclosed. The system utilizes a smart gateway power controller (SGPC) to selectively switch an AC power source to a load device under control of local or remote network commands that may be routed through a variety of network interfaces and protocols present within home or other structure-local communications network. SGPC configurations may be nested within a home automation network to permit separation of control for load devices within a common home automation environment. Present invention methods may include routing protocols between disparate home automation networks as well as remote access protocols that permit control of disparate home automation networks via the Internet using a wide variety of remote access interfaces including mobile devices, tablet computers, laptops, desktop computers, and the like.

30 Claims, 47 Drawing Sheets

(56) References Cited

U.S. PATENT DOCUMENTS

| | | | | |
|---|---|---|---|---|
| 7,333,000 | B2* | 2/2008 | Vassallo | 340/5.92 |
| 7,460,930 | B1* | 12/2008 | Howell et al. | 700/295 |
| 8,086,757 | B2* | 12/2011 | Chang | 709/246 |
| 8,443,071 | B2* | 5/2013 | Lu et al. | 709/223 |
| 8,478,450 | B2* | 7/2013 | Lu et al. | 700/289 |
| 2002/0130652 | A1 | 9/2002 | Bessler | |
| 2004/0015242 | A1* | 1/2004 | Brown et al. | 700/12 |
| 2005/0057223 | A1 | 3/2005 | Harada | |
| 2005/0097162 | A1* | 5/2005 | Budike, Jr. | 709/201 |
| 2006/0052905 | A1 | 3/2006 | Pfingsten et al. | |
| 2006/0154642 | A1* | 7/2006 | Scannell, Jr. | 455/404.1 |
| 2006/0230298 | A1 | 10/2006 | Bohlinger et al. | |
| 2006/0259184 | A1 | 11/2006 | Hayes et al. | |
| 2007/0112939 | A1 | 5/2007 | Wilson et al. | |
| 2008/0143489 | A1* | 6/2008 | Castaldo et al. | 340/286.01 |
| 2008/0255692 | A1 | 10/2008 | Hofrichter et al. | |
| 2008/0288618 | A1 | 11/2008 | Vardi et al. | |
| 2009/0147696 | A1 | 6/2009 | Park et al. | |
| 2009/0224603 | A1 | 9/2009 | Perper et al. | |
| 2010/0070217 | A1 | 3/2010 | Shimada | |
| 2010/0138092 | A1 | 6/2010 | Kohn | |
| 2010/0145542 | A1* | 6/2010 | Chapel et al. | 700/295 |
| 2010/0188046 | A1 | 7/2010 | Liu et al. | |
| 2010/0238003 | A1 | 9/2010 | Chan et al. | |
| 2010/0305773 | A1 | 12/2010 | Cohen | |
| 2010/0332164 | A1 | 12/2010 | Aisa et al. | |
| 2011/0106279 | A1 | 5/2011 | Cho et al. | |
| 2011/0202293 | A1 | 8/2011 | Kobraei et al. | |
| 2011/0320636 | A1* | 12/2011 | Young et al. | 709/249 |
| 2012/0223840 | A1* | 9/2012 | Guymon et al. | 340/870.02 |
| 2013/0083805 | A1* | 4/2013 | Lu et al. | 370/401 |

OTHER PUBLICATIONS

Misra et al, "4G All IP Integration Architecture for Next Generation Wireless Internet", 2005, pp. 7.*
Lien et al "Remote-Controllable Power Outlet System for Home Power Management", Nov. 2007, IEEE, pp. 1634-1641.*
Kang, "Auxiliary Power Supply Device of Home Applicances using Smart Grid (machine Translation)", Jul. 21, 2011, pp. 35.*
Harmony gateway, "Harmony Gateway—mullti-protocol HAN Gateway/Controller", wayback machine Jul. 29, 2010, pp. 2.*
Belimpasakis Petros, Remote Access to Home Services Utilizing Dynamic DNS and Web Technologies, Master of Science Thesis, Jul. 6, 2006, pp. 102.*
Parkka et al, "AWirelessWellnessMonitor for PersonalWeightManagement", 2000, pp. 6.*
Kim et al, "Design and Implementation of a Ubiquitous ECG Monitoring System Using SIP and the Zigbee Network", 2007, pp. 6.*
(Author Unknown); "Battery Life (and Death)"; Electropaedia; At least as early as Oct. 4, 2011; http://www.mpoweruk.com/life.htm; 8 pp.
(Author Unknown); "Charging Lithium-ion"; Battery University, At least as early as Nov. 10, 2010; http://batteryuniversity.com/index.php/learn/article/charging_lithium_ion_batteries; 32 pp.
(Author Unknown); "Battery Management System(BMS)"; Electropeadia; At least as early as Oct. 4, 2011; http://www.mpoweruk.com/bms.hlm#smartbats (smart battery); 8 pp.
(Author Unknown); "How to Prolong Lithium-based Batteries"; Battery University; At least as early as Oct. 21, 2010; http://batteryuniversity.com/learn/article/how_to_prolong_lithium_based_batteries; 34 pp.
Tarandeep Singh; "Secrets for Prolonging Lithium-based Battery Life"; Geeknizer; May 12, 2009; http://geeknizer.com/secrets-for-prolonging-lithium-based-batteries/#ixzz1Zju0wY6H; 4 pp.
(Author Unknown); "How to Enable/Disable Battery Care Function on Sony Vaio to Improve Battery Life"; Digital Pbk (Forum); At least as early as Aug. 12, 2011; http://digitalpbk.com/hardware/sony-vaio-enable-battery-care-function-improve-battery-life; 4 pp.
(Author Unknown); "Wi-Fi Light Control"; Wi-Fi Planet (Forum); Jan. 31, 2009; http://forums.wi-fiplanet.com/showthread.php?!=9954; 5 pp.
(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.
(Author Unknown); "Simplest Possible WiFi Remote Power Switch"; AVS (Forum); Sep. 15, 2011; http://www.avsforum.com/avs-vb/showthread.php?p=2977417; 5 pp.
(Author Unknown); "A Wi-Fi Controlled Power Outlet From iPhone?"; Yahoo Answers; Apr. 1, 2011; http://answers.yahoo.com/question/index?qid=20110401143408AAPQerm; 2 pp.
(Author Unknown); "Control Home Lights Via internet With Your Computer or Wi-Fi Handheld Devices"; Squidoo; At least as early as Apr. 5, 2012; http://www.squidoo.com/control-home-lights-via-internet; 7 pp.
Harmony Gateway—Multi-Protocol HAN Gateway/Controller—Model #5010M; SimpleHomeNet; At least as early as Oct. 3, 2012; http://www.simplehomenet.com/proddetail.asp?prod=HarmonyGateway; 1 p.

* cited by examiner

POWER CONTROL SYSTEM AND METHOD

CROSS REFERENCE TO RELATED APPLICATIONS

Continuation Patent Applications

This patent application is a Continuation Patent Application and incorporates by reference United States Patent Application for POWER CONTROL SYSTEM AND METHOD by inventors Jin (nmn) Lu, Todd Scott Kelly, and Lee (nmn) Cheung, filed electronically with the USPTO on Oct. 4, 2012, with Ser. No. 13/644,795, EFS ID 13909359, confirmation number 6416.

This patent application is a Continuation Patent Application and incorporates by reference Patent Cooperation Treaty Patent Application for POWER CONTROL SYSTEM AND METHOD by inventors Jin (nmn) Lu, Todd Scott Kelly, and Lee (nmn) Cheung, filed electronically with the USPTO Receiving Office on Oct. 4, 2012, with serial number PCT/US2012/058761, EFS ID 13913022, confirmation number 4896.

Provisional Patent Applications

This application claims benefit under 35 U.S.C. §119 and incorporates by reference United States Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288, EFS ID 13690005, confirmation number 5053.

This application claims benefit under 35 U.S.C. §119 and incorporates by reference United States Provisional Patent Application for NETWORK. INTEGRATION SYSTEM AND METHOD by inventors Jin (nmn) Lu and Todd Scott Kelly, filed electronically with the USPTO on Jul. 3, 2012, with Ser. No. 61/667,477, EFS ID 13167002, confirmation number 7946. This document will be referred to herein as "Document NISM."

This application claims benefit under 35 U.S.C. §119 and incorporates by reference United States Provisional Patent Application for POWER. CONTROL SYSTEM AND METHOD by inventors Jin (nmh.) Lu, Todd Scott Kelly, and Lee (nmn) Cheung, filed electronically with the USPTO on Jun. 18, 2012, with Ser. No. 61/661,100, EFS ID 13041617, confirmation number 2491. This document will be referred to herein as "Document PCSM."

This application claims benefit under 35 U.S.C. §119 and incorporates by reference United States Provisional Patent Application for BATTERY MANAGEMENT SYSTEM AND METHOD by Jin (1=) Lu, Todd Scott Kelly, and Lee (nmn) Cheung, filed electronically with the USPTO on Jun. 4, 2012, with Ser. No. 61/655,099, EFS ID 12925066, confirmation number 3071.

This application claims benefit under 35 U.S.C. §119 and incorporates by reference United States Provisional Patent Application for SMART BATTERY CONTOLLER by Jin (nmh.) Lu, filed electronically with the USPTO on Oct. 4, 2011, with Ser. No. 61/542,811, EFS ID 11104133, confirmation number 3411.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods that control or switch power to a variety of electrical devices. Specifically, the present invention in many preferred embodiments has application home/commercial power control automation systems in which electrical power to appliances and other electrical loads is controlled via commands received from a local or remote computer network.

In many preferred embodiments the present invention allows electrical loads to be controlled locally or remotely via an Internet-capable device (e.g. a smartphone, a tablet, or laptop) and provides a non-intrusive, secure, and blended load control interface that is compatible with home and commercial computer networks.

PRIOR ART AND BACKGROUND OF THE INVENTION

Background

There is a high demand in home automation/home energy control market for an easy to use home automation device—a wirelessly and remotely controlled AC power switch that can turn on and off AC power supply to consumer electronic devices and measure the energy consumption of the consumer electric loads. This demand is obvious in numerous consumer forums and is widely discussed in the prior art.

Such a home automation device can be configured to automatically turn on and off a consumer device at a chosen time and on certain conditions. In addition, the device measures the energy consumption and uses that information for energy usage planning and "smart" switching of the electronic device. This improves the quality of life as well as reducing energy consumption.

A home automation device that can remotely switch on and off AC power switch is not new. The prior art teaches power line based. AC switches by which the control command is send over the power line and wireless AC switches where the control command is sent over a wireless link. These home automation devices can be categorized into two groups:

Non-internet based home automation devices. A remote controller is required to send the control command to the devices over a communication protocol not compatible with Internet. Consumers cannot control them from anywhere. Examples are ZIGBEE® and Z-wave based devices.

Internet based home automation devices. These devices can be accessed with Internet capable equipment, such as a smartphone or a laptop. Existing Internet based home automation devices, however, suffer the following drawbacks:

Consumers cannot easily access the devices both at home and away from home.

Consumers have to log on to a service provider's website while away from home, and from there read the data and control the automation device. Consumers cannot communicate with the device directly. This presents some security issues as well as performance issues.

This type of device is usually intrusive to existing home network as consumers either need to get a new home gateway to work with the automation device or acid a new router or hub to the home network to "relay" the signals.

Home Automation Networking

Most homes today have the last mile communication connection (e.g., a cable link, a fiber optic or a telephone line). Inside a home they is a gateway device that terminates the last mile network and routes the signal between the consumer devices at home and the network outside home. The communication of the gateway with the home devices can be wireline or wireless. Wireline communication includes power line, cable, and Ethernet. But predominantly, the communication trend is wireless based on WiFi. The communication of the home gateway with home devices forms home network. In this document, it will be assumed that the home gateway is a WiFi AP and that the home network is a WiFi home network.

Existing home energy management system or a home automation system is a system that has a two-way communication with service provider (e.g., a utility company or a security company) which monitors the home power consumption and exerts control such as switching on and off a device.

The challenges these systems encounter in the home deployment are:

Service Provider Centric vs. Consumer Centric—The service providers have the control, with consumers permission, over when and what data to collect and when and what device to control. This is a service provider centric approach. There are privacy issues and the issues of consumer's ability to access the data. For example, when a consumer is at home, must he/she login to a service provider's site to look at data and exercise control or can he/she easily access the information and exercise control directly from/to the automation devices at the home, from a laptop or a smartphone. Deployed automation and energy management systems of today require the consumer to remotely login to a service provider site for information and provides no method for easy and direct access to or control over the device.

Network Issues—When an automation device is deployed at home, it either has to work with existing home residential gateway (the AP) or replace the existing home gateway with a new home gateway that knows how to communicate with the automation device. With ZIG-BEE® as part of the many automation/energy management system, it is frequently the case that a new home gateway must be used in place of the existing one. This "intrusive" setup that often requires professional setup forces consumers to make changes in their home network setup. In addition, once the energy management network is deployed at a home, it is not easy to deploy additional energy management devices from other vendors.

Performance—As mentioned above, many existing home energy systems do not allow consumers to access or control them. DIRECTLY via a smartphone or a tablet, even if the user is proximal to the energy system. Instead the consumer must either have to use a dedicated device like a remote control or have to go to a service provider's website to exercise control. It involves sending signals to the home gateway, to an Internet server, and back to the home gateway and back to the consumer's automation device. As a result, it introduces delays, sometimes significant delays, depending on the overall network traffic.

Deficiencies in the Prior Art

The prior art as detailed above suffers from the following deficiencies:

Prior art power control systems generally do not permit integration of disparate types of home automation networks.

Prior art power control systems generally do not interface well with the Internet and rely on proprietary interface protocols operating within a locally defined network interface to affect power control functions.

Prior art power control systems generally do not permit "nesting" or "subnetting" of control networks to define hierarchical control domains that can be accessed remotely via the Internet or some of network interface.

While some of the prior art may teach some solutions to several of these problems, the core issue of integrating disparate home automation networks with Internet based communication control systems has not been solved, by the prior art.

OBJECTIVES OF THE INVENTION

Accordingly, the objectives of the present invention are (among others) to circumvent the deficiencies in the prior art and affect the following objectives in the context of a Smart Gateway Power Controller (SGPC):

(1) Provide for a power control system and method that permits consumers to directly communicate with the SGPC locally or remotely.

(2) Provide for a power control system and method that permits seamless integration with existing home network with no change or addition to the home network being necessary.

(3) Provide for a power control system and method that permits the SGPC to be configured to have its own subnet that is separate from existing home network, with the subnet communicating with the existing home network through the SGPC. The advantage of this "separation" is that the SGPC subnet can be insulated from the dynamic nature of home network. The SGPC can have its own static IP address so that a laptop can easily access it.

(4) Provide for a power control system and method that permits hosting an AC power switch that consumers can access from anywhere to see its status and turn it on and off.

(5) Provide for a power control system and method that permits a SGPC to contain an energy consumption measurement unit that consumers can access from anywhere.

(6) Provide for a power control system and method that permits a consumer to access a SGPC to configure the time and condition based on whether the switch is turned on or off.

(7) Provide for a power control system and method that permits a SGPC to send (push) messages to their devices (e.g., a smartphone, tablet computer, etc.). These messages contain any information from switch status to power consumption data.

While these objectives should not be understood to limit the teachings of the present invention, in general these objectives are achieved in art or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0100)

The present invention in various embodiments addresses one or more of the above objectives in the following manner. The present invention as generally depicted in FIG. 1 (0100) implements a Smart Gateway Power Controller (SGPC) (0110) that acts as a bridge between a power source (0101) and associated power source cabling (0102) and power load cabling (0103) to supply power to one or more electrical loads (0104). The SGPC (0110) incorporates a power switch (0111) and power/energy meter (0112) that are interfaced to a microcontroller unit (MCU) (0113) or other computing device operating under control of software read from a computer readable medium (0114). The MCU (0113) interfaces with one or more WiFi wireless network interface modules (0115, 0116) which communicate to one or more computer networks that may include the Internet, local computer networks, and/or other networks such as ZIGBEE®, etc.

System Application Context (0200)

A typical application context for the present invention is generally illustrated in FIG. 2 (0200), wherein a user (0201) interfaces with a graphical user interface (GUI) (0210) that may be embodied on any number of devices including but not limited to a mobile phone (0211), laptop/desktop computer (0212), and/or tablet computer (0213). This GUI typically operates under control of software read from a computer readable medium (0202) that incorporates network protocols that communicate over computer network (0203) (such as the Internet) to a local wireless router (0204). This wireless router (0204) then communicates with one or more SGPC devices (0221, 0222, 0223) to control power switching no any number of load devices (0231, 0232, 0233, 0234) using any number of SGPC associated power receptacles.

Method Overview

The present invention, system may be utilized in the context of an overall power control method, wherein the power control system described previously is controlled by a method having the following steps:

(1) sending a periodic message from the SGPC to proxy server containing the SGPC ID, password, router IP ADR, port, and subnet vector/path;
(2) storing the SGPC periodic message with a proxy server in an SGPC ID translation database;
(3) requesting a SGPC ID translation by the proxy server from a user interface;
(4) validating the SGPC ID and password provided by the user interface using the proxy server;
(5) determining if the SGPC ID and password are valid, and if not, proceeding to step (7);
(6) returning the router IP ADR, port, and subnet vector/path for the SGPC to the requesting user interface and proceeding to step (8);
(7) returning an error code and ignoring the SGPC translation request; and
(8) terminating the method.

Integration of this and other preferred exemplary embodiment methods in conjunction with a variety of preferred exemplary embodiment systems described herein is anticipated by the overall scope of the present invention.

Alternate Method Overview

The present invention system may be utilized in the context of an overall, alternate power control method, wherein the power control system described previously is controlled by a method having the following steps (1) registering a communication device with the SGPC using an e-mail address, phone number, or other device identifier;
(2) notifying the communication device via the SGPC of any change in the SGPC IP address, port number, subnet vector by periodically sending update messages to the communication device;
(3) retrieve the latest IP address/port for the SGPC from the received SGPC update messages and retain the latest IP address port for use in communicating with the SGPC; and
(4) terminating the method.

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
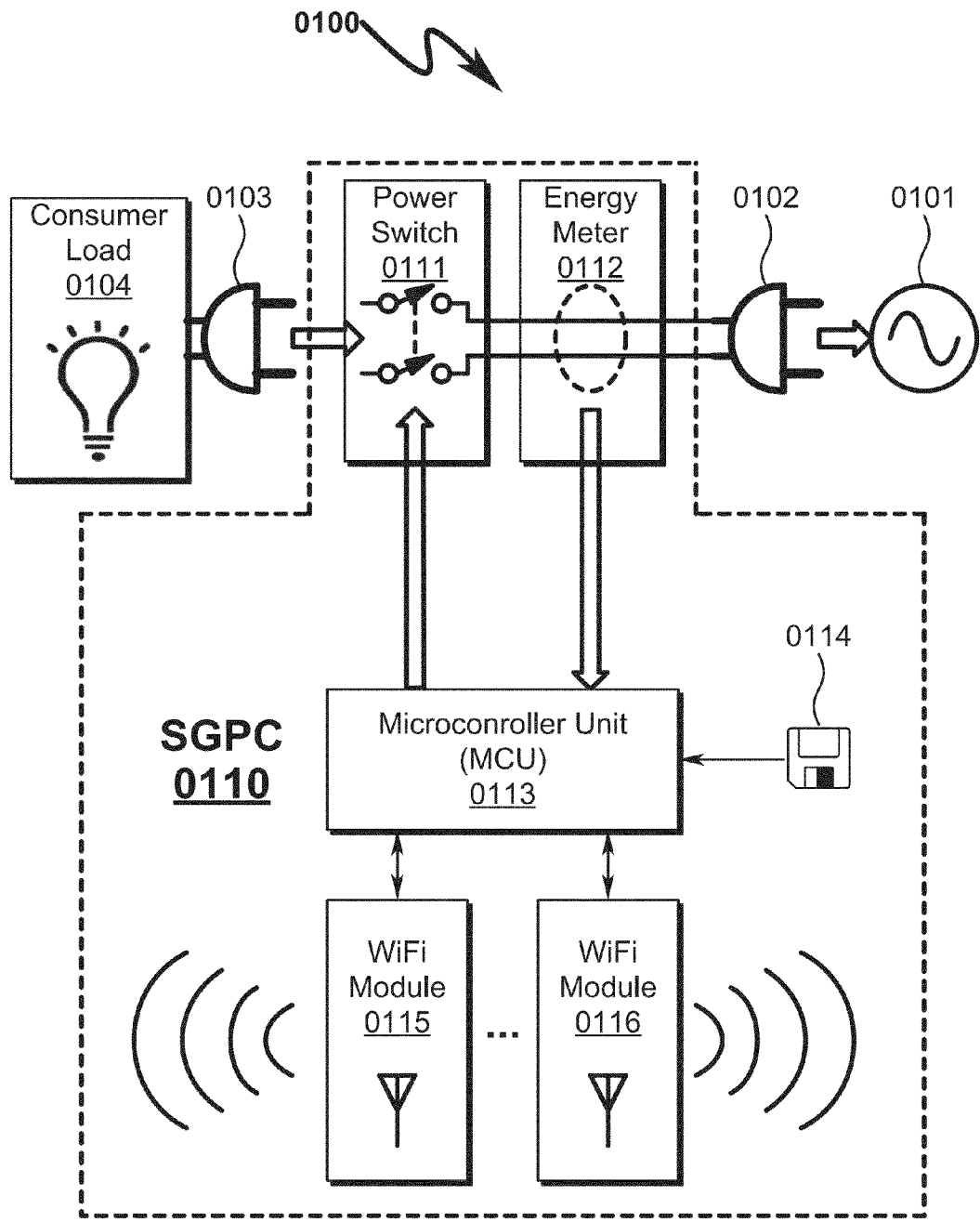
FIG. 1 illustrates a system block overview diagram describing a presently preferred embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to is the presently preferred embodiment, wherein, these innovative teachings are advantageously applied to the particular problems of a. POWER CONTROL SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Automation not Limiting

The terms automation, energy control, and energy management are used interchangeably within the context of the present invention.

Computing Device not Limitive

The present invention may make use of a wide variety of computing devices in its general theme of construction. While microcontroller unit (MCU) construction may be optimal in many circumstances, the present invention is not limited to this particular form of construction and the term "computing device" and "MCU" should be given their broadest possible definitions in this context.

Portable Computing Device not Limitive

The present invention anticipates a wide variety of applications for the power control system/method taught herein. Within the application context, the term "portable computing device" and its variants should be given its broadest possible interpretation, to include but not bet limited to laptop computers, cellphones, tablet computers, and other like and typical applications where computing devices are configured in a portable or semi-portable manner. While the present invention anticipates that the computational capability of the "computing device" described herein may vary widely, it is anticipated that some aspects of the present invention may be implemented using software embodied in computer readable program code means embodied on a tangible medium that is computer readable.

Invention Nomenclature

The following nomenclature is generally utilized to describe the invention herein:

Home Area Network (HAN) or Home Network—A residential or commercial local area network (LAN) for communication between digital devices typically deployed in the home, usually desktop computers and accessories, such as printers and mobile computing devices.

Home Gateway—A home networking device, used as gateway (router) to connect devices in the home to the Internet.

Subnetwork or Subnet—A logically visible subdivision of an IP network. The practice of dividing a single network into two or more networks is called subnetting and the networks created are called subnetworks or subnets.

Sub-Gateway—A gateway which itself is a device in the main HAN, but is a gateway to a subnet separate from the main HAN.

WiFi—A popular technology that allows an electronic device to exchange data wirelessly (using radio waves) over computer network, including high-speed Internet connections.

WiFi Access Point or AP—A device that allows WiFi stations (clients) to connect to each other, the AP and a wired network. An AP usually connects to a router (via a wired network), and can relay data between the wireless devices (such as computers or printers) and wired devices on the network.

WiFi Station or STA—A device that has the capability to use the 802.11 protocol. For example, a station may be a laptop, a desktop PC, PDA, WiFi phone. A STA may be fixed, mobile or portable. The terms station, wireless client, and node are often used interchangeably, and no strict distinction exists between these terms.

ZIGBEE®—A specification for a suite of high level communication protocols using small, low-power digital radios based on an IEEE 802 standard for personal area networks.

Home Automation—Automation of the home, housework or household activity. Home automation may include centralized, control of lighting, HVAC (heating, ventilation and air conditioning), appliances, and other systems, to convenience, provide improved convenience, comfort, energy efficiency, and security.

Home Energy Management System—An extension of EMS into home, where a smart thermostat, a smart meter and a few load control switches are installed and can be remotely accessed (read) and controlled.

IP Address—A numerical label (e.g., 10.10.100.254) assigned to each device (e.g., computer, printer) participating in a computer network that uses the Internet. Protocol for communication.

Port—Associated with an IP address of the host, identifying an application or a server on the host.

Port Number—A 16-bit number identifying a port. A networking application is uniquely identified by the pair of IP address and port number.

Public IP address—An IP address that can be globally pinged or routed from Internet.

Private IP address—An IP address of a device associated with a private network (e.g., a home network).

Firewall—A technological barrier, usually residing at a home gateway, designed to prevent unauthorized or unwanted communications between computer networks or hosts.

Network Address Translation (NAT)—The process of modifying IP address information in IP packet headers while in transit across a traffic routing device. A home gateway usually employs this mechanism to route data between public Internet and private home network.

Smart Gateway Power Controller (SGPC) System Overview

The Smart Gateway Power Controller (SGPC) forms the basis of much of the functionality in the present invention and addresses the deficiencies associated with the prior art home automation systems. FIG. 1 (0100) generally illustrates the functional blocks of a typical SGPC, with one or more functional blocks being physically implemented as one component. It generally comprises a small form-factor device directly plugged into a power outlet. It contains one or more power sockets, into which consumers plug in power suppliers to their home appliances. One or more independent relay switches controlled by the MCU are connected to the socket (s). The switch (s) can be turned on and off by the MCU. A typical SGPC can measure the energy consumption of the plugged in appliances in terms of instant power consumption (watt), energy consumption (watt-hour), voltage and current. A typical SGPC is a cost-effective 3-in-1 home automation device: network gateway+load control switch+ energy measurement. The small form factor of this device has the size of a regular power adaptor. On the networking side, it comprises two-way communication with the Internet and 2-way DIRECT communication with a WiFi devices (PC, laptop, smartphone) at home.

A SGPC may optionally contain an alternative wireless module to communicate with an existing home automation device, to provide the latter the capability to be accessed from Internet. An existing automation device can be a ZIGBEE® or Z-wave based device.

Figure 2:
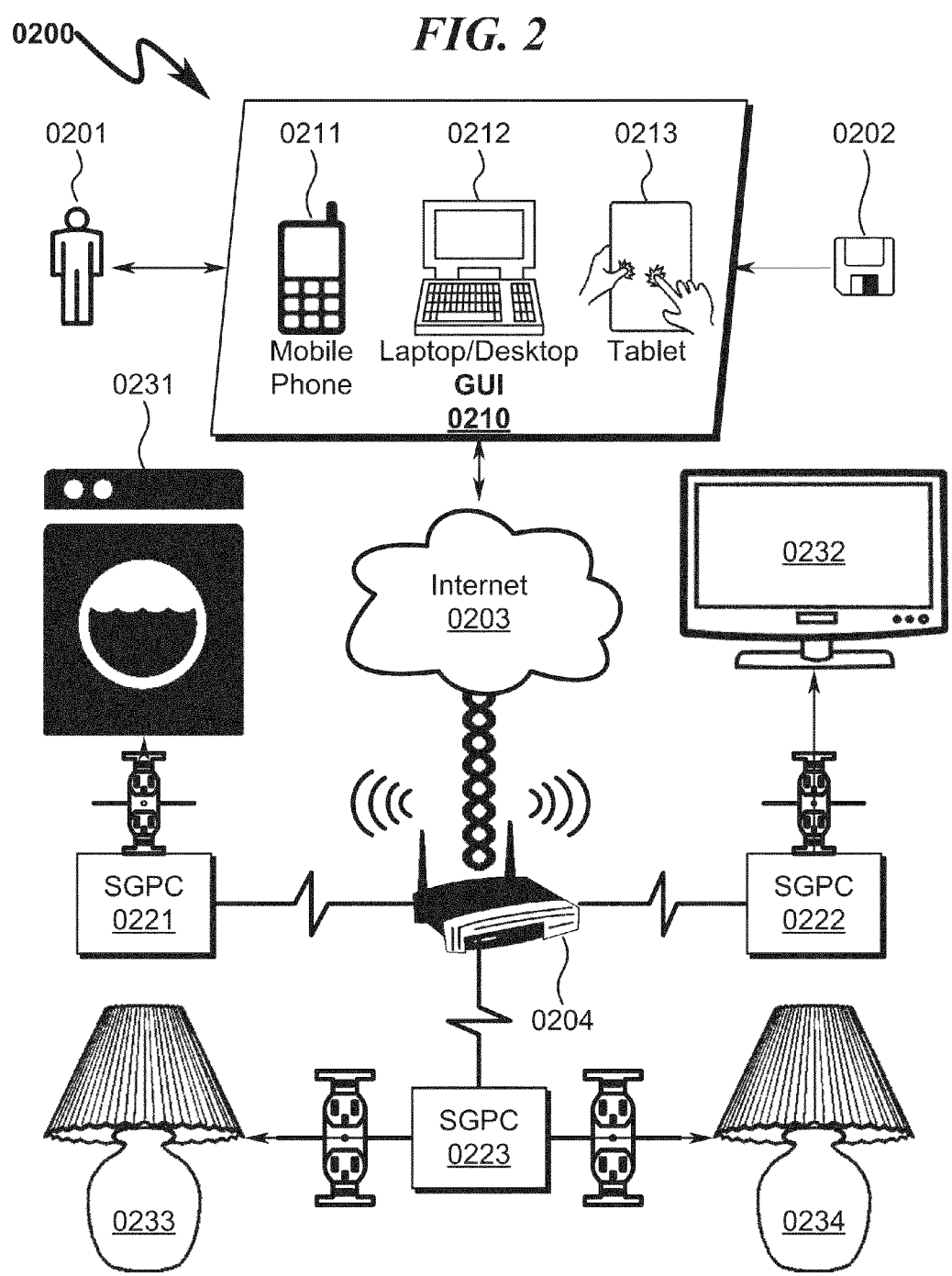
FIG. 2 illustrates a exemplary communications network diagram describing a presently preferred system embodiment of the present invention.

FIG. 2 (0200) generally illustrates the usage of the SGPC device. The following describes a typical use case scenario:

User opens a web page of a SGPC from anywhere at home or outside with her smartphone by typing a URL address along with some security information (e.g., password, etc.).

The web page shows switch status, energy consumption of the connected consumer device (s) at home.

User clicks a button to turn on or off a switch instantly or choose a schedule—time based or event based—to turn on or off the switch at a later point.

User then registers his email address in the web page for the SGPC to forward any events or message to their email account (e.g., switch status change, energy consumption above a threshold, etc.).

Use also downloads a (platform independent) software program or data to their smartphone that would provide additional functionality, for example, to view a histogram of her energy consumption in a more detailed fashion on their smartphone.

This system can be better described, in terms of the networking architecture, functionality provided by the SGPC, and interaction between users and a typical SGPC configuration. This information is provided in more detail below.

Networking Architecture

Network Structure

Subnet and Sub-Gateway (0300, 0400, 0500, 0600, 0700)

Figure 3:
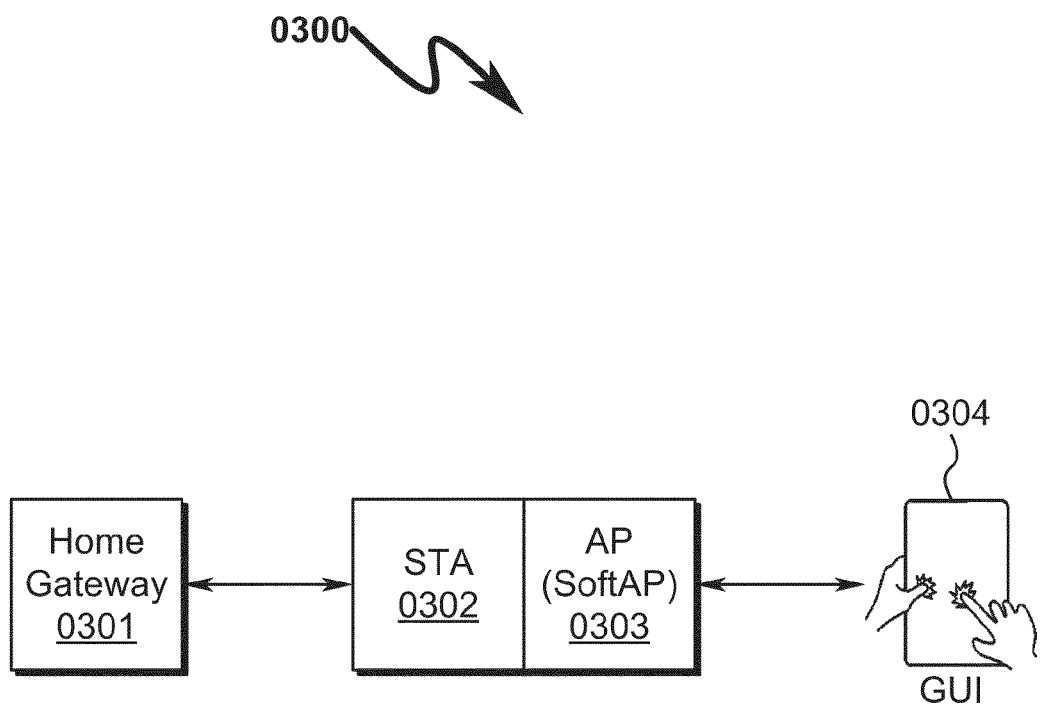
FIG. 3 illustrates a system block diagram describing how a SGPC plays two roles (AP and STA) in some present invention embodiments.

A SGPC works with home residential gateway as a client (station), and use the residential gateway to communicate with the Internet cloud. On the other side, it serves as a secondary or sub-gateway to a subnet that consists of a set of WiFi based client devices it has control over, as well as any consumer devices that can communicate with it. If the SGPC has the wireless interface no communicate with ZIGBEE® devices, it can also control and read data from the latter. FIG. 3 (0300) illustrates the two roles a SGPC plays.

Figure 4:
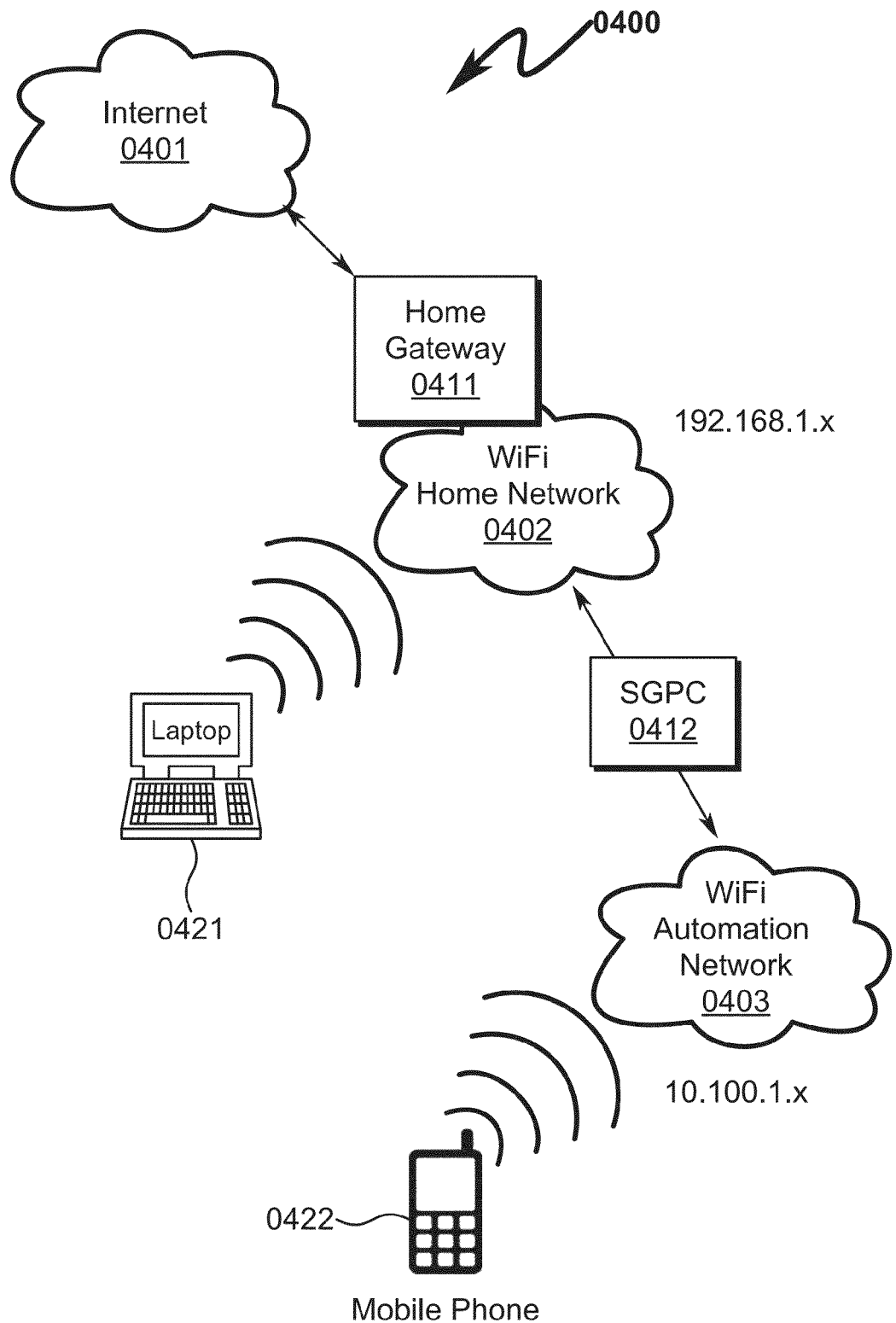
FIG. 4 illustrates a network diagram describing typical WiFi home automation. Subnet.

In other words, SGPC is a sub-gateway that "separates" the home automation network from the existing home network, while having the two networks communicating with each other. The home automation network has different subnet address than that of the home network. FIG. 4 (0400) illustrates a typical configuration setup.

A SGPC can communicate with WiFi and ZIGBEE® based sensors, and the sensor data can be used to schedule turning on and off the switch, as well as reported to consumers can communicate with any devices (WiFi based, ZIGBEE® based, another SGPC) devices to coordinate the control actions.

Figure 5:
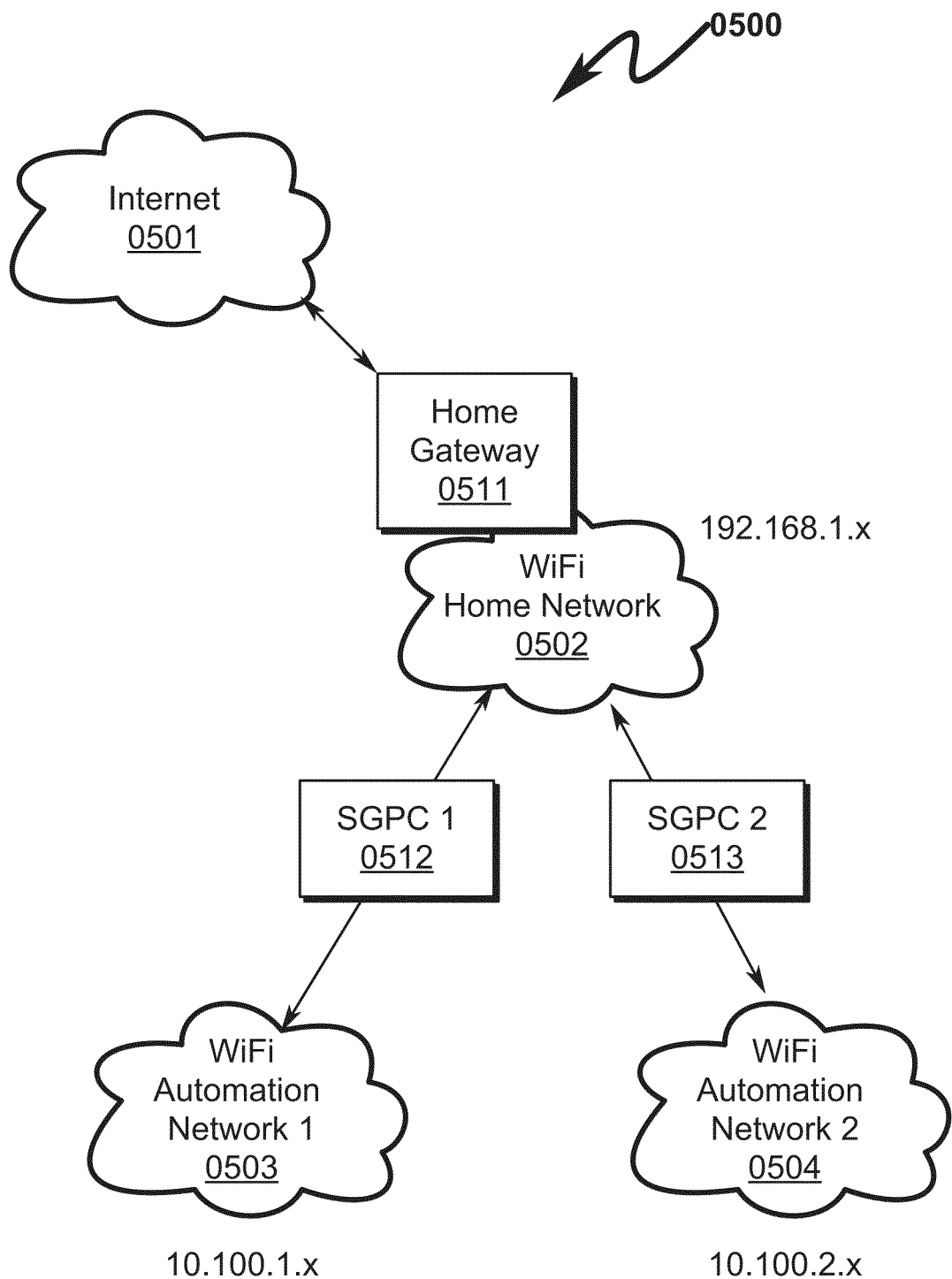
FIG. 5 illustrates an exemplary network diagram describing two SGPCs and their subnets that are both connected to a home gateway.
Figure 6:
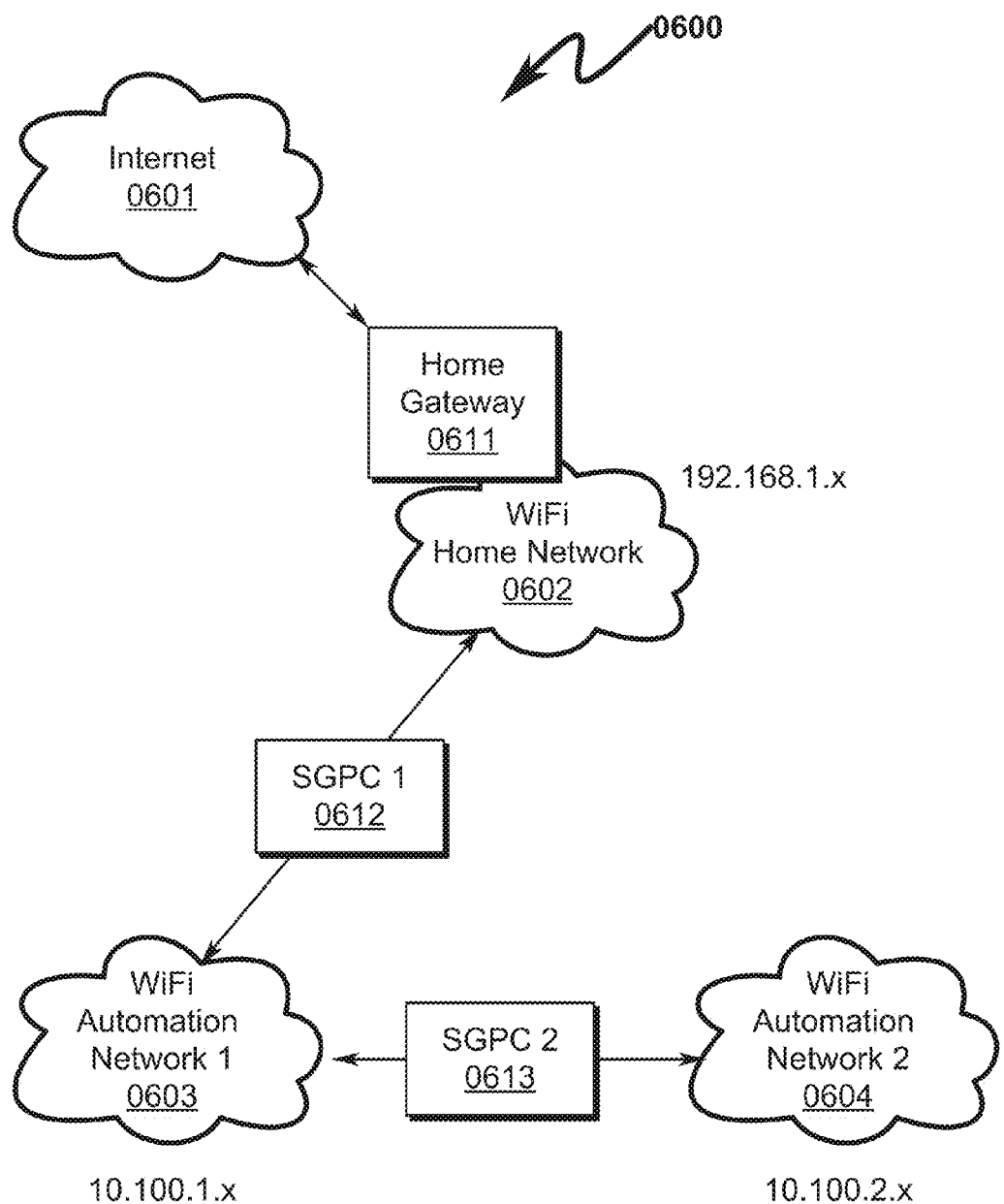
FIG. 6 illustrates an exemplary network diagram describing two SGPCs and their subnets that are both connected to each other (subnet "gatewayed" by an earlier deployed SGPC)

FIG. 5 (0500) and FIG. 6 (0600) illustrate examples of multiple SGPC devices with different network topologies. These SGPC have their own subnet and can talk to each other as in an IP mesh network.

Figure 7:
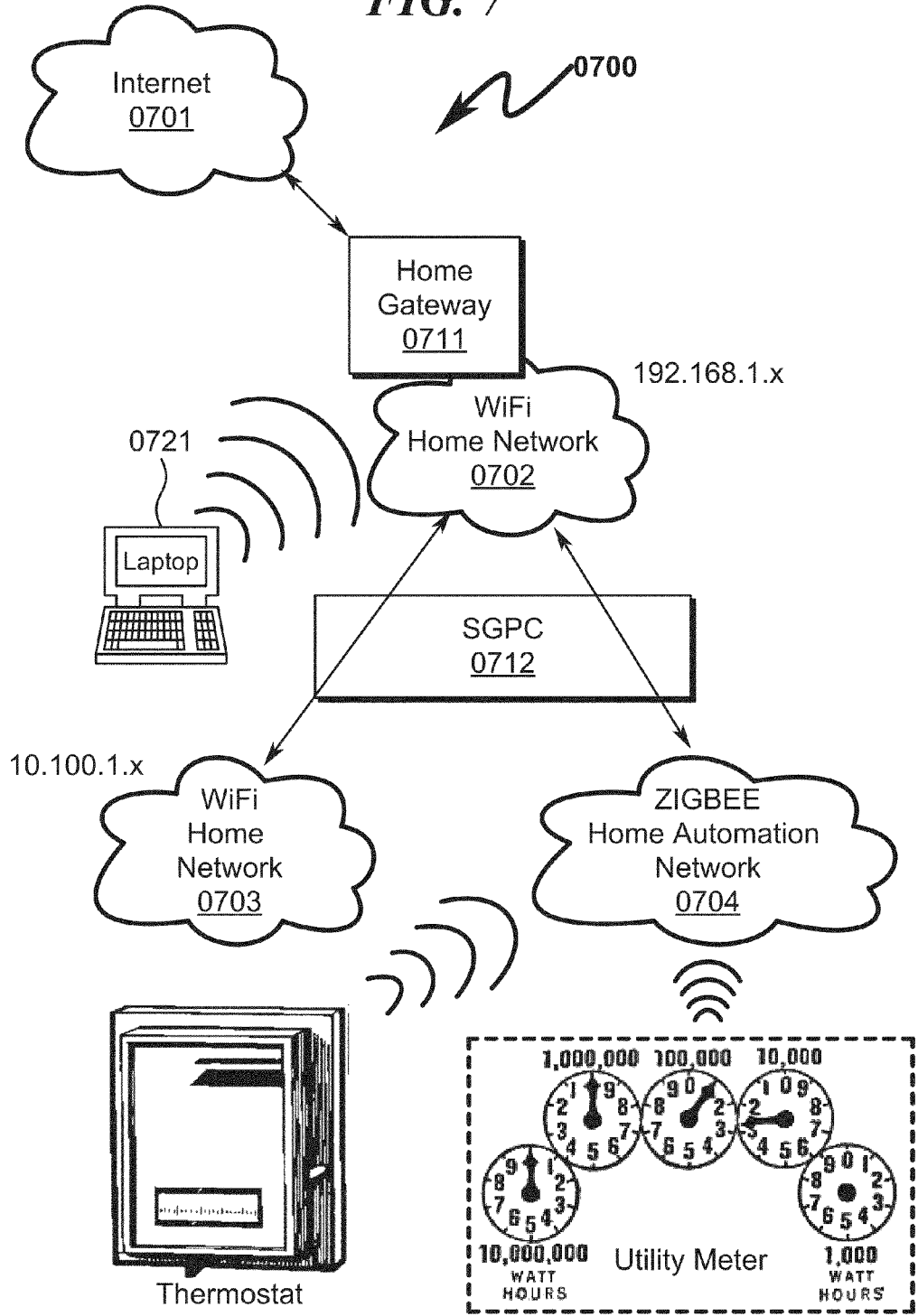
FIG. 7 illustrates an exemplary network diagram wherein a SGPC communicates with a ZIGBEE® network.

FIG. 7 (0700) shows a case where SGPC can communicate with ZIGBEE® network. As an example of multiple SGPC communicating with each other, when a TV is turned, on with one SGPC, the light, controlled by another SGPC may be turned off.

Another example is that when a ZIGBEE® based temperature sensor reads a data above a threshold (set by consumer on the SGPC), the SGPC connected to an air conditioner turns on. The advantage of separating the switch and sensors, as opposed to the thermostat where the switch and sensor are in the same location, is that users can put, the sensor anywhere in which they want the air conditioner responsive.

It should be noted that the network architecture described here is different from the WiFi ad-hoc and WiFi—direct mode in that:

WiFi ad-hoc is a point-to-point communication while the Present invention architecture is point-to-multiple points; and WiFi-direct cannot have its own subnet, and does not have the relay/routing capability mentioned above.

WiFi-direct is good for point to point communication, but not for a server-client situation.

Access of SGPC

When a consumer is at home, he/she communicates as a station directly with a. SGPC as an AP. Any WiFi devices can directly communicate with a SGPC within a coverage distance (e.g., 100-300 ft.). If a WiFi (client) device, while communicating with a SGPC (checking the switch status, etc.), needs to communicates with Internet, the SGPC will "relay" the messages to the home gateway which in turn sends the messages to Internet.

When a consumer is outside home communicating with a device at home, she/he may have the problem of not knowing the private IP address assigned to a SGPC and being blocked by the home gateway's firewall. The present invention in some preferred embodiments allows consumers to communicate with a SGPC at home in one of the two ways described below:

Proxy Server Mode (Pull Mode)

A server on the Internet that keeps track of the IP address and port number of a SGPC at home. The IP address is usually the IP address of the home gateway assigned by the ISP, and the port number tells the home gateway the target device at home to which the message is forwarded. This is called NAT (network address translation).

The SGPC sends a message periodically or when its IP address and port number are changed, and the server will get the IP address from the message. ISP tend to rotate IP addresses assigned to home gateways periodically, and this message will notify any change mentioned here to the server.

The server keeps a database where each record is a map between a device and its latest IP address and port number among other things.

When a user wants to communicate with a SGPC, he/she gets on the web page of the server with the name of the SGPC and login with security information (e.g., password, etc.).

The server will provide the IP address and port number, and from that point on, the user directly communicates with the SGPC.

Exemplary Proxy Server (Pull) Mode System Embodiment (1700)

Figure 17:
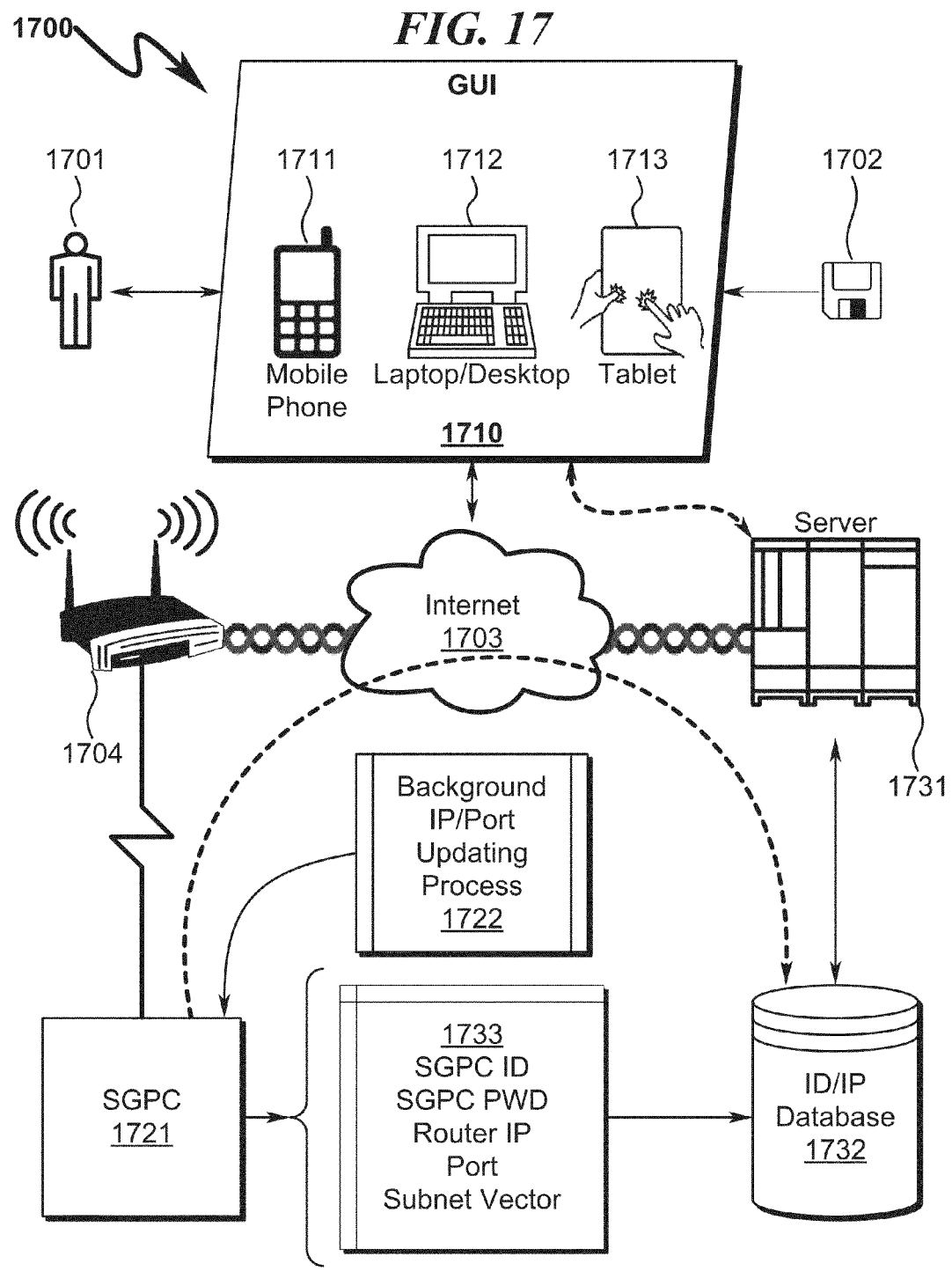
FIG. 17 illustrates a system block overview diagram describing a presently preferred embodiment of the present invention implementing an exemplary proxy server (pull) mode system embodiment.

An exemplary system embodiment depicting the proxy server mode is generally illustrated in FIG. 17 (1700). Here the user (1701) interacts with a GUI (1710) running software read from a computer readable medium (1702) and communicates over a computer network (1703) to a Proxy server (1731). The proxy server (1731) maintains an ID/IP translation database (1732) that translates a SGPC ID to an IP address/port value/subnet vector (1733). This database (1732) is populated by the SGPC (1721) operating a background IP/Port updating process (1722) that continuously checks for changes in the SGPC IP address and reports these changes via the computer network (1703) to the server (1731) for placement in the ID/IP database (1732). In this fashion any changes in the IP address or subnet routing that occur in the SGPC (1721) are reflected in the ID/IP database (1732) for use by the user GUI (1710) in communicating with the SGPC (1721).

Exemplary Proxy Server (Pull) Mode Method Embodiment (1800)

Figure 18:
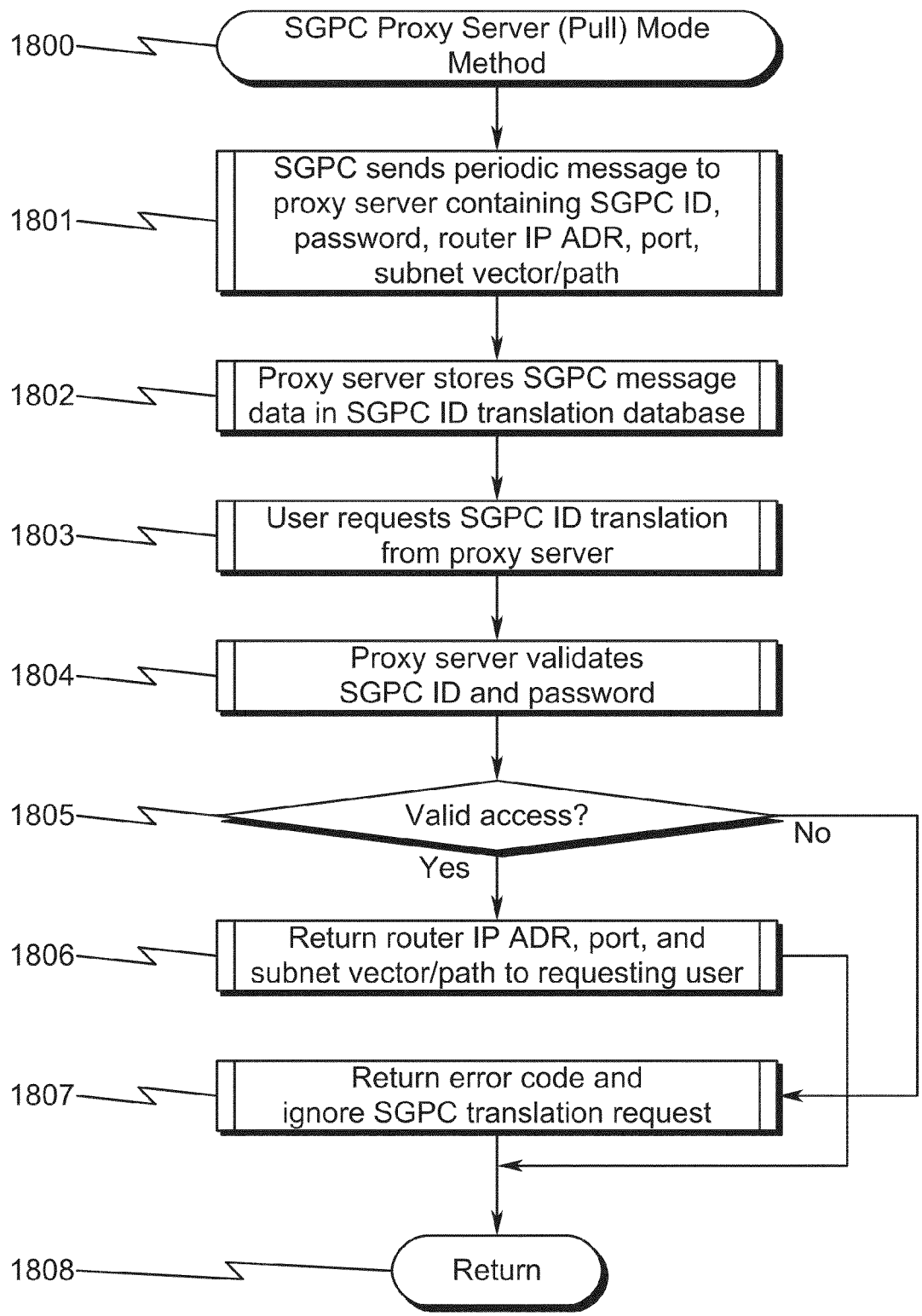
FIG. 18 illustrates an exemplary method flowchart diagram describing a presently preferred embodiment of the present invention implementing an exemplary proxy server (push) mode method embodiment.

An exemplary method embodiment depicting the proxy server mode is generally illustrated in FIG. 18 (1800) and comprises the following steps:
(1) Sending a periodic message from a SGPC to a proxy server containing the SGPC ID, password, router IP ADR, port, and subnet vector/path (1801);
(2) Storing said SGPC periodic message with a proxy server in an SGPC ID translation database (1802);
(3) Requesting a SGPC ID translation by the proxy server from a user interface (1803);
(4) Validating the SGPC ID and password provided by the user interface using the proxy server (1804);
(5) Determining if the SGPC ID and password are valid, and if not, proceeding to step (7) (1805);
(6) Returning the router IP ADR, port, and subnet vector/path for the SGPC to the requesting user interface and proceeding to step (8) (1806);
(7) Returning an error code and ignoring the SGPC translation request (1807); and
(8) Terminating the method (1808).

One skilled in the art will, recognize that these method steps may be augmented or rearranged without limiting the teachings of the present invention. This general method summary may be augmented by the various elements described herein to produce a wide variety of invention embodiments consistent with this overall design description.

Peer-to-Peer Mode (Push Mode)
Consumers register their communication devices (laptop, smartphone) with a SGPC in the form of email address, phone number, etc.
SGPC will notify its current IP address and port number when they are changed, or periodically by sending messages to consumer devices, using email or text message (for phone number).
Software on consumer Internet devices retrieves due latest IP addresses and port numbers from the messages and keeps them in the device memory for communicating with the SGPC.

Exemplary Peer-to-Peer (Push) Mode System Embodiment (1900)

Figure 19:
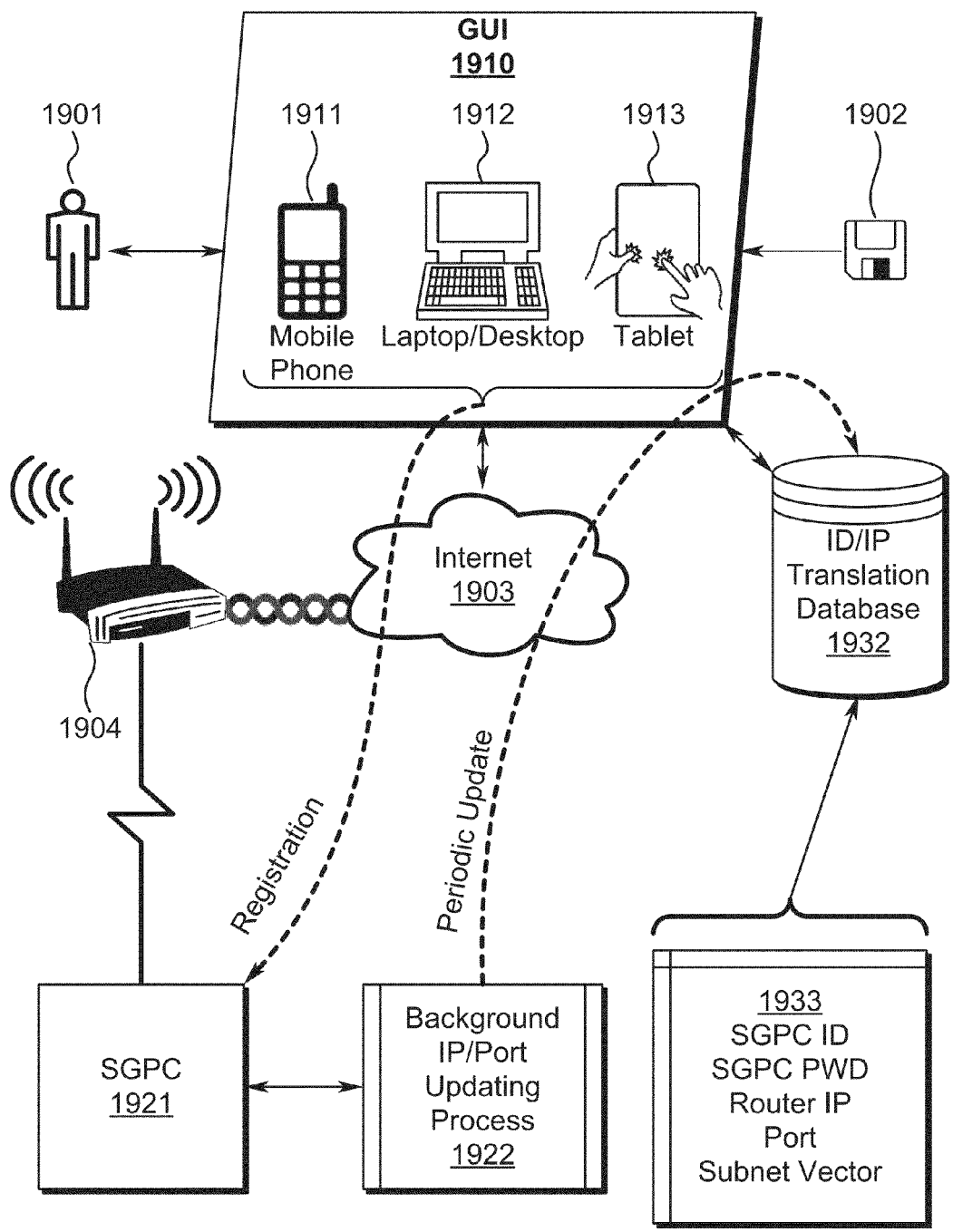
FIG. 19 illustrates a system block overview diagram describing a presently preferred embodiment of the present invention implementing an exemplary peer-to-peer (push) mode system embodiment.

An exemplary system embodiment depicting the proxy server mode is generally illustrated in FIG. 19 (1900). Here the user (1901) interacts with a GUI (1910) running software read from a computer readable medium (1902) and communicates over a computer network (1903) to a SGPC (1921) to register the communications device (1911, 1912, 1913). This registration function typically involves providing a unique communications device (1911, 1912, 1913) identifier such as an e-mail address or telephone number (for text messaging). The SGPC (1921) notifies the communications device (1911, 1912, 1913) in the event of any change of its gateway IP address, port number, subnet vector, or other access information using the messaging techniques described above. Software resident on the communications device (1911, 1912, 1913) uses this message information to determine the current IP address/port/subnet vector path for the next communication with the SGPC (1921). Within this context an ID/IP translation database (1932) that translates a SGPC ID to an IP address/port value/subnet vector (1933) may be maintained. This database (1932) is populated by the SGPC (1921) operating a background IP/Port updating process (1922) that continuously checks for changes in the SGPC IP address and reports these changes via the computer network (1903) to the server (1931) for placement in the ID/IP database (1932). In this fashion any changes in the IP address or subnet path routing that occur in the SGPC (1921) are reflected in the ID/IP database (1932) for use by the user GUI (1910) in communicating with the SGPC (1921).

Exemplary Peer-to-Peer (Push) Mode Method Embodiment (2000)

Figure 20:
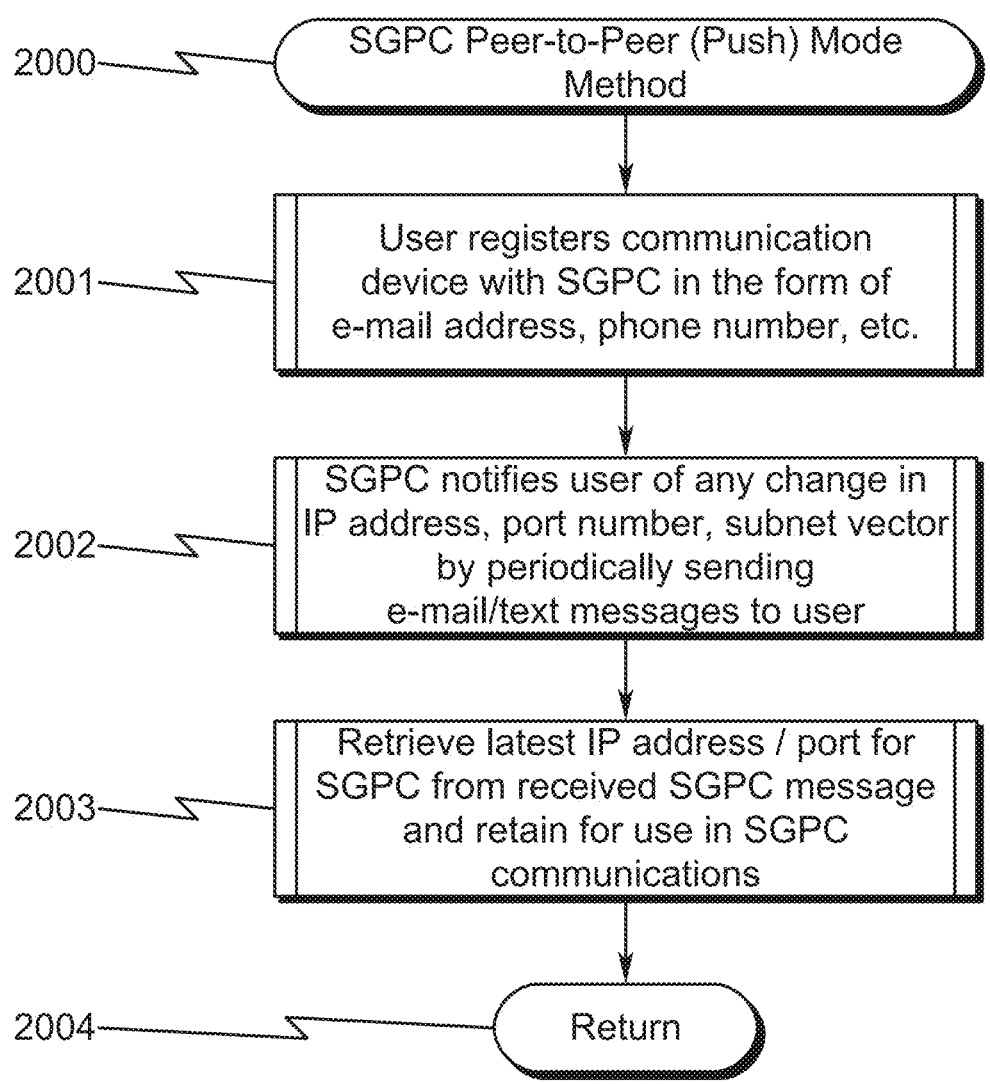
FIG. 20 illustrates an exemplary method flowchart diagram describing a presently preferred embodiment of the present invention implementing an exemplary peer-to-peer (push) mode method embodiment.

An exemplary method embodiment depicting the peer-to-peer mode is generally illustrated in FIG. 20 (2000) and comprises the following steps:
(1) Registering a communication device with a SGPC using an e-mail address, phone number, or other device identifier (2001);
(2) Notifying the communication device via the SGPC of any change in the SGPC IP address, port number, subnet vector by periodically sending update messages to the communication device (2002);
(3) Retrieve the latest IP address/port for the SGPC from received. SGPC update messages and retain the IF address/port for use in communicating with the SGPC (2003); and
(4) Terminating the method (2004).

One skilled in the art will recognize that these method steps may be augmented or rearranged without limiting the teachings of the present invention. This general method summary may be augmented by the various elements described herein to produce a wide variety of invention embodiments consistent with this overall design description.

SGPC Networking Advantages
A SGPC's networking has the following advantages:
Stability—A SGPC buffers/isolates its subnet from the change of the home gateway by monitoring and adapting to the latter. Home gateway tends to change its IP address or its communication channel from time to time. For example, the IP address assigned by the ISP (Internet service provider) may change, and the communication channel may change to a new one due to the existing channel having too much interference. The SGPC constantly monitors the change and switches to the new communication channel if necessary to keep the communication with the network always enabled.

Flexibility and Speed—Because the subnet is isolated from the change of the main home network, a static IP address can be used for a SGPC to simplify the implementation of the communication of the subnet. For example, a consumer with a laptop or smartphone can easily access a SGPC or any device in the subnet. By contrast, it is difficult to access a device in the main home network due to its dynamic nature. Additionally, it is faster to directly access a subnet from a PC without "competing" with other traffic over the gateway or Internet.

Scalability—With SGPC, consumers can configure the home automation network into layered subnets, and add and remove devices as they see fit. For example, users install the first SGPC that communicates with the devices in its subnet. They decide later to add one more SGPC, and have the new SGPC either become another sub-gateway of the home network (see FIG. 5 (0500)) or become a sub-gateway of the first subnet (FIG. 6 (0600)).

Privacy and Security—As a result of the subnets, a SGPC introduces additional security at the sub-gateway level, to firewall or filter the traffic.

With these advantages, a SGPC provides a home automation system or energy management system that is cost effective and configurable to be both service provider and consumer friendly. Consumers can access or control it at name or away with a smartphone aver Internet DIRECTLY. They do this without the "sniffing" of a utility company and they have a full control of what they do. This direct path also increases the speed of the communication. If they choose, they can also have the utility company or a service provider manage the SGPC for them.

One skilled in the art will recognize that the above features may or may not be implemented in each invention embodiment and serve only to describe characteristics of some preferred embodiments.

SGPC Functionality

Besides the networking aspects described above, a SGPC supports these functions:
Controls the relay switch;
Obtains the measurement from the energy measurement unit;
Hosts a web server to present information to the consumers and allows device configuration;
Performs energy consumption analysis and decision making; and
Uploads software and data from SGPC to user devices.
These functions will now be described in more detail.

Switch Control

A web server hosted in a SGPC allows consumers to access in a secure way from anywhere. Consumers can read the status of the switch(s) and configure the switching strategy on the web server in a number of modes:
Instant switch on/off;
One-time switch based on crossing a preset threshold of: current level, voltage level, energy level, and time of day;
Periodic switch based on the same conditions as above with any period (e.g., hours, days);
Vampire energy;
Auto mode based on energy consumption analysis; and
Events regarding sensor data from other devices (e.g., temperature, humidity, etc.).
Several of these modes will now be discussed in further detail.

Vampire Energy

Many consumer devices, when turned off, still consume the standby energy, usually 5%-8% of the normal power consumption. This energy is called vampire energy, and can add up to significant amount. Consumers can specify that when vampire energy is detected, turn off the switch. Vampire energy can be detected by the current dropping below certain threshold, which is configurable by consumers. For example, when the current drops 80% for an extended period as detected by the energy measurement unit, vampire energy is detected.

Analysis of Energy Consumption

Utility companies have the energy cost profiles for enterprises and residential homes based on their smart meter feedbacks. These profiles are available to consumers in some format, for example, in a form of "time of day vs. energy cost" or "the amount of energy consumed vs. energy cost". This information can be found in utility bills for example. Consumers can input the energy cost profile into a SGPC, and set the switch to automatic mode. The SGPC will make decision to turn on and off the switch(s) based on
Cost profile on the energy consumption;
The current time;
The total energy consumed so far by the household if available (this information may be available from the smart meter)
Energy consumption data from other devices (ZIGBEE® sensors and other SGPCs).

Sensory Data

A SGPC may turn on and off based on the sensory data read from external devices—WiFi sensors or ZIGBEE® sensor if ZIGBEE® module is integrated in SGPC. For example, when temperature sensor shows a temperature above certain level, turn on the SGPC connected to an air conditioner.

Presentation of Enemy Consumption

Consumers can read the web server the energy consumption in terms of instant energy data (i.e., watts, current, voltage, and accumulated energy consumption) over a specified period. A SGPC can present the energy consumption in a histogram.

Presentation of Data from Companion Devices

We call those external automation devices that communicate with a SGPC companion devices. They include WiFi based and ZIGBEE® based sensors. SGPC web servers may also display the data of companion devices.

Notification of Events

Consumers can schedule the notification of any events from the switch status change to the energy consumption crossing a threshold. Consumers typically put in their email address for notification using emails, or telephone number for text messages. A SGPC sends messages containing these events to their email or phones.

Uploading Software and Data

Consumers can download software (platform independent, such as Java) and dada from a SGPC to their devices, so that additional functionality can be achieved. The software may be fetched from an Internet server through the SGPC, or from its local storage.

Help Desk

A SGPC provides helpful tips and guidelines for the usage of the devices and offers suggestions on saving energy based on the energy usage profile of the user.

Exemplary System Implementation

Typical Hardware Complement

An exemplary implementation of a typical SGPC system involves:
- energy measurements;
- relay switching;
- power rectifier to SGPC;
- MCU programming; and
- WiFi module (and ZIGBEE® module).

This hardware implementation may typically use off-the shelf hardware components for the energy measurement unit, relay, power rectifier, MCU, and WiFi module. One of ordinary skill in the electrical arts should be able to design a circuit board, assemble, and package these components into a functional SGPC system as described herein.

Software

The software on the MCU can be LINUX based or simply embedded software without OS. The software does the following multi-task job:
- (gets the energy consumption data by regularly reading the pins connected to the energy measurement unit;
- turns on or off the switch by exerting low or high voltage levels on the pin that connected to the relay;
- gets the input from the web page and modify its local parameters and data stored in its memory/flash, and update web page information accordingly;
- communicates over the Internet via home gateway;
- communicates with other devices (ZIGBEE® or WiFi based) to update local parameters and data, and web page if necessary;
- checks periodically the schedule table for actions (time based or event based) and act accordingly;
- executes other tasks as described below.

Sub-Gateway

There are two ways for a SGPC system to act as both an AP and a client (STA):
- have two WiFi modules, one as AP and one as STA, and connect them with a router; or
- implement both on one WiFi module.

If the second approach is adopted a softAP implementation may be used as an off-the-shelf software solution. softAP makes a WiFi station also act as an AP and it is sometimes called APClient. In this case, the following enhancement is typically required.

Auto Scan and Adaptation

In order for the system to work with softAP, a SGPC's own communication channel (for both of its AP and client roles) must be the same as the home gateway communication channel. Software is added to scan in the background the home gateway communication channel to make sure whenever the home gateway communication channel changes, the SGPC's own communication channel is changed accordingly.

EXEMPLARY EMBODIMENTS

While the present invention may be embodied in many forms, the following general discussion details the feature characteristics of several preferred exemplary embodiments.

Access from Anywhere at Home or Away—Proxy Server Mode

[1] A server on the Internet keeps track of the IP addresses and port number by which to communicate with a SGPC.

[2] The SGPC periodically sends a message to the above mentioned server, whereby the IP address and the port number of the message is retrieved and stored by the server in its database.

[3] Additionally, SGPC sends the same message for the same purpose as in Feature [2] based on events. These events include IF address change, or port number change, among other things.

[4] Alternatively, the server periodically sends a "keep alive" message to a SGPC, and updates its data base with the information (i.e., IP address and port number) retrieved from the return acknowledgement messages.

[5] When a device away from home intends to communicate with the SGPC via Internet, it requests the IP address and port number from the server, and communicates with the SGPC directly. For information purposes, the messages will be sent over the Internet to the home gateway, which will forward them to the SGPC over WiFi communication inside the home. In the reverse path, messages will start at SGPC, travels over the WiFi home network to the home gateway, which will send it to Internet back to the user.

Access from Anywhere at Home or Away Peer-to-Peer Mode

[6] Alternatively, an Internet device can be registered with a SGPC in terms of an address (e.g., an email address for a tablet, a phone number for a smartphone).

[7] The is then configured, to send email or text messages to the devices mentioned in Feature [6]. The messages contains necessary information, including IP address and port number, but is not limited to this information.

[8] Based on the message in Feature [7] (the IP address and port number), a user can directly communicate with the SGPC. In this case, the device needs not go to a server to fetch the IP address and port number for communicating with the SGPC.

Access from Home—Direct Mode

[9] When at home, a user's Internet device can communicate DIRECTLY with SGPC using the WiFi protocol. This is in contrast to the communication mentioned in Feature [5], where the user is away from home, and has to use Internet to communicate.

[10] A software program may be downloaded (see Feature [23]) to the user's device for detecting whether a direct WiFi communication with SGPC is possible or it has to use Internet.

One Module and Two Roles

[11] From the networking point of view, a SGPC, as system, plays two roles inside a home network. It joins the existing home network as a station, so it can communicate with the Internet. At the same time, it is an AP to any WiFi stations that want to communicate with it. For information purpose, this solves a problem many WiFi based home automation devices suffer: they can either be a station or an AP, but not both.

Subnet and Sub-Gateway,

[12] A SGPC has its own subnet with static IP address. This is in contrast to the main home network, were a device's IP address is assigned dynamically by the gateway, and consumers usually have no control over the IP address (which can be changed without any notice) and have difficulty to directly communicate with it.

[13] The subnet mentioned in Feature [12] communicates with main home network through SGPC. This is one reason this automation device is termed a gateway power controller.

[14] A SGPC can join, a subnet "gatewayed" by an earlier deployed SGPC, and has its own subnet, as generally illustrated in FIG. 6 (0600).

Adaptability to the Dynamic Nature of Home Networks

[15] A SGPC constantly scans the existing home network communication channel. If it sees a change in the home network communication channel, it will adapt/switch its own communication channel accordingly. If a station communicates with the SGPC and through it to communicate with Internet, the data during the channel transition will be saved, and sent after the transition is completed. This ensures no data loss during channel transition.

Security

[16] In addition to all the standard security mechanism associated with Internet protocol and WiFi protocol—password, authentication, encryption, etc., the present invention adds a firewall and access list at each SGPC, so accessing the subnet associated with a SGPC will be subject to further security. This means only select parties are allows to get connected with the SGPC at the IP or MAC level.

Switch Scheduling

[17] Consumers can schedule the switch both at home and away (1) Instantly; (2) One-time based on the following conditions: electric current level, voltage level, energy level, and time of day; (3) Periodically based on the same condition as in (2) with any period (e.g., hours, days); (4) triggered by vampire energy; (5) automatic mode based on energy consumption analysis; (6) sensor data from other Energy Consumption Analysis

[18] Consumers can input the energy cost profile into SGPC, and set the switch mode to automatic mode (see Feature [17]). In this mode, a SGPC will make decision to turn on and off the switch (s) based on
  The energy cost profile (energy cost. vs. time of day, or energy cost vs. amount of energy consumed);
  The current time;
  The total energy consumed so far by the house if available (this information may be available from a smart meter)
  Energy consumption data from other devices (ZIGBEE® sensors and other SGPCs) (see Feature [20][21]).

Energy Measurement of Consumer Appliances

[19] The energy measurement unit can measure any electricity related variables (e.g., current (A), voltage (V), power (W), energy (W-h)).

Communication with Other Automation Devices

[20] A SGPC can be configured to communicate with other SGPCs to coordinate activities.

[21] A SGPC can be configured to communicate with other sensors capable of WIFI communication, and use the sensor data as a base for scheduling a switch (see Feature [17]). For information purpose, because a SGPC is an AP, most WiFi sensors configured as WiFi STA can communicate with it. When SGPC contains a ZIGBEE® module, ZIGBEE® based sensors can communicate with it.

Push Information/Notification to Consumers

[22] Consumers can register their email address or smartphone number in a SGPC, and subscribe messages send by the SGPC.

[23] Consumers can subscribe from a list of available message types. For example, a message type defines an event to report (e.g., a switch status change or a variable above or below a threshold). See Feature [27] for more message types.

Upload Software and Date

[24] A SGPC can upload software and data to consumer devices. The software is usually platform independent such as Java, and provides added functionality to the user experience. For example, the data include energy consumption histogram that user can archive on their computers.

Historical Data Archival and Energy Usage Suggestions

[25] A SGPC keeps track of the energy usage profile of the connected devices in terms of the duration, and time of switch-on, and the energy consumed over a preset interval of time (e.g., a month), and provides the historical data in some format (table or histogram)

[26] A SGPC can provide suggestions/guidelines/warnings based the historical data mentioned in Feature [25] and some rules. For example, a rule can be "avoid use this device between 6:00 PM and 8:00 PM for n days when the energy consumed so far is above m". A warning can be "You are charged at $xxx/KW-h due to xxx".

[27] These suggestions/guidelines/warnings can be subscribed by consumers as described in Feature [22].

User Interface

[28] A web server is hosted in a SGPC. It allows users to login to it and
  schedule the switch;
  read energy consumption and the switch status;
  read data from companion devices including sensors and other SGPCs;
  input, data—energy cost profile—for energy consumption analysis and decision making;
  register email address or phone numbers for a SGPC to send information to them;
  request software and data upload; and
  get helpful tips and guidelines for the usage of the devices and suggestions on saving energy based on user's energy usage profile.

SUMMARY

The present invention, provides a control system that automates the energy measurement and control of consumer devices in a way non-intrusive to existing home and commercial networks. Consumers may review the power consumption of their electronic appliances and are able to enable/disable these appliances from anywhere using standard Internet-connected devices.

Preferred Exemplary SGPC Block Diagram (0800)-(1600)

Figure 8:
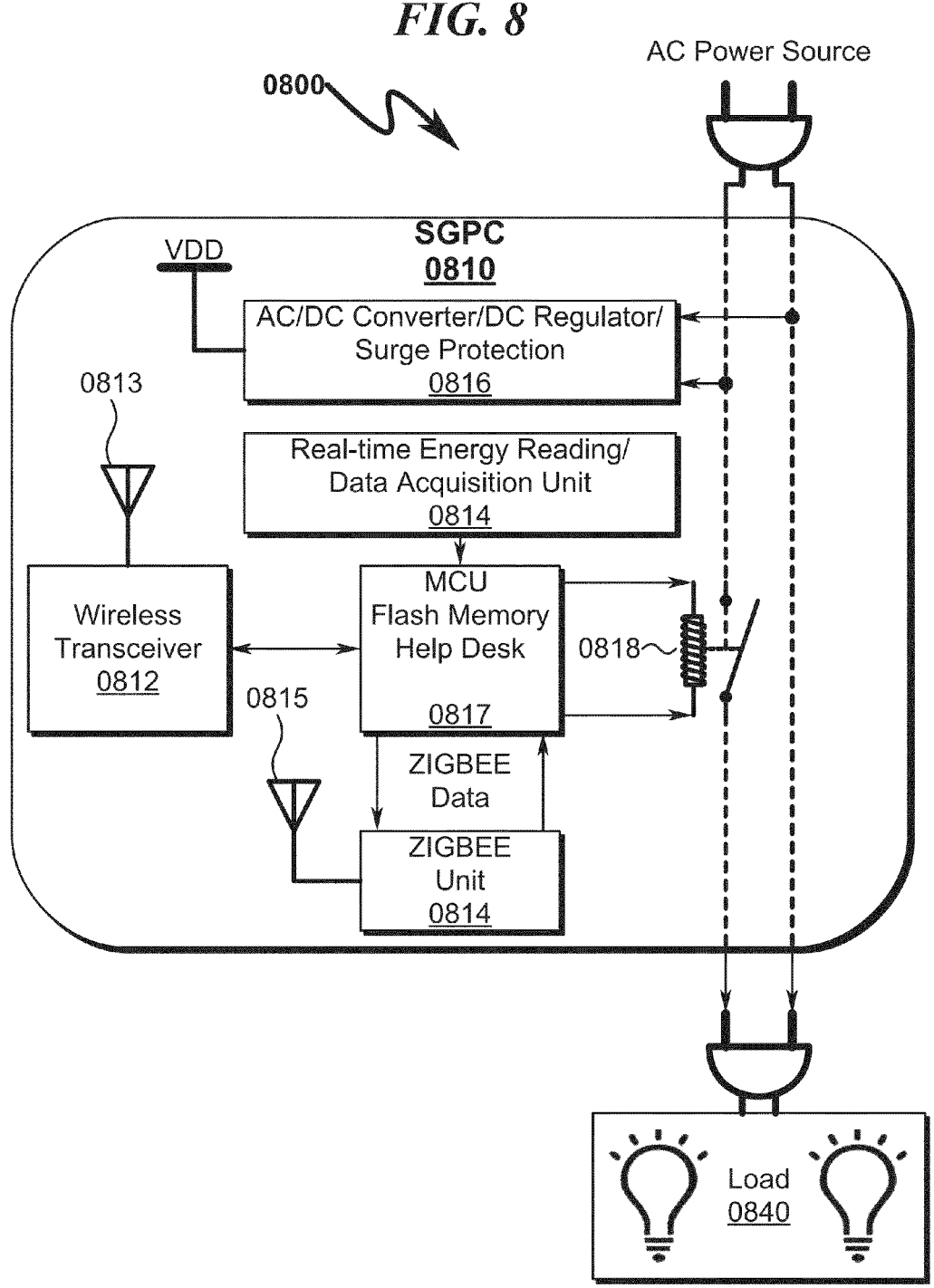
FIG. 8 illustrates an exemplary system block diagram of a typical SGPC embodiment of the present invention.
Figure 9:
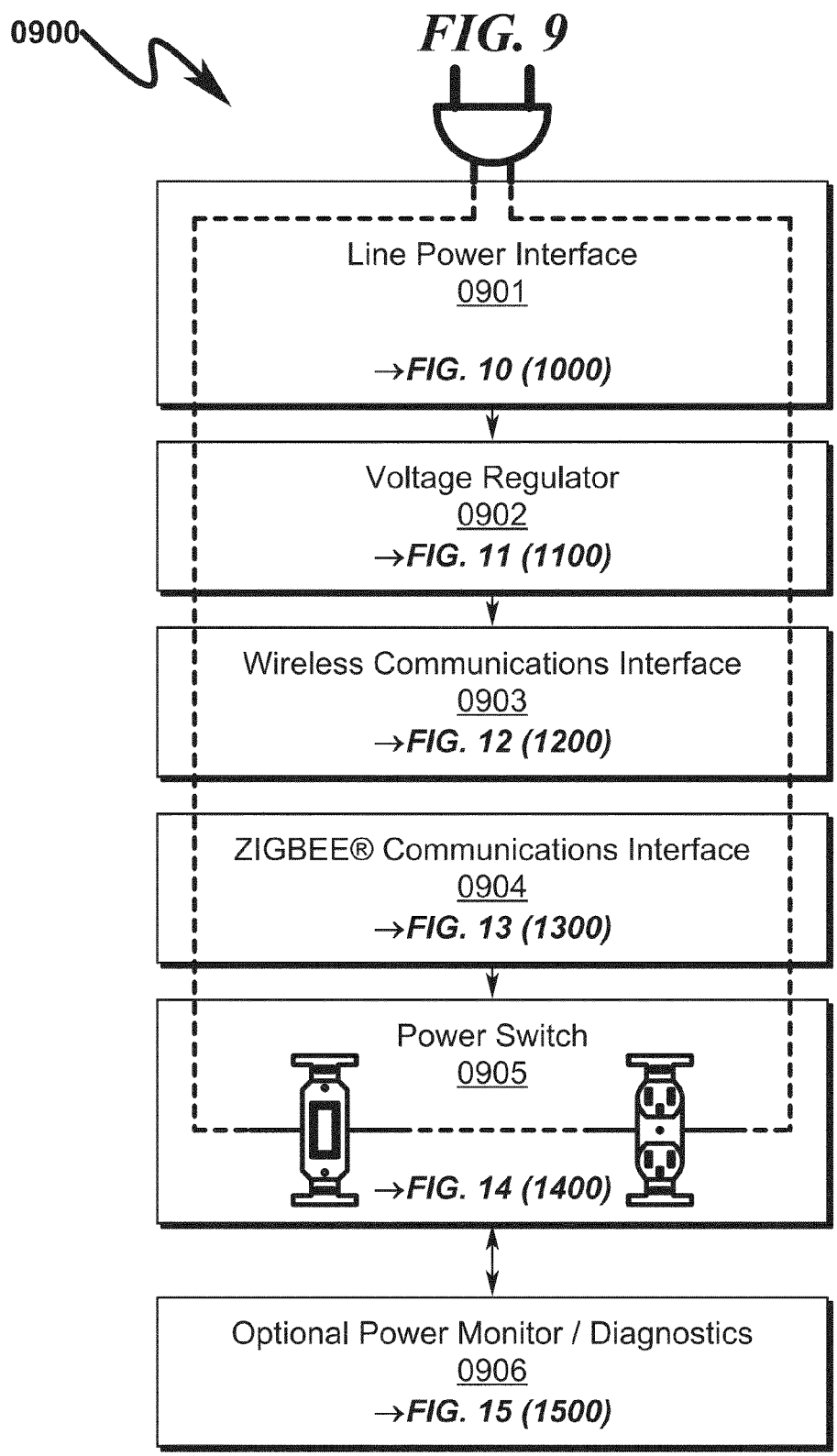
FIG. 9 illustrates an exemplary schematic block diagram of a preferred exemplary SGPC embodiment.
Figure 10:
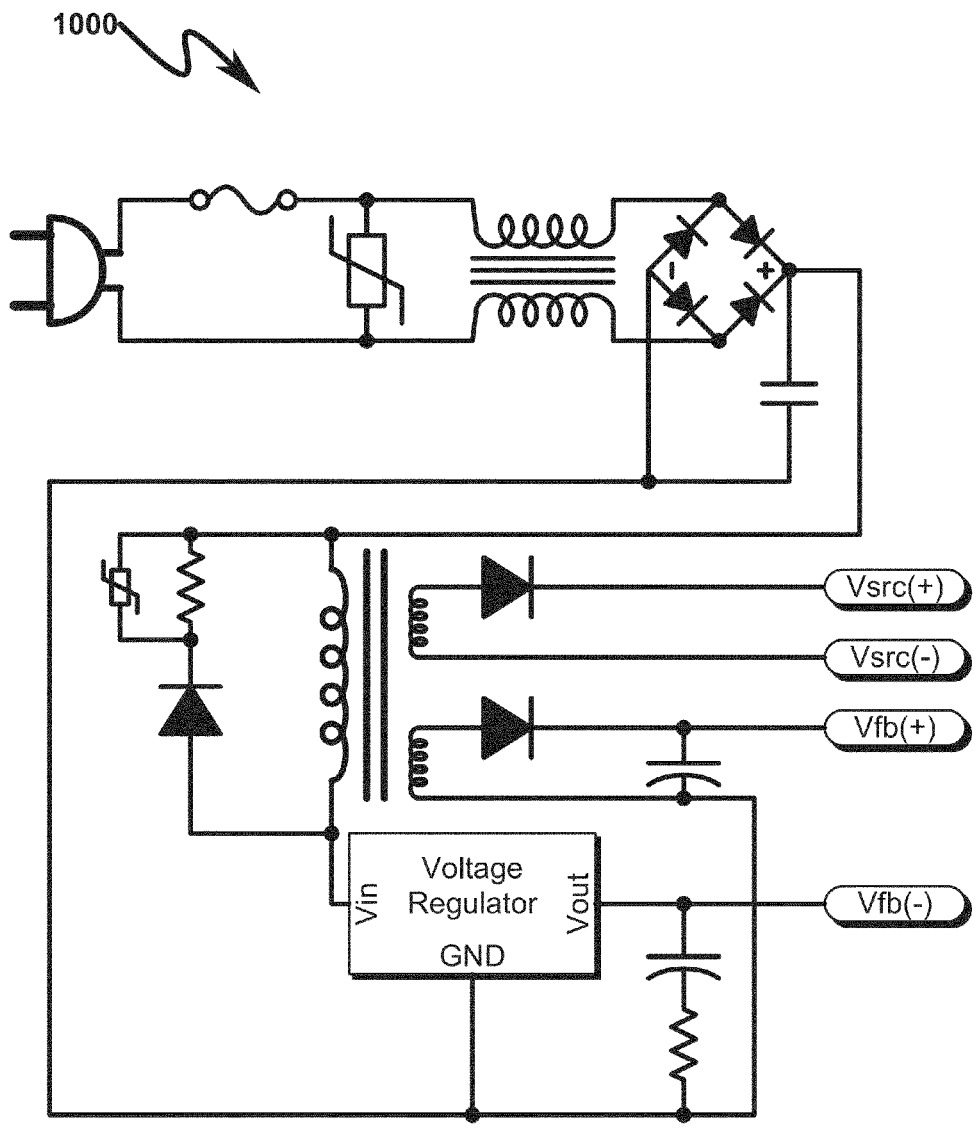
FIG. 10 illustrates an exemplary schematic a preferred exemplary SGPC Line Power interface embodiment.
Figure 11:
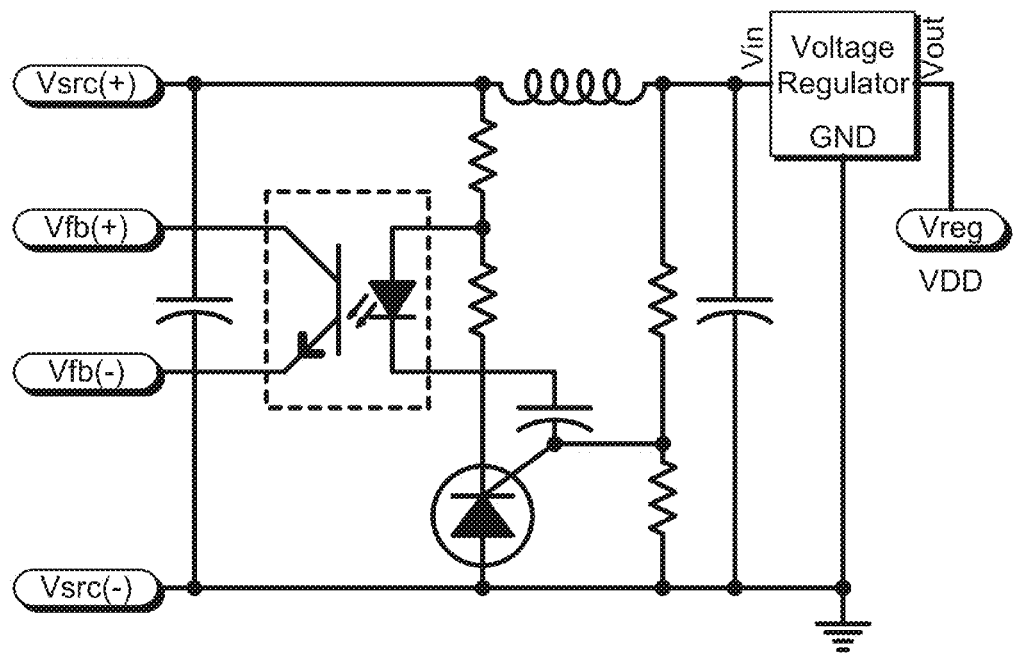
FIG. 11 illustrates an exemplary schematic of a preferred exemplary SGPC Voltage Regulator embodiment.
Figure 12:
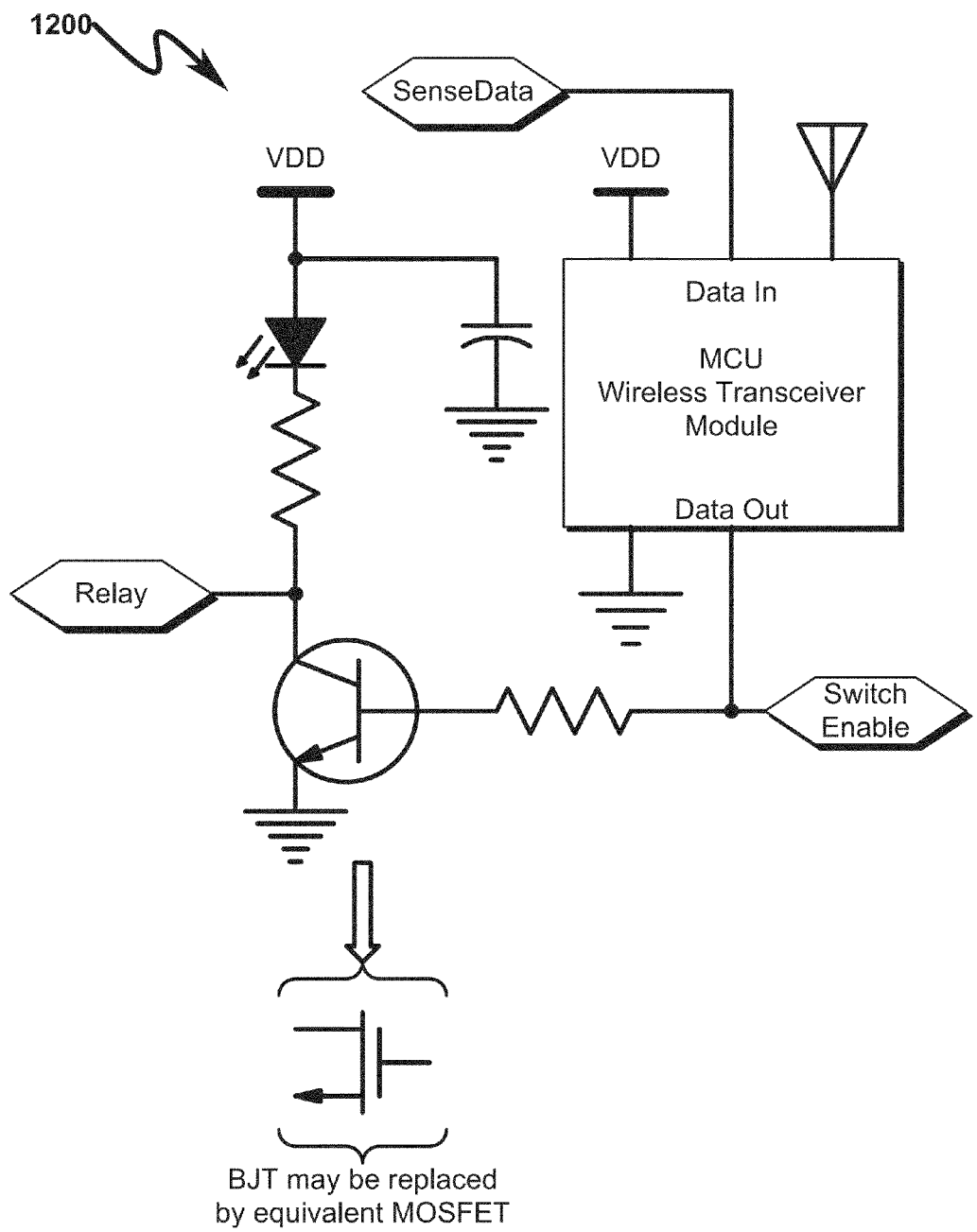
FIG. 12 illustrates an exemplary schematic of a preferred exemplary SGPC MCU/Wireless Communication Interface embodiment.
Figure 16:
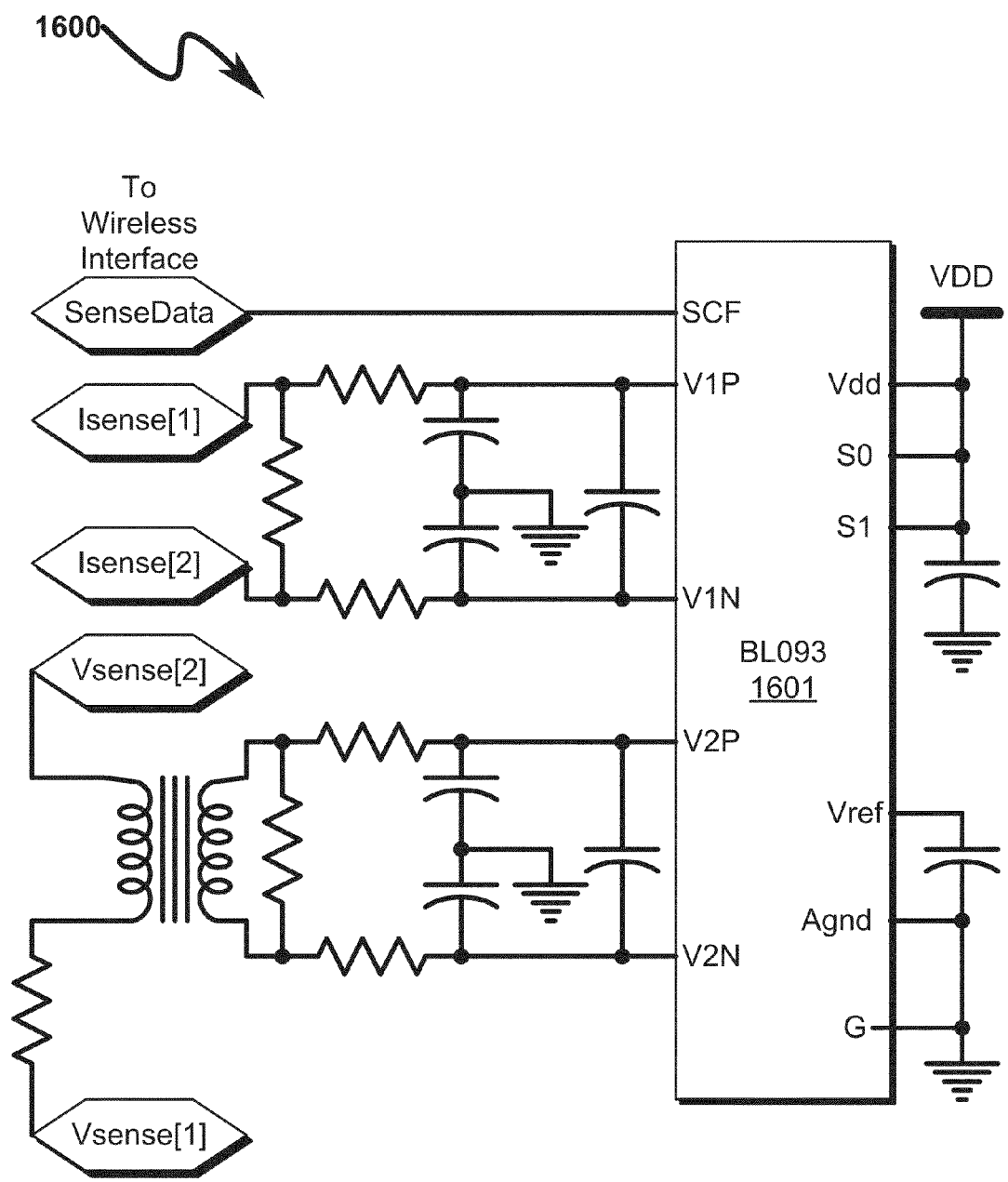
FIG. 16 illustrates an exemplary schematic of a preferred exemplary SGPC Optional Power Monitor/Diagnostics embodiment.

A preferred exemplary system electrical block diagram of a typical SGPC system is generally illustrated in FIG. 8 (0800)—FIG. 9 (0900), with exemplary detail of these system blocks depicted in FIG. 10 (1000)—FIG. 16 (1600). This preferred embodiment comprises the following circuits:
  Line Power Interface (0901)—As detailed in FIG. 10 (1000), the input outlet brings 110V AC in through the fuse and split into two paths. The first path converts the AC voltage to a DC voltage by 4-diode bridge rectifier. A transformer steps down the voltage to the level for further regulation. DC regulator (U3) provides +5 VDC supply for the remaining circuits of the unit. The second path brings 110V AC voltage forward to the output socket via, a power relay in the power switch (0904) by the output voltage is controlled as detailed in FIG. 13 (1300).
  Voltage Regulator (0902)—As detailed in FIG. 11 (1100), the DC Regulator brings +5 VDC from the line power interface (0901) further down to 4-3.3 VDC for supplying a wireless transceiver in the wireless communications interface (0903).
  Wireless Communications Interface (0903)—As detailed in FIG. 12 (1200), a wireless transceiver receives the commands from the computer or/and other WiFi or wireless device. The received command via the wireless receiver interface (not shown) will provide a logic signal (SWITCH) to turn on/off the transistor switch (Q1). Q1 controls the on/off position of the power relay in the power switch circuitry (0904) based on commands from the PMCU and may optimally be implemented using bipolar or MOS fabrication technologies.

Figure 13:
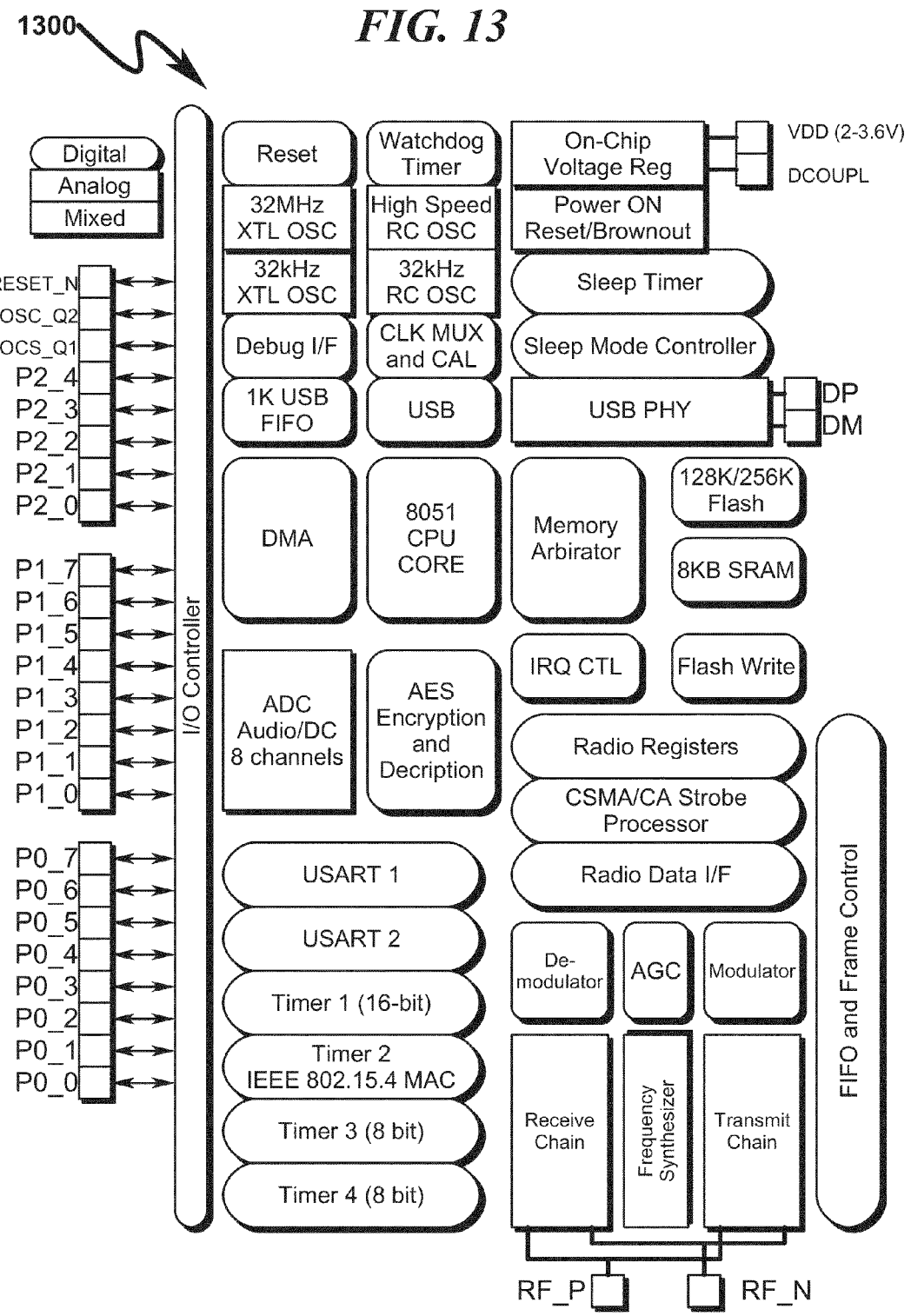
FIG. 13 illustrates a system block diagram of an exemplary SGPC ZIGBEE® transceiver interface integrated circuit, useful in some preferred embodiments of the present invention.
Figure 14:
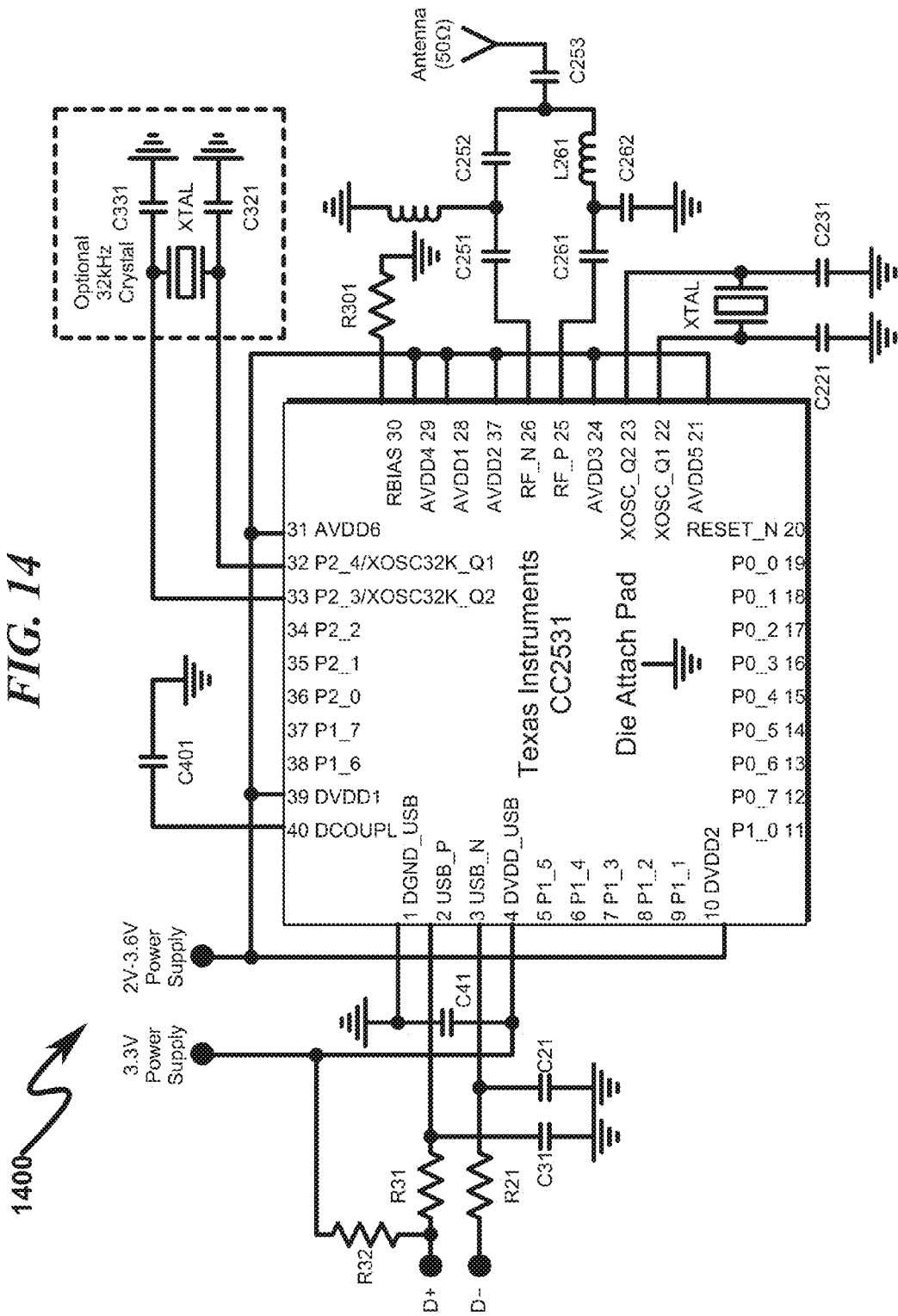
FIG. 14 illustrates an exemplary schematic block diagram of an exemplary SGPC ZIGBEE® transceiver interface integrated circuit useful in some preferred embodiments of the present invention.

ZIGBEE® Wireless Interface (0905)—As generalized in FIG. 8 (0800) and detailed in FIG. 13 (1300) and FIG. 14 (1400), the SGPC (0810) may incorporate a ZIGBEE® interface (0814) the overall SGPC design to permit heterogeneous wireless networks using SGPCs to communicate with a wide variety of existing home automation wireless networks. While a wide variety of embodiments of this wireless interface are anticipated, a preferred embodiment incorporates the use of a Texas Instruments model CC2531 ZIGBEE® communications controller as generally illustrated by the block diagram of FIG. 13 (1300) and exemplary implementation schematic of FIG. 14 (1400).

Figure 15:
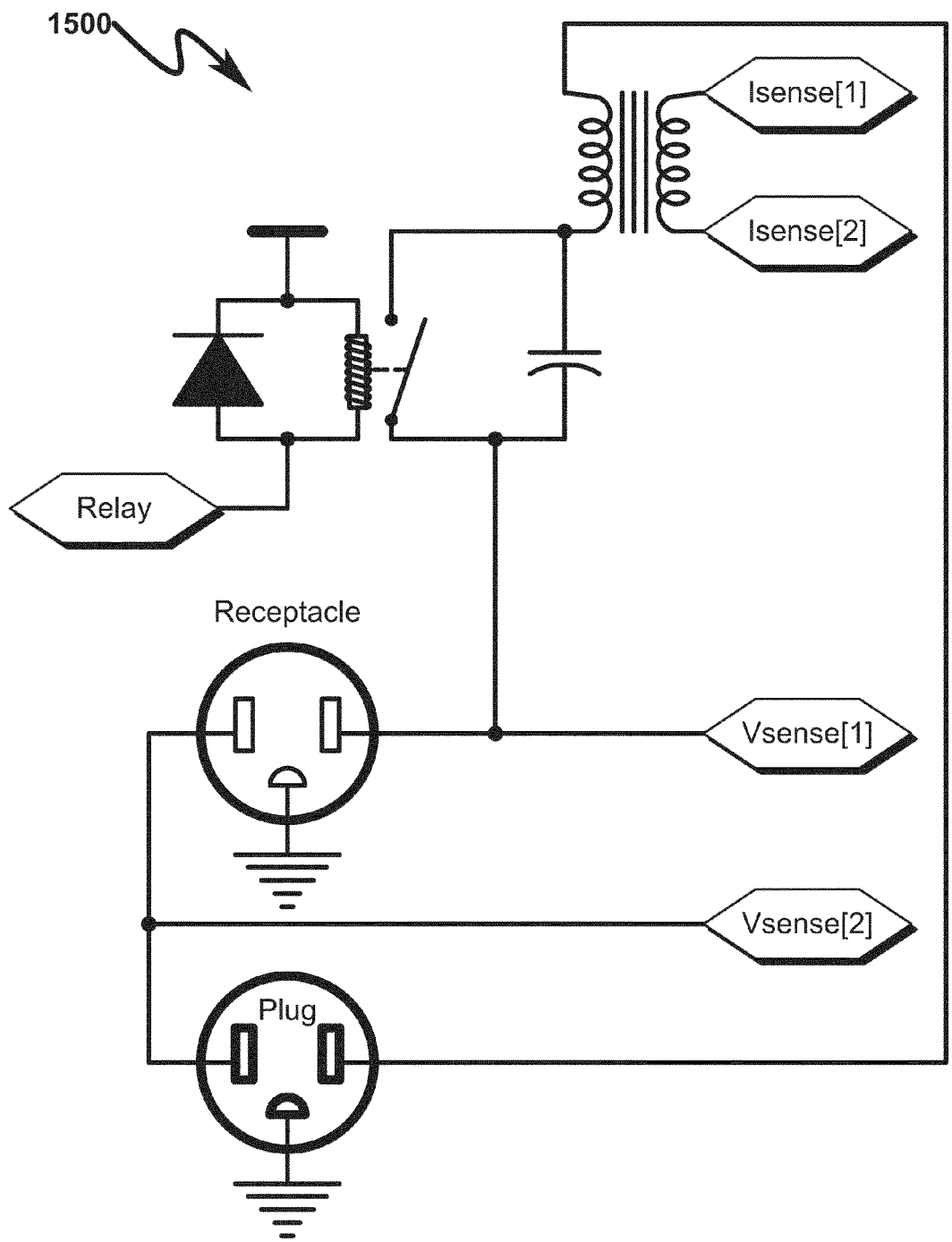
FIG. 15 illustrates an exemplary schematic of preferred exemplary SGPC Power Switch embodiment.

Power Switch (0905)—As detailed in FIG. 15 (1500), a power relay is a gate between the line power interface power input and the output power outlet and is controlled by the transistor switch in the wireless communications interface (0903). The power relay is protected from the over current surge by a Zener diode.

Optional Power Monitor/Diagnostics (0906)—As detailed in FIG. 16 (1600), an optional integrated circuit (1601) may be incorporated for measuring energy and the self-diagnostic purposes.

One skilled in the art will recognize that these functional blocks may be implemented in a wide variety of ways well known to those skilled in the art of circuit design and as such are only exemplary of the techniques taught by the present invention.

Main SGPC User Application Loading Method (2100)

Figure 21:
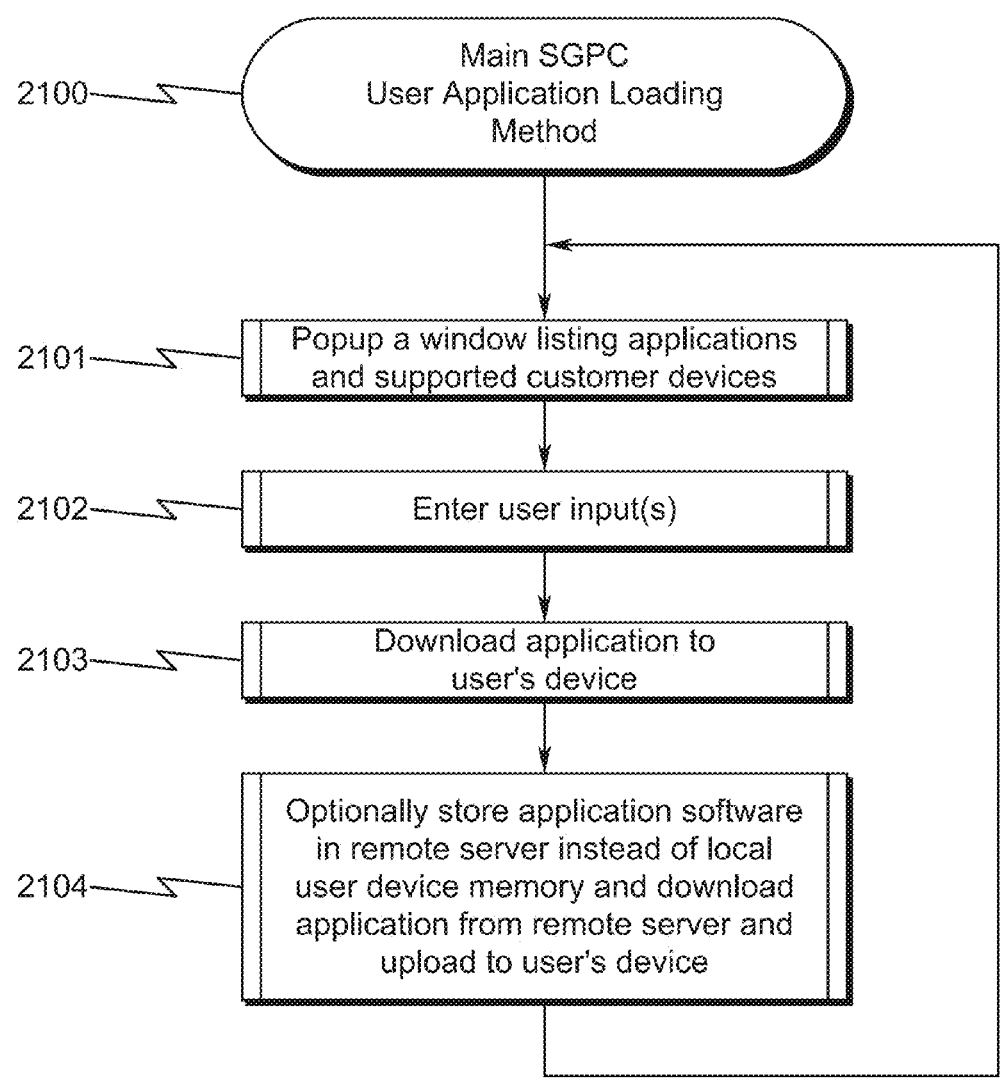
FIG. 21 illustrates an exemplary method flowchart diagram depicting a main SGPC user application loading method useful in some preferred embodiments of the present invention.

As generally illustrated by the exemplary flowchart depicted in FIG. 21 (2100), the present invention anticipates that the SGPC either alone or in conjunction with other systems may present a website interface permitting application software to be loaded onto remote user devices, thus permitting the device access to SGPC switch control and monitoring functionality over the Internet.

Main SGPC Processing Loop Method (2200)

Figure 22:
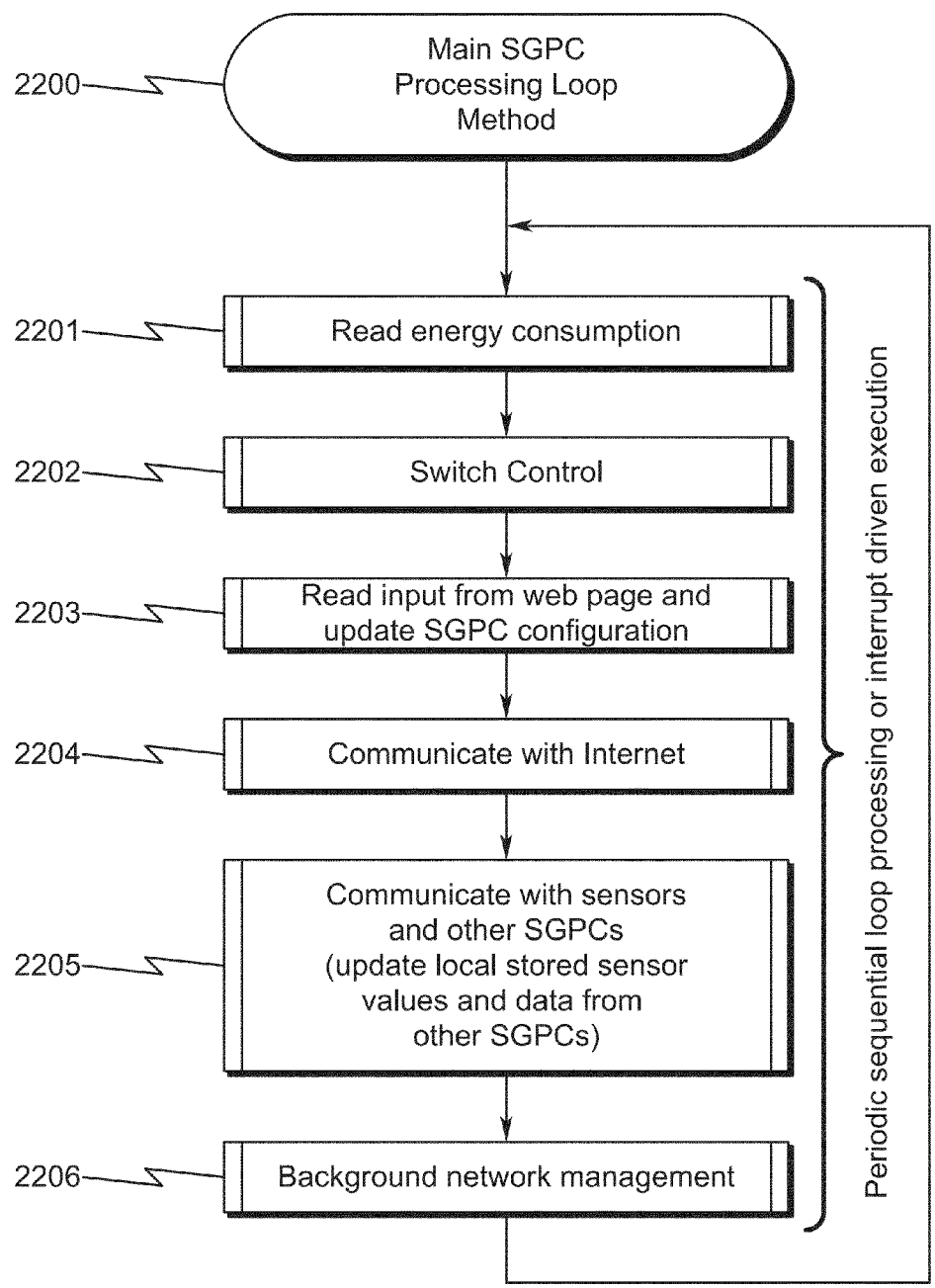
FIG. 22 illustrates an exemplary method flowchart diagram depicting a main SGPC processing loop method useful in some preferred embodiments of the present invention.

As generally illustrated by the exemplary flowchart depicted in FIG. 22 (2200), the present invention anticipates that the SGPC may operate in some preferred embodiments either synchronously or asynchronously to perform the following system functions:

Reading energy consumption for an attached load device;
Performing switch control;
Reading inputs from a web page and updating SGPC configuration data structures;
Communicating with the Internet;
Communicating with sensors and other SGPCs to update locally stored sensor values and data from other SGPCs;
Performing background network management;
Looping and/or asynchronously executing the above functions.

One skilled in the art will recognize that this execution list is only exemplary and may be augmented/trimmed/rearranged without departing from the spirit of the invention.

Home Gateway Communication Channel Method (2300)

Figure 23:
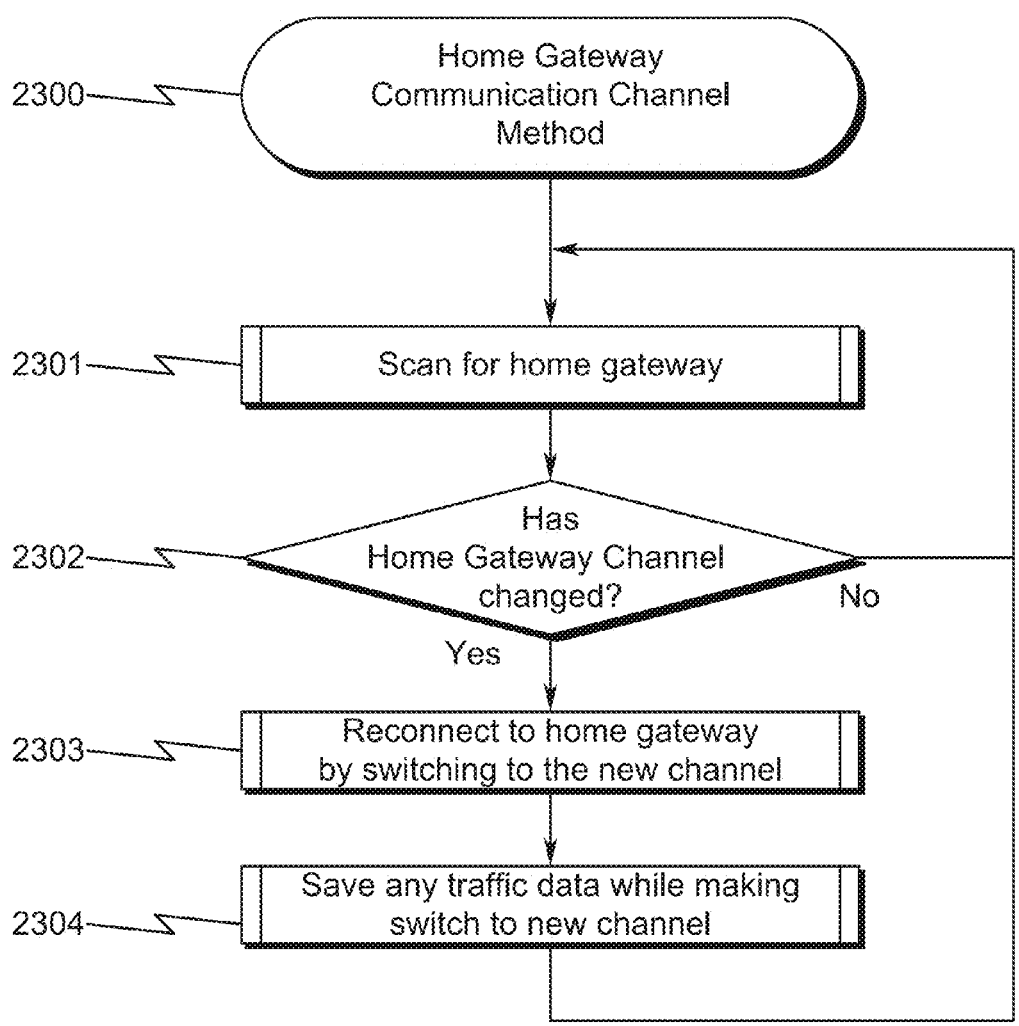
FIG. 23 illustrates an exemplary method flowchart diagram depicting a home gateway communication channel method useful in some preferred embodiments of the present invention.

As generally illustrated by the exemplary flowchart depicted in FIG. 23 (2300), the present invention anticipates that the SGPC will in many preferred embodiments continuously scan for changes in the home gateway configuration and when such configuration changes are encountered the SGPC will reconnect to the home gateway to permit home gateway connectivity to be continuously maintained.

Event Notification Configuration Method (2400)

Figure 24:
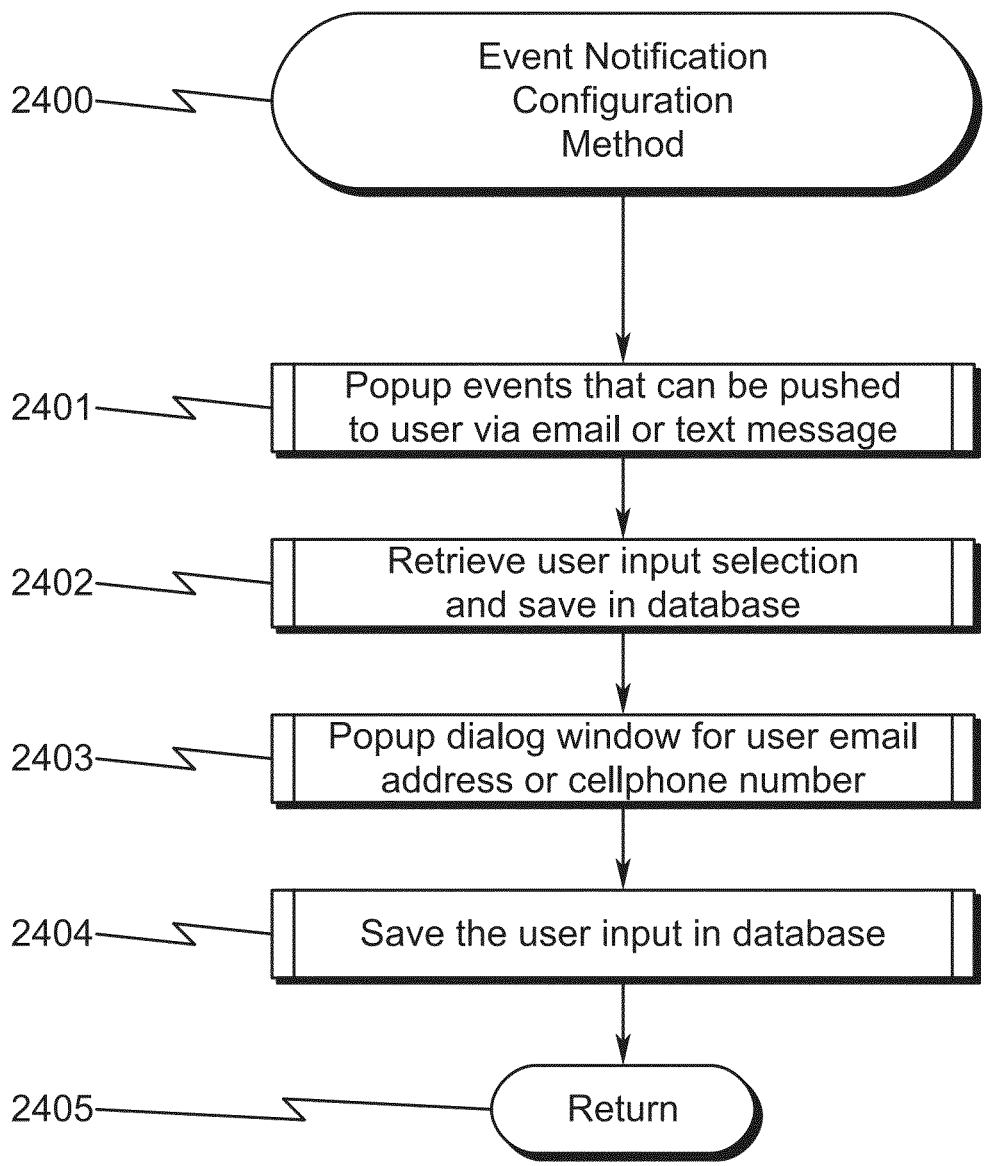
FIG. 24 illustrates an exemplary method flowchart diagram depicting an event notification configuration method useful in some preferred embodiments of the present invention.

As generally illustrated by the exemplary flowchart depicted in FIG. 24 (2400), the present invention anticipates that the SGPC will in many preferred embodiments permit event notifications to be configured by a user via popup events that are pushed to the user via email and/or text messages.

Switch Control Configuration Method (2500)-(2800)

Figure 25:
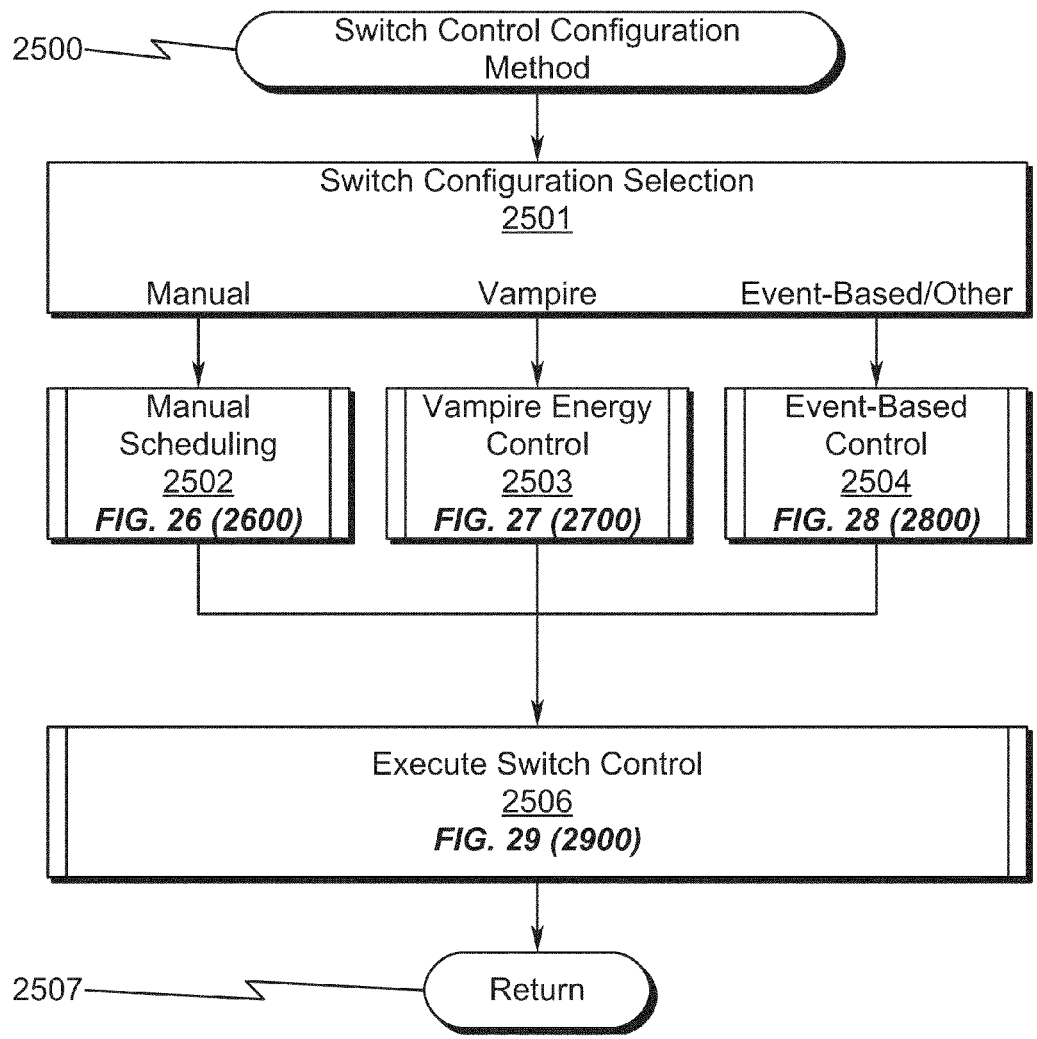
FIG. 25 illustrates an exemplary method flowchart diagram depicting a switch control, configuration method useful in some preferred embodiments of the present invention.
Figure 26:
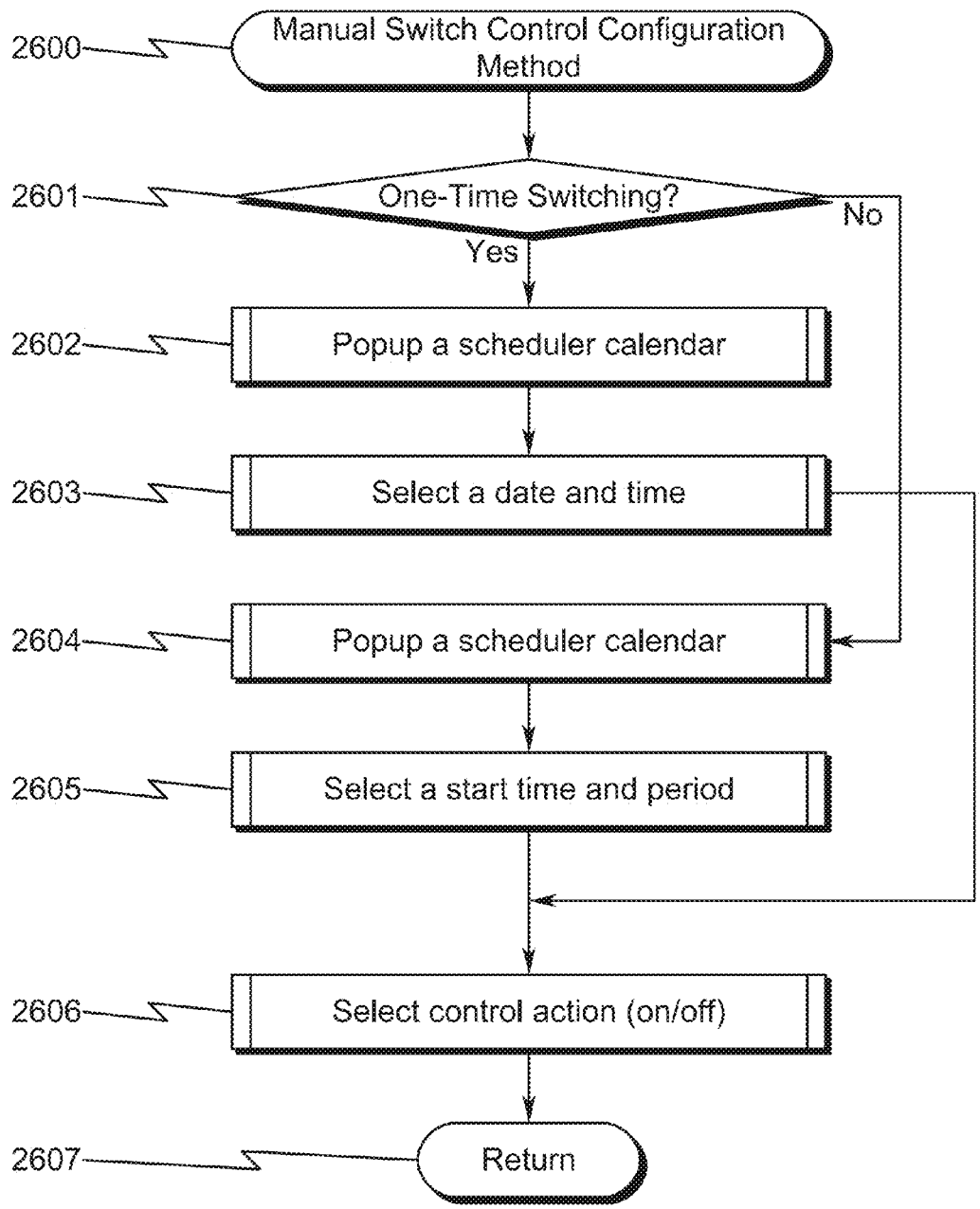
FIG. 26 illustrates an exemplary method flowchart diagram depicting a manual switch control configuration method useful in some preferred embodiments of the present invention.
Figure 27:
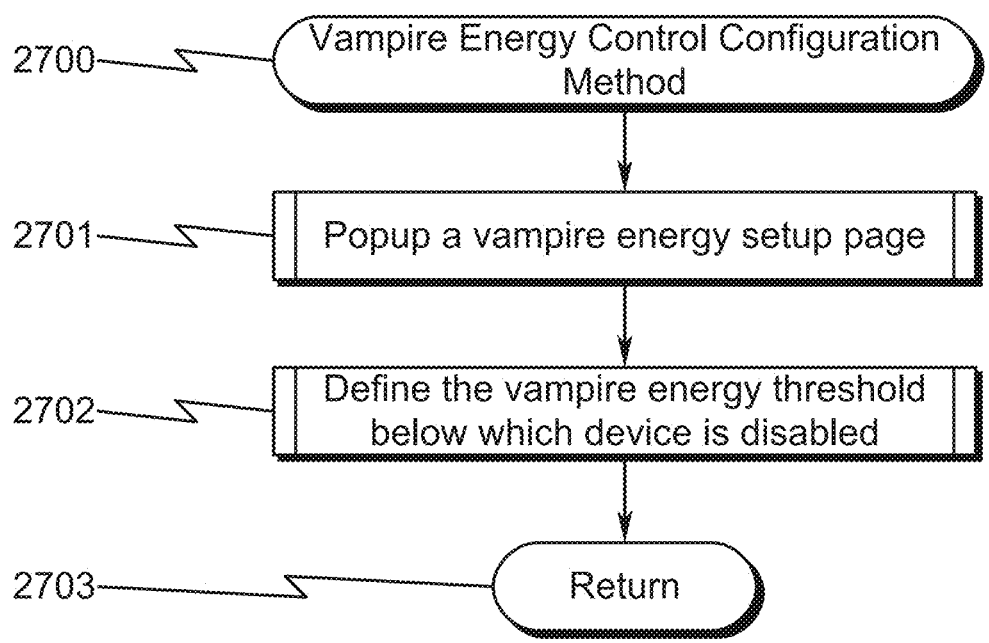
FIG. 27 illustrates an exemplary method flowchart diagram depicting a vampire energy control configuration method useful in some preferred embodiments of the present invention.
Figure 28:
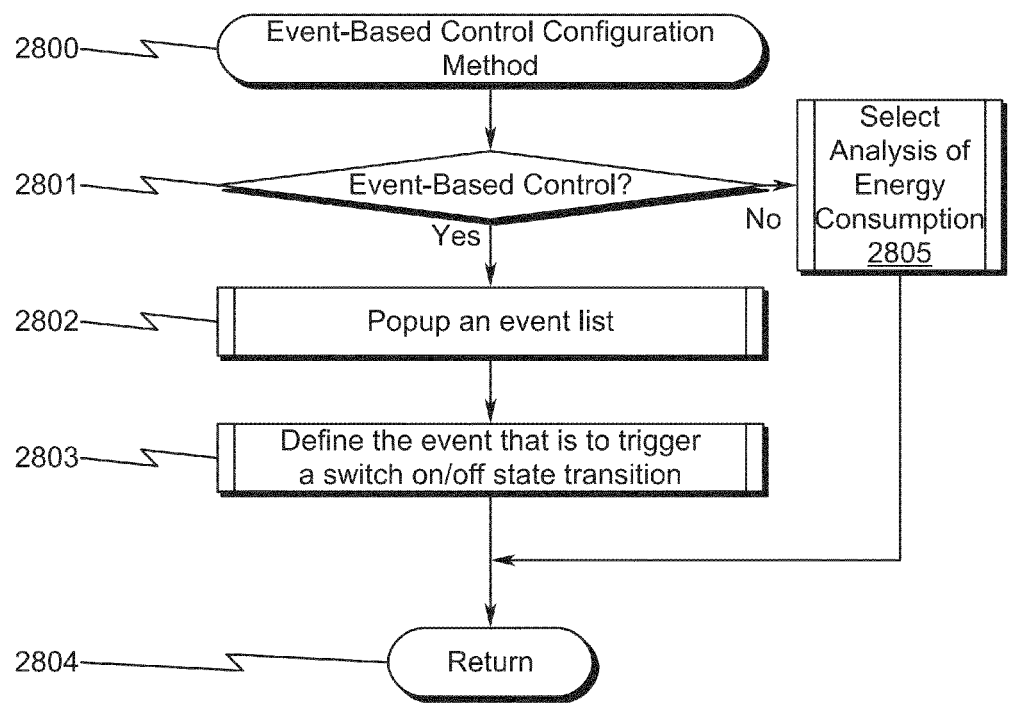
FIG. 28 illustrates an exemplary method flowchart diagram depicting an event-based control configuration method useful in some preferred embodiments of the present invention.

As generally illustrated by the exemplary flowcharts depicted in FIG. 25 (2500)-FIG. 28 (2800), the present invention anticipates that the SGPC will in many preferred embodiments permit power control switching to be configured by a user using a graphical user interface. These switch configuration interfaces may include manual switch scheduling (FIG. 26 (2600)), vampire energy switching (FIG. 27 (2700)), and/or event-based switching (FIG. 28 (2800)). Actual switch control implementation after this configuration process is complete is generally illustrated in FIG. 29 (2900)-FIG. 32 (3200).

Switch Control Execution Method (2900)-(3200)

Figure 29:
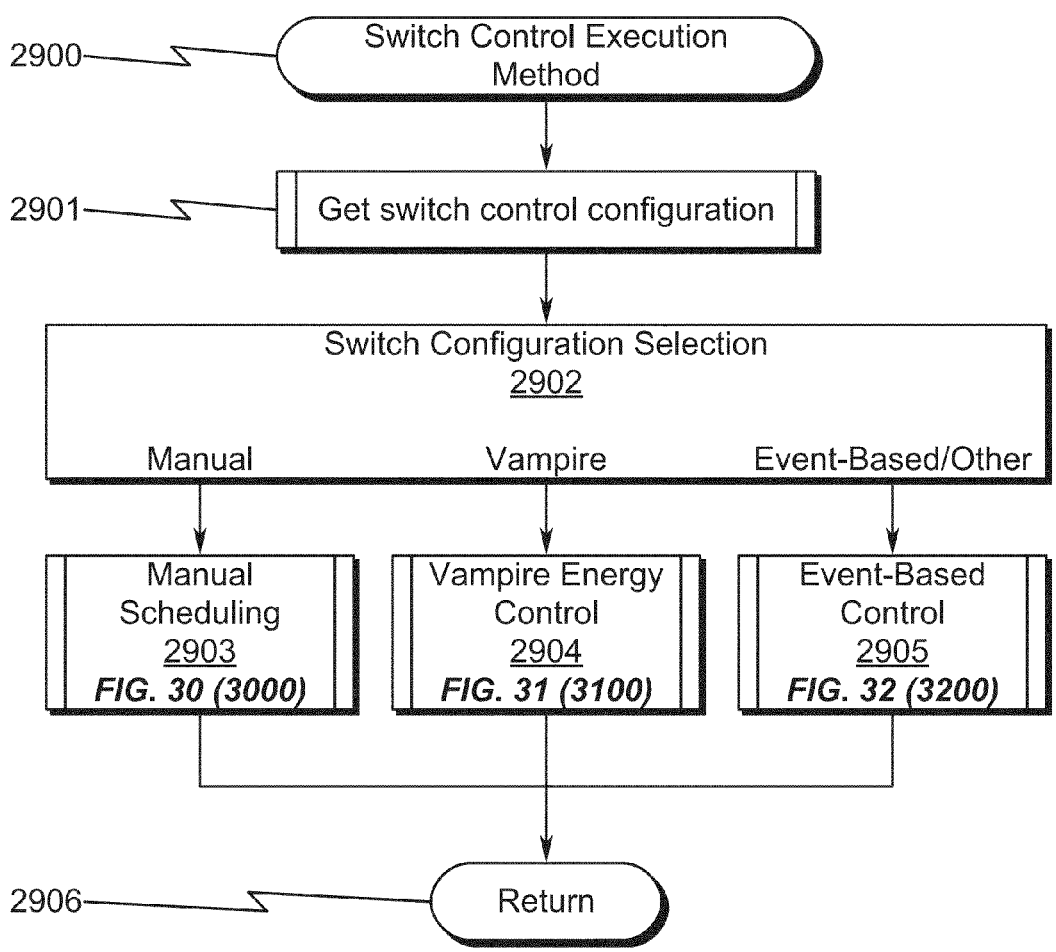
FIG. 29 illustrates an exemplary method flowchart diagram depicting a switch control execution method useful in some preferred embodiments of the present invention.
Figure 30:
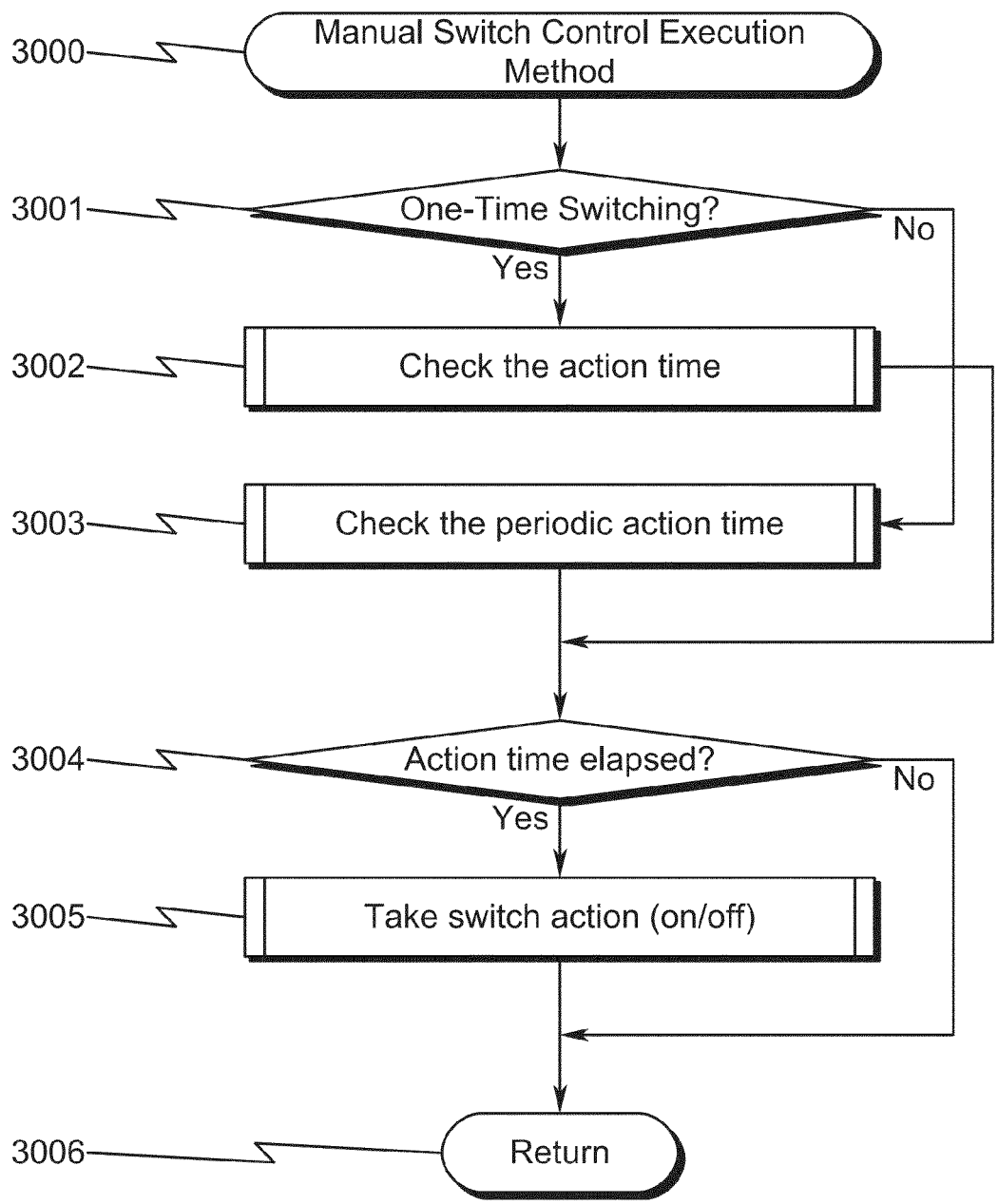
FIG. 30 illustrates an exemplary method flowchart diagram depicting a manual switch control execution method useful in some preferred embodiments of the present invention.
Figure 31:
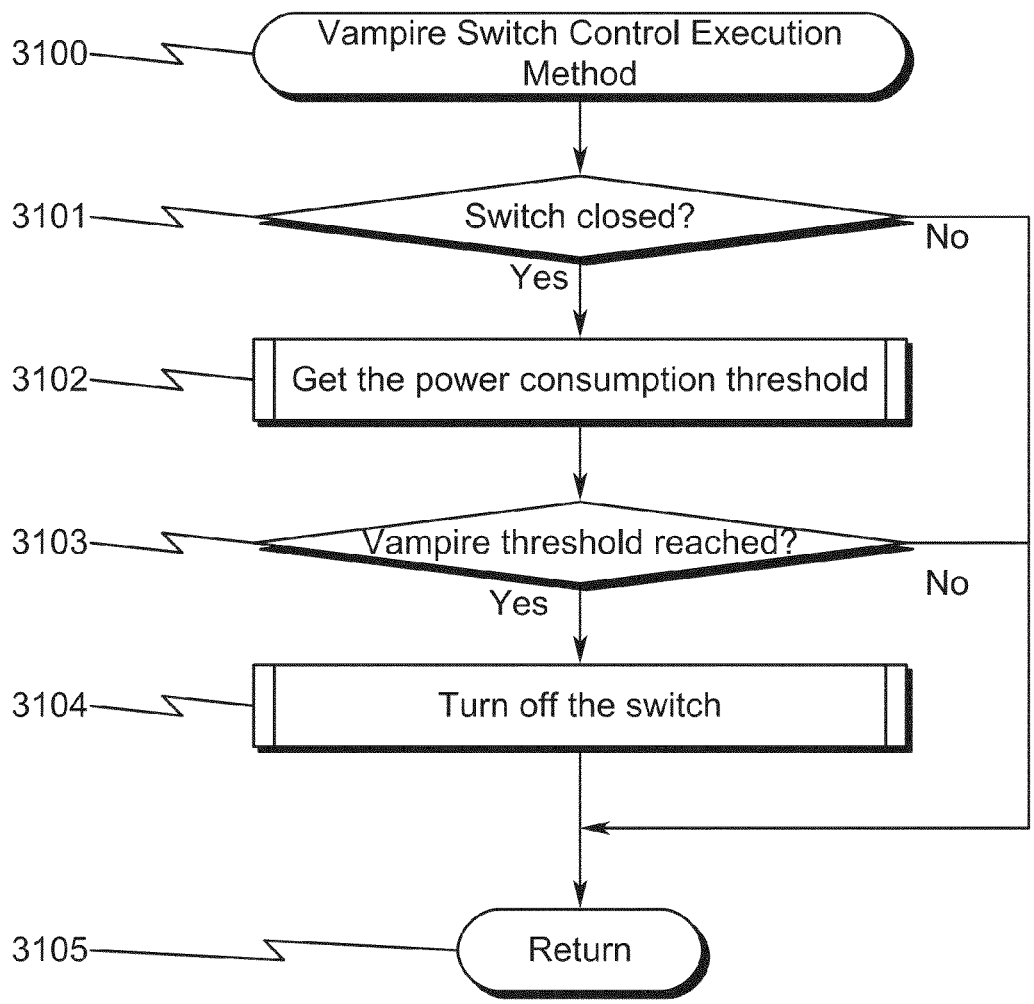
FIG. 31 illustrates an exemplary method flowchart diagram depicting a vampire switch control execution method useful in some preferred embodiments of the present invention.
Figure 32:
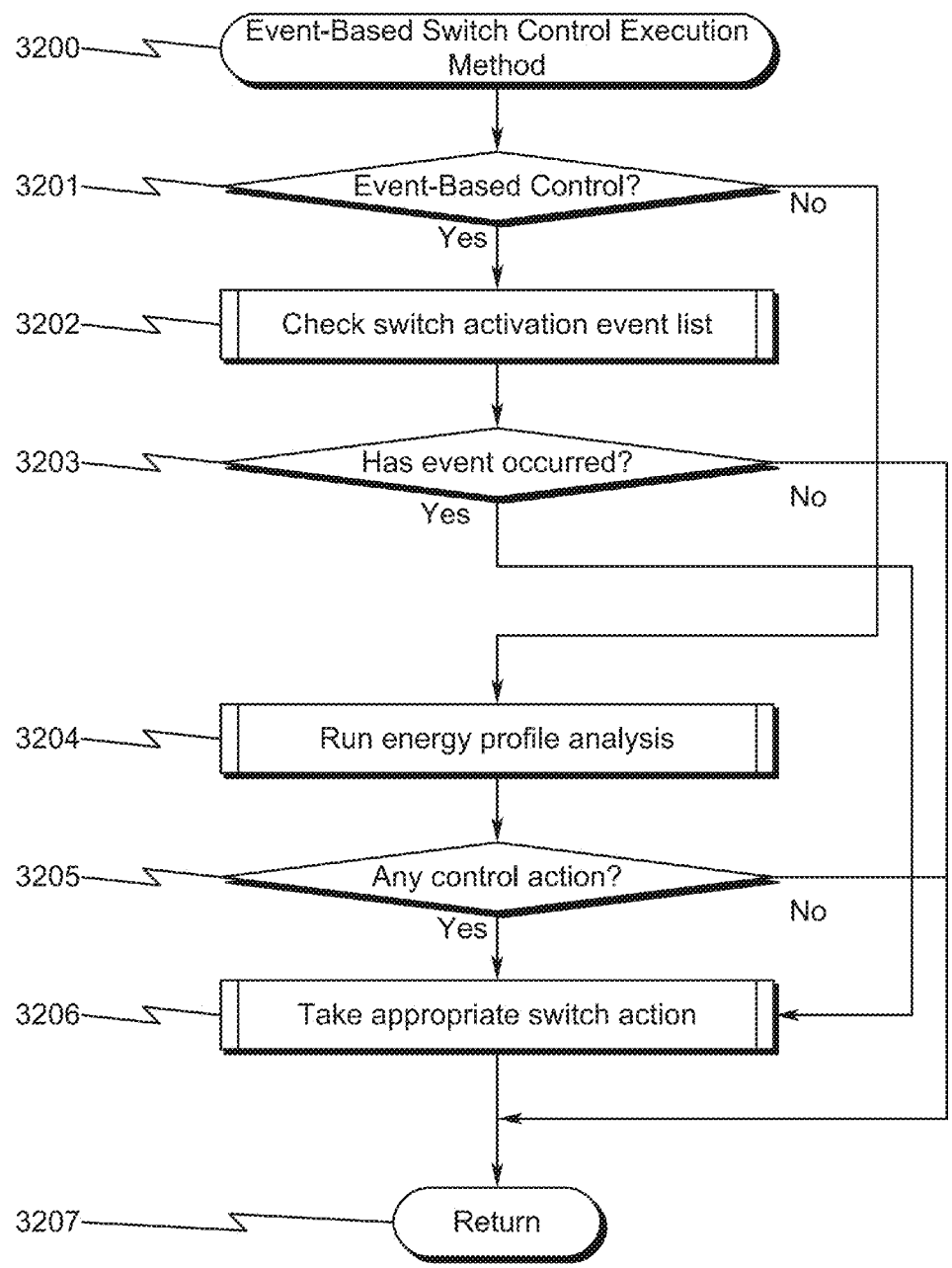
FIG. 32 illustrates an exemplary method flowchart diagram depicting an event-based switch control execution method useful in some preferred embodiments of the present invention.

As generally illustrated by the exemplary flowcharts depicted in FIG. 29 (2900)-FIG. 32 (3200), the present invention, anticipates that the SGPC will in many preferred embodiments execute power control switching to support manual switch scheduling (FIG. 30 (3000)), vampire energy control (FIG. 31 (3100)), and/or event-based switching control (FIG. 32 (3200)). Associated configuration methodologies associated with these switch control execution flows are generally illustrated by the flowcharts in FIG. 25 (2500)-FIG. 28 (2800).

Energy Analysis Configuration Method (3300)

Figure 33:
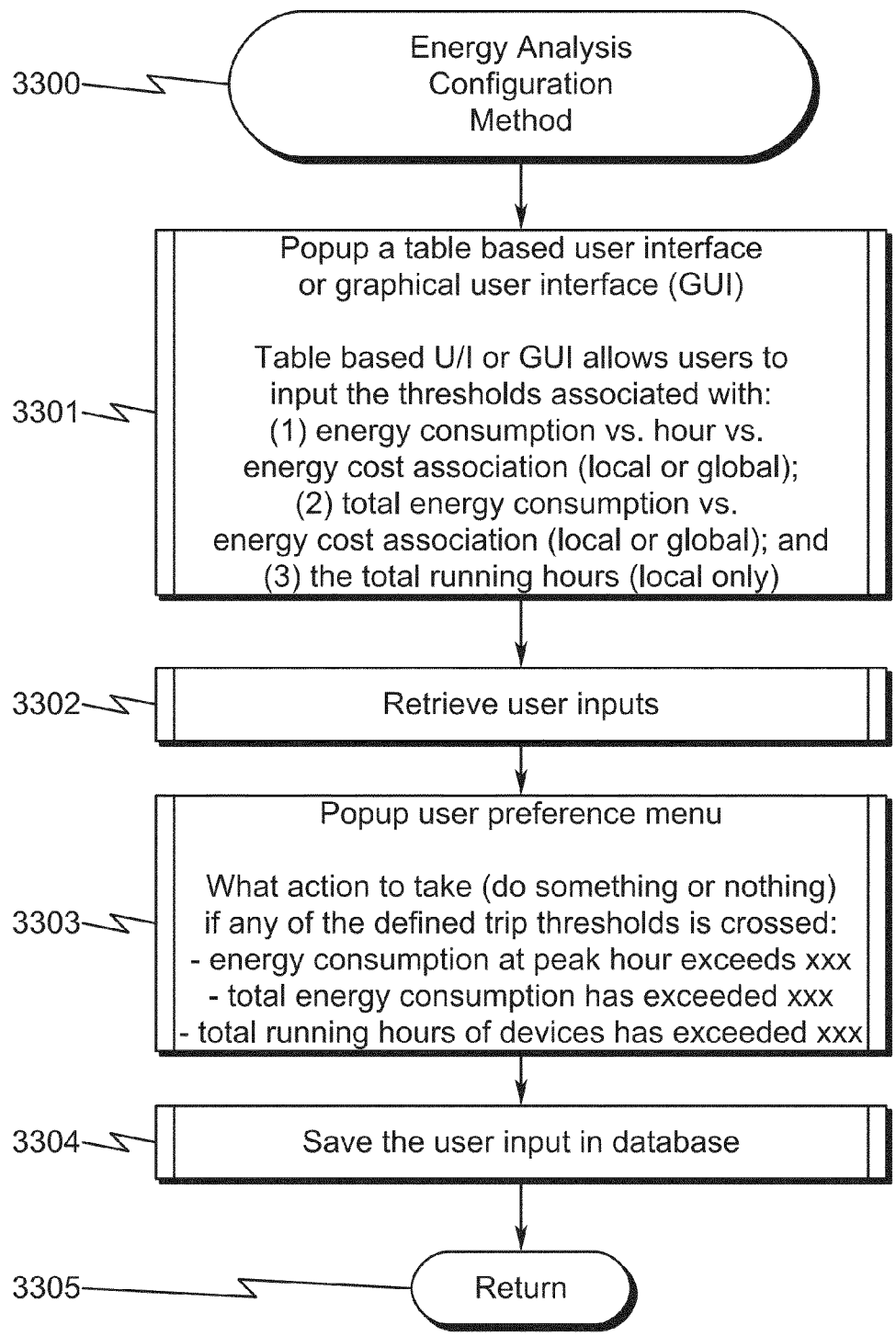
FIG. 33 illustrates an exemplary method flowchart diagram depicting an energy analysis configuration method useful in some preferred embodiments of the present invention.

As generally illustrated by the exemplary flowchart depicted in FIG. 33 (3300), the present invention anticipates that the SGPC will in many preferred embodiments present a user interface to permit selection of a wide variety of energy analysis functions to be performed on a given, switched load. The exemplary flowchart, in FIG. 33 (3300) presents an exemplary configuration methodology for these energy analysis functions.

Energy Profile Analysis Method (3400)

Figure 34:
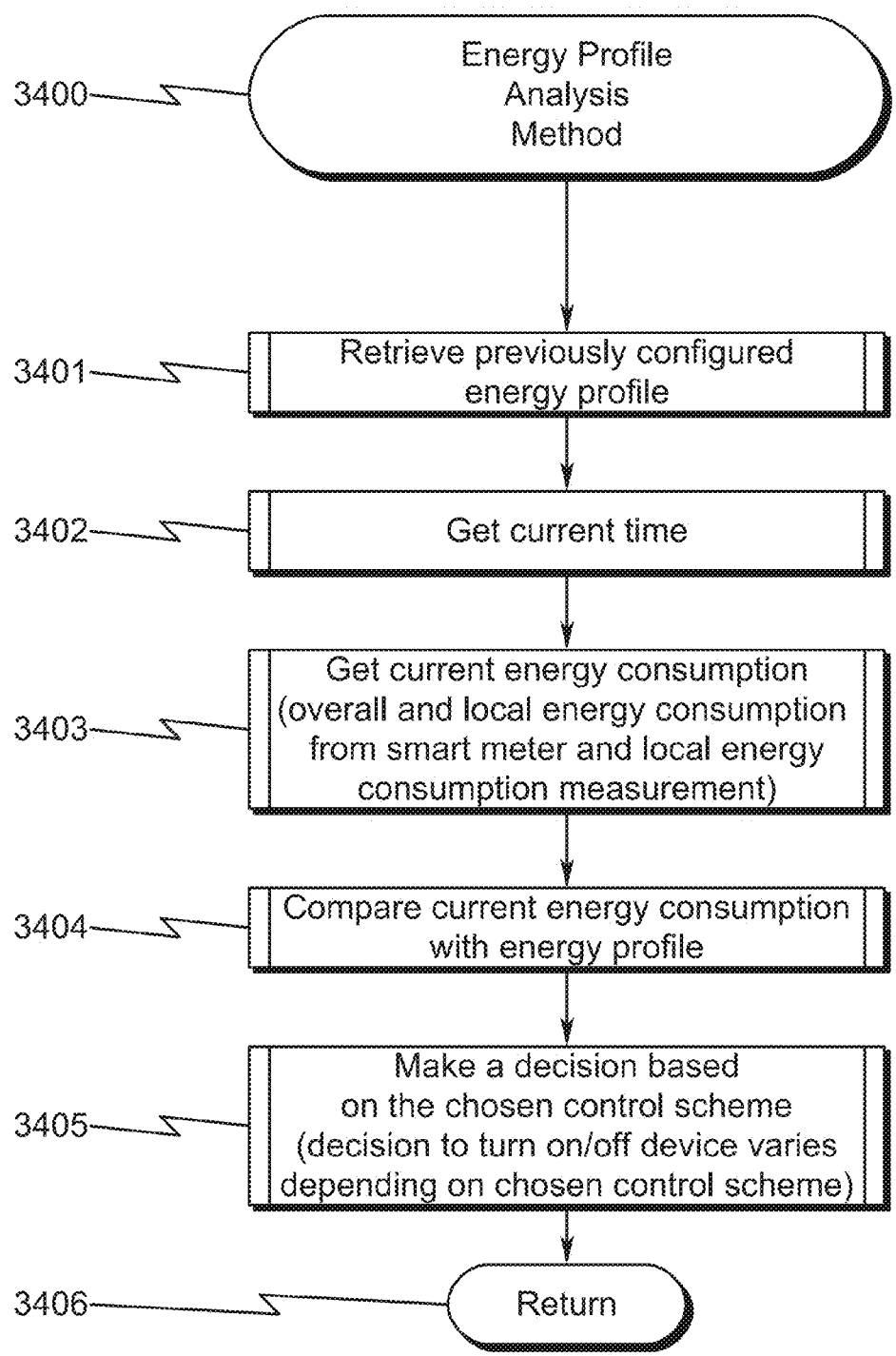
FIG. 34 illustrates an exemplary method flowchart diagram depicting an energy profile analysis method useful in some preferred embodiments of the present invention.

As generally illustrated by the exemplary flowchart depicted in FIG. 34 (3400), the present invention anticipates that the SGPC will in many preferred embodiments permit execution of a wide variety of energy analysis functions to be performed on a given switched load. The exemplary flowchart in FIG. 34 (3400) presents an exemplary energy measurement and reporting methodology for these energy analysis functions.

Communication Methods (3500)-(4000)

Figure 35:
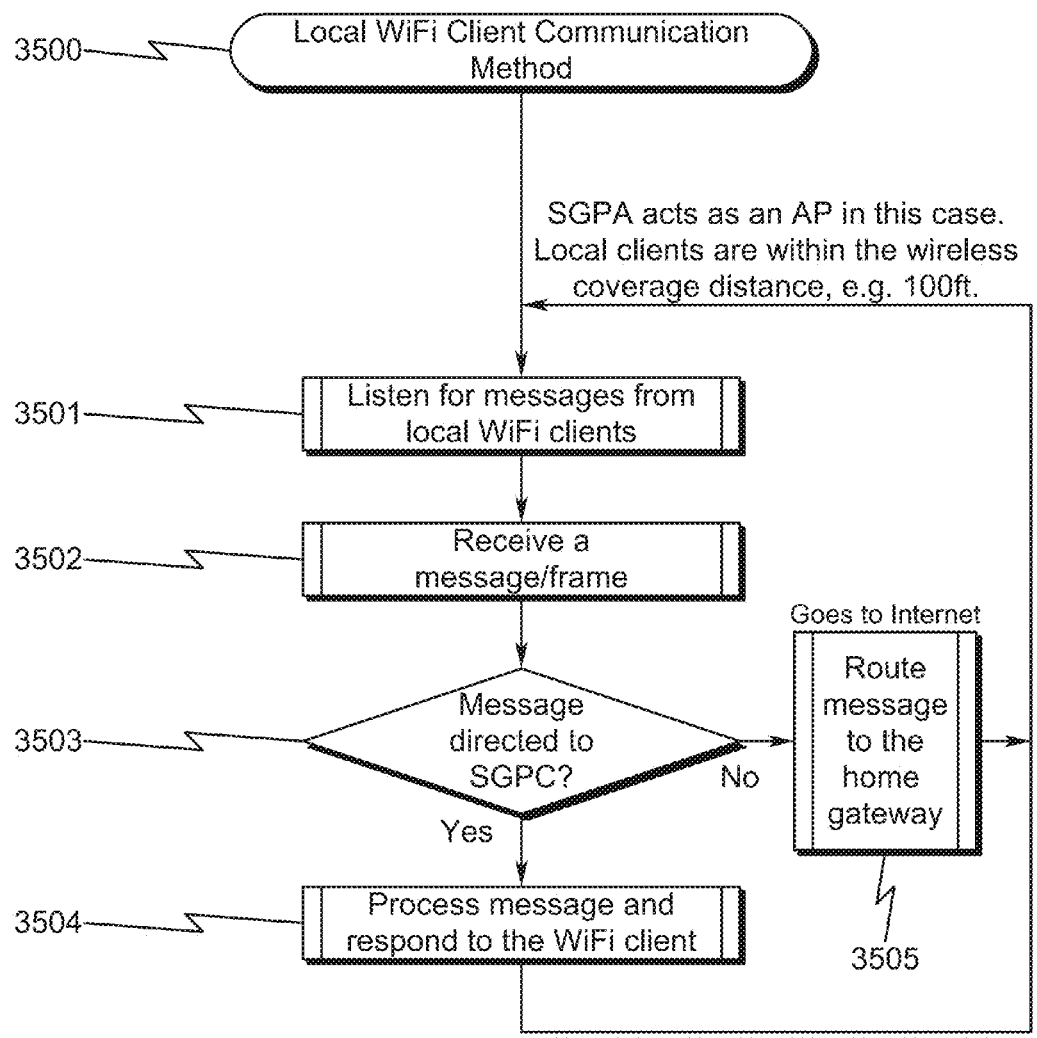
FIG. 35 illustrates an exemplary method flowchart diagram depicting a local. WiFi client communication method useful in some preferred embodiments of the present invention.
Figure 36:
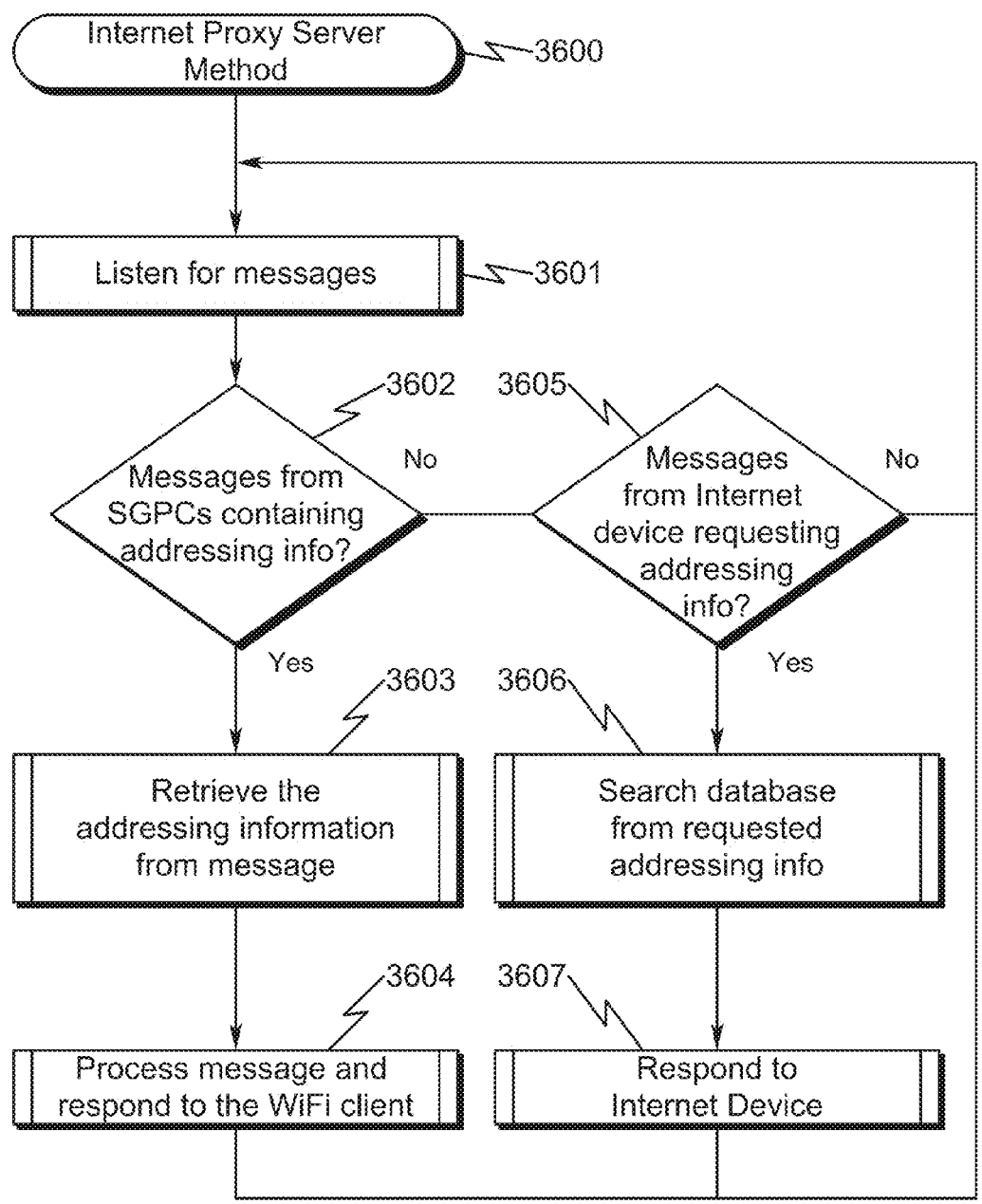
FIG. 36 illustrates an exemplary method flowchart diagram depicting an Internet proxy server method useful in some preferred embodiments of the present invention.
Figure 37:
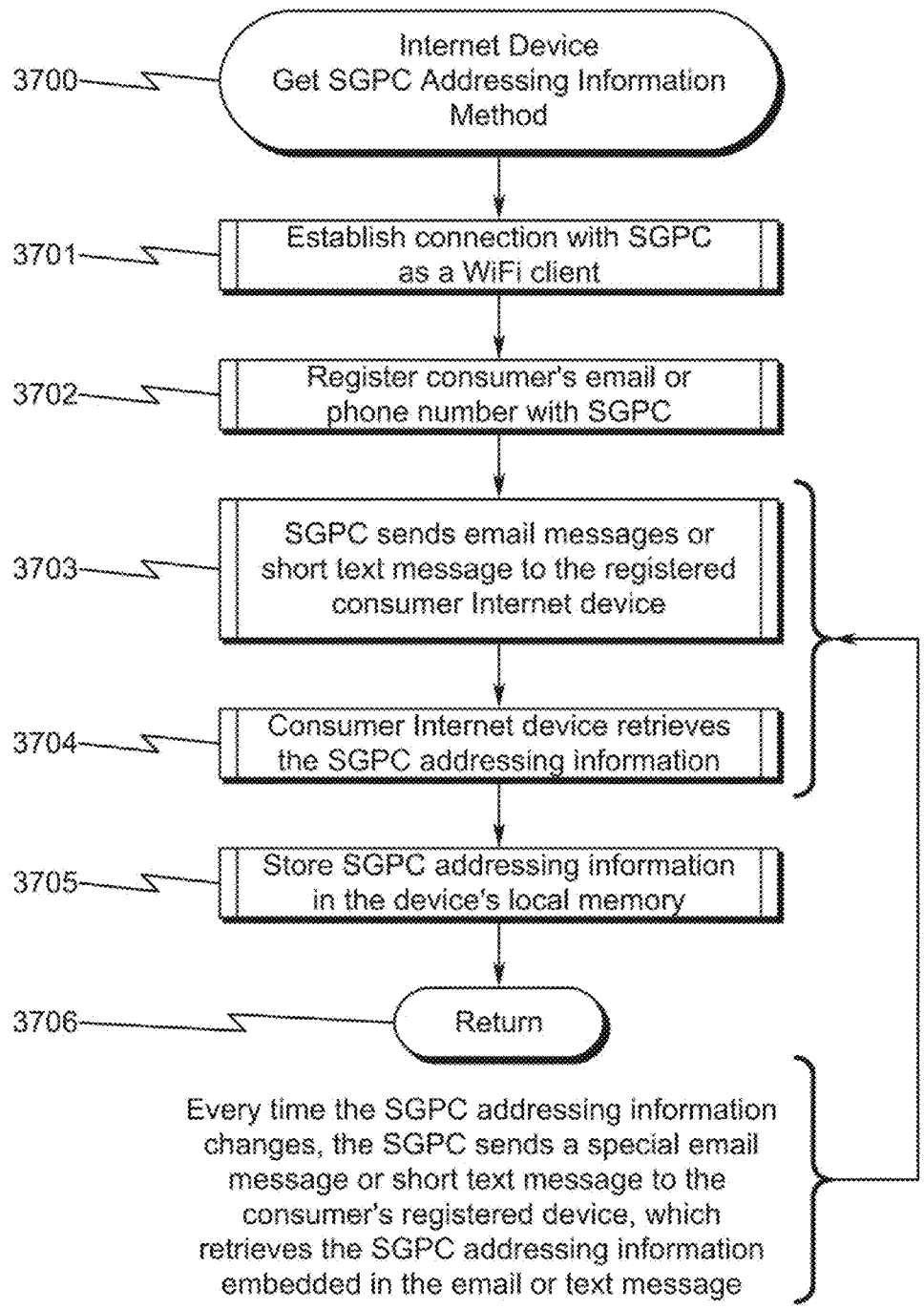
FIG. 37 illustrates an exemplary method flowchart diagram depicting an Internet device get SGPC addressing information method useful in some preferred embodiments of the present invention.
Figure 38:
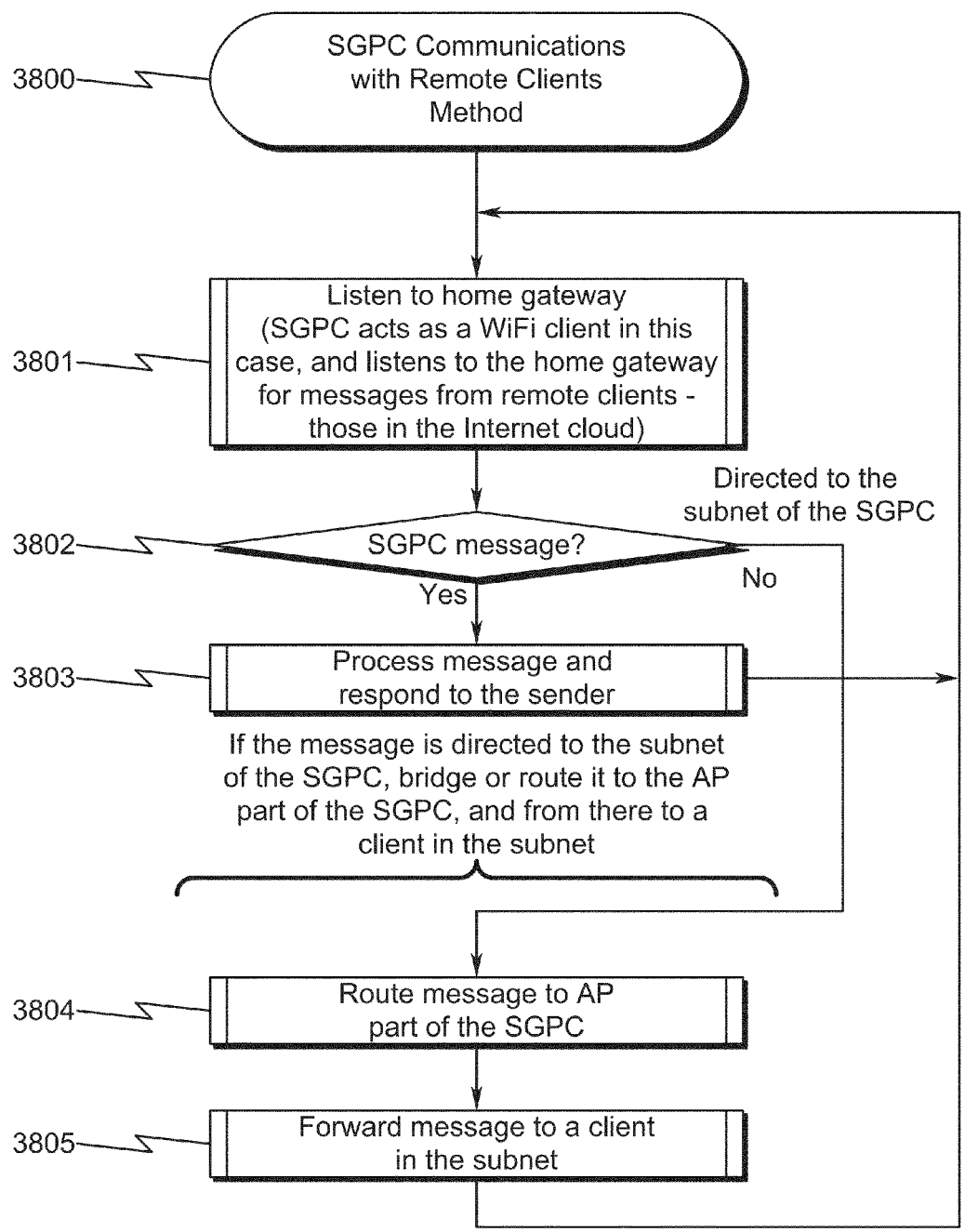
FIG. 38 illustrates an exemplary method flowchart diagram depicting a SGPC communications with remote clients method useful in some preferred embodiments of the present invention.
Figure 39:
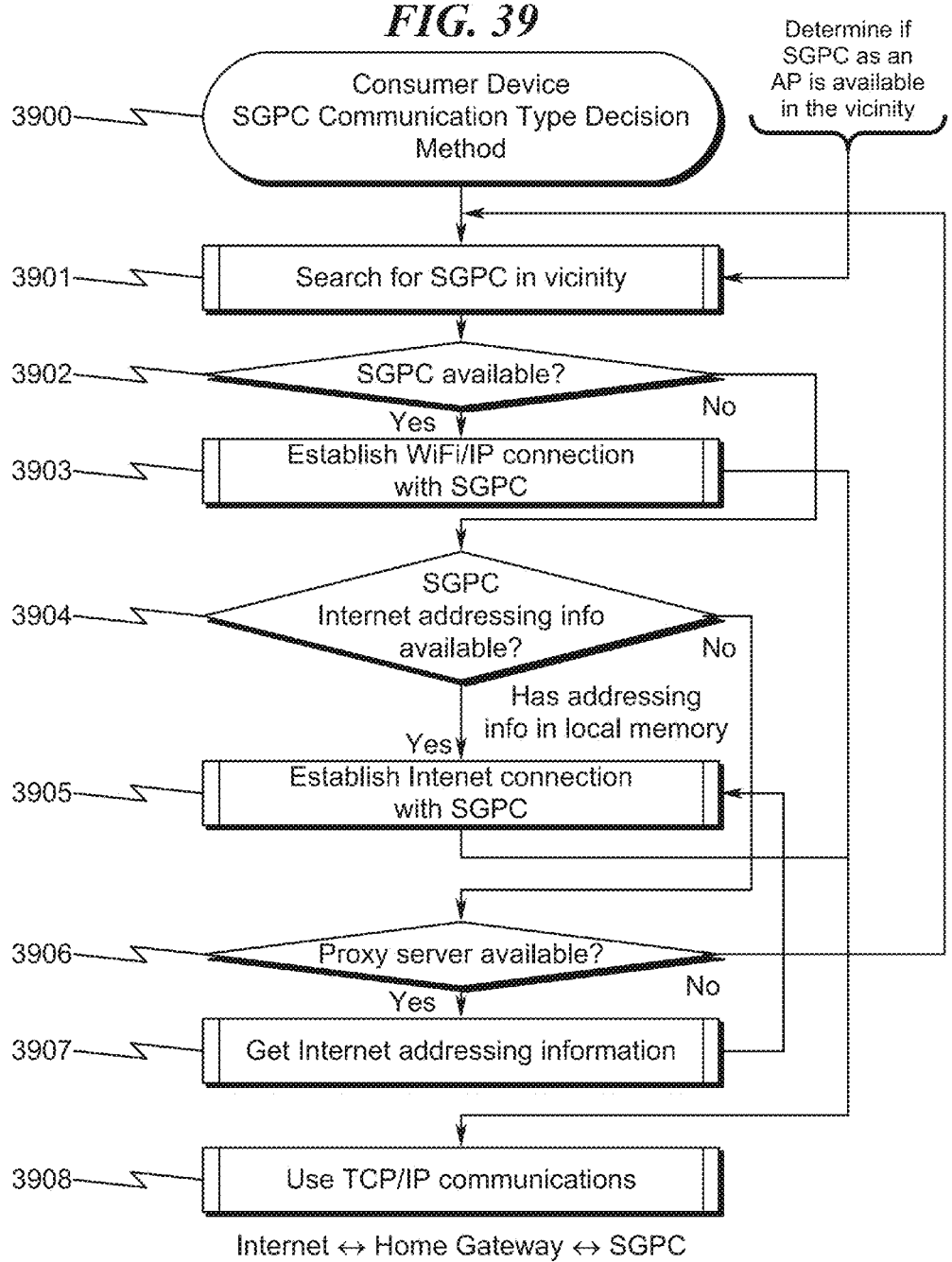
FIG. 39 illustrates an exemplary method flowchart diagram depicting a consumer device SGPC communication type decision tree method useful in some preferred embodiments of the present invention.
Figure 40:
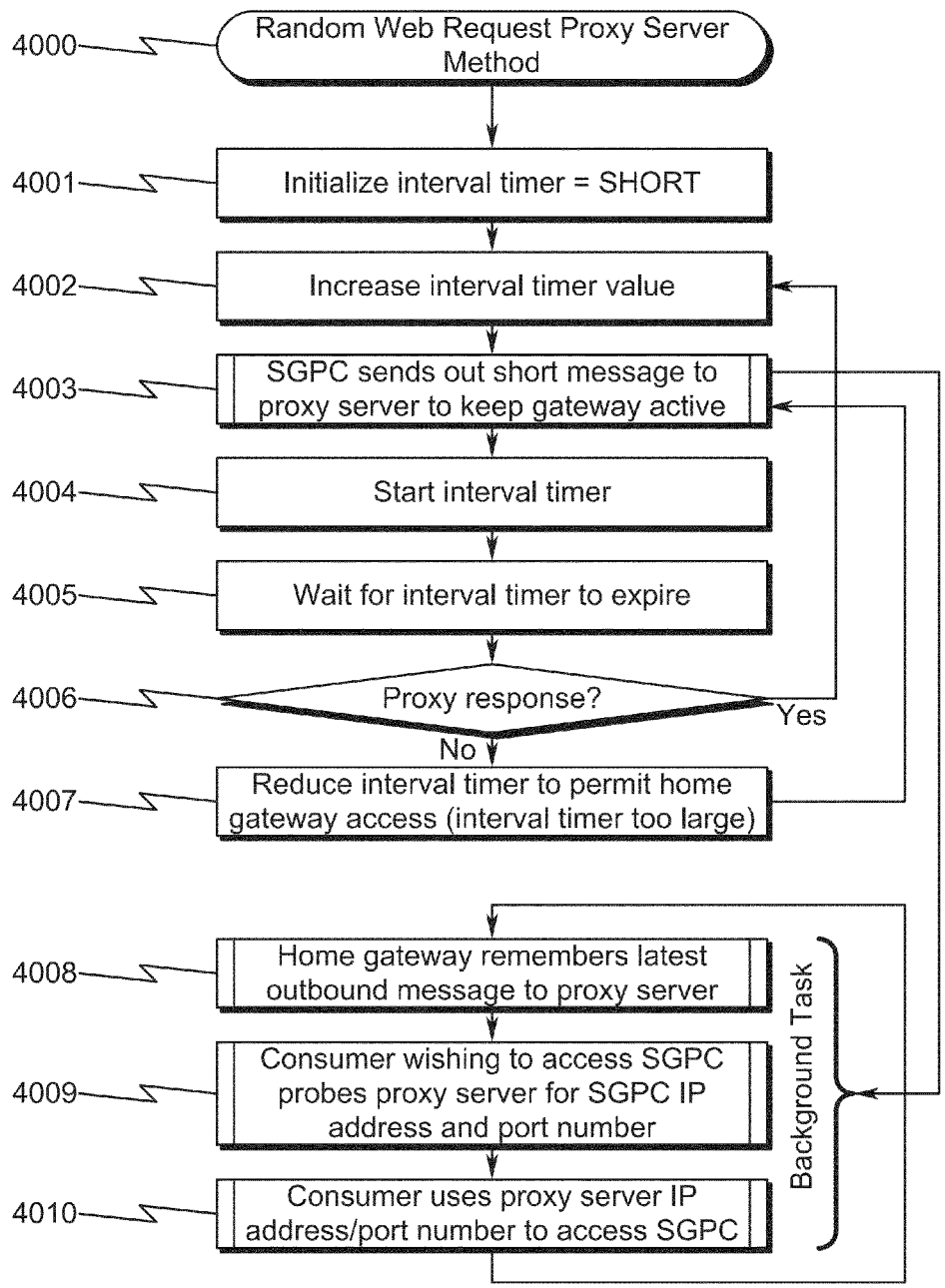
FIG. 40 illustrates an exemplary method flowchart diagram depicting a random web request proxy server method useful in some preferred embodiments of the present invention.

As generally illustrated by the exemplary flowcharts depicted in FIG. 35 (3500)-FIG. 40 (4000), the present invention anticipates that the SGPC will in many preferred embodiments incorporated a variety of communication methodologies and protocols to enable the SGPC to "bridge" Internet and local home automation networks. FIG. 35 (3500) illustrates an exemplary flowchart depicting a local WiFi communication method to permit message routing in a SGPC network. FIG. 36 (3600) illustrates an exemplary flowchart depicting an Internet proxy server method to permit message integration and routing external to a SGPC network. FIG. 37 (3700) illustrates an exemplary flowchart depicting an addressing update method to address updating of devices external to a SGPC network. FIG. 38 (3800) illustrates an exemplary flowchart depicting SGPC message routing method. FIG. 39 (3900) illustrates an exemplary flowchart depicting a communication decision tree method to select the appropriate message transport methodology within the SGPC network.

Exemplary Random Web Request Proxy Server Method (4000)

The present invention anticipates the use of a methodology to permit a proxy server to remain connected with a SGPC within a home automation network that is located within a home gateway. This configuration permits random web requests to pierce the home gateway firewall using information provided by the SGPC and maintained on the web proxy server. As generally illustrated by the flowchart in FIG. 40 (4000), this preferred exemplary proxy server method embodiment can be generalized comprising the following steps:
- (1) Initializing an interval timer value to a SHORT timespan (4001);
- (2) Increasing the interval timer value (4002);
- (3) Sending a short message from the SGPC to the proxy server through the home gateway (4003);
- (4) Starting the interval timer (4004);
- (5) Waiting for the interval timer to expire (4005);
- (6) If a proxy response has been received, proceeding to step (2) (4006);
- (7) Otherwise, reducing the interval timer value to permit the home gateway to maintain contact with the proxy server, and proceeding to step (3) (4007);
- (8) In a background task, allowing the home gateway to remember the latest outbound message to the proxy server from the SGPC (this maintains an active link between the SGPC and the proxy server through the home gateway) (4008);
- (9) Consumers wishing to access the SGPC probes the proxy server for the currently active SGPC IP address and port number (4009);
- (10) Consumers utilize the currently active SGPC IP address/port number from the proxy server to access the SGPC through the home network interface (4010); and
- (11) Proceeding to step (8) in the background task.

One skilled in the art will, recognize that these method steps may be augmented or rearranged without limiting the teaching's of the present invention. This general method summary may be augmented by the various elements described herein to produce a wide variety of invention embodiments consistent with this overall, design description.

Exemplary Graphical User Interface (GUI) (4100)-(4700)

Figure 41:
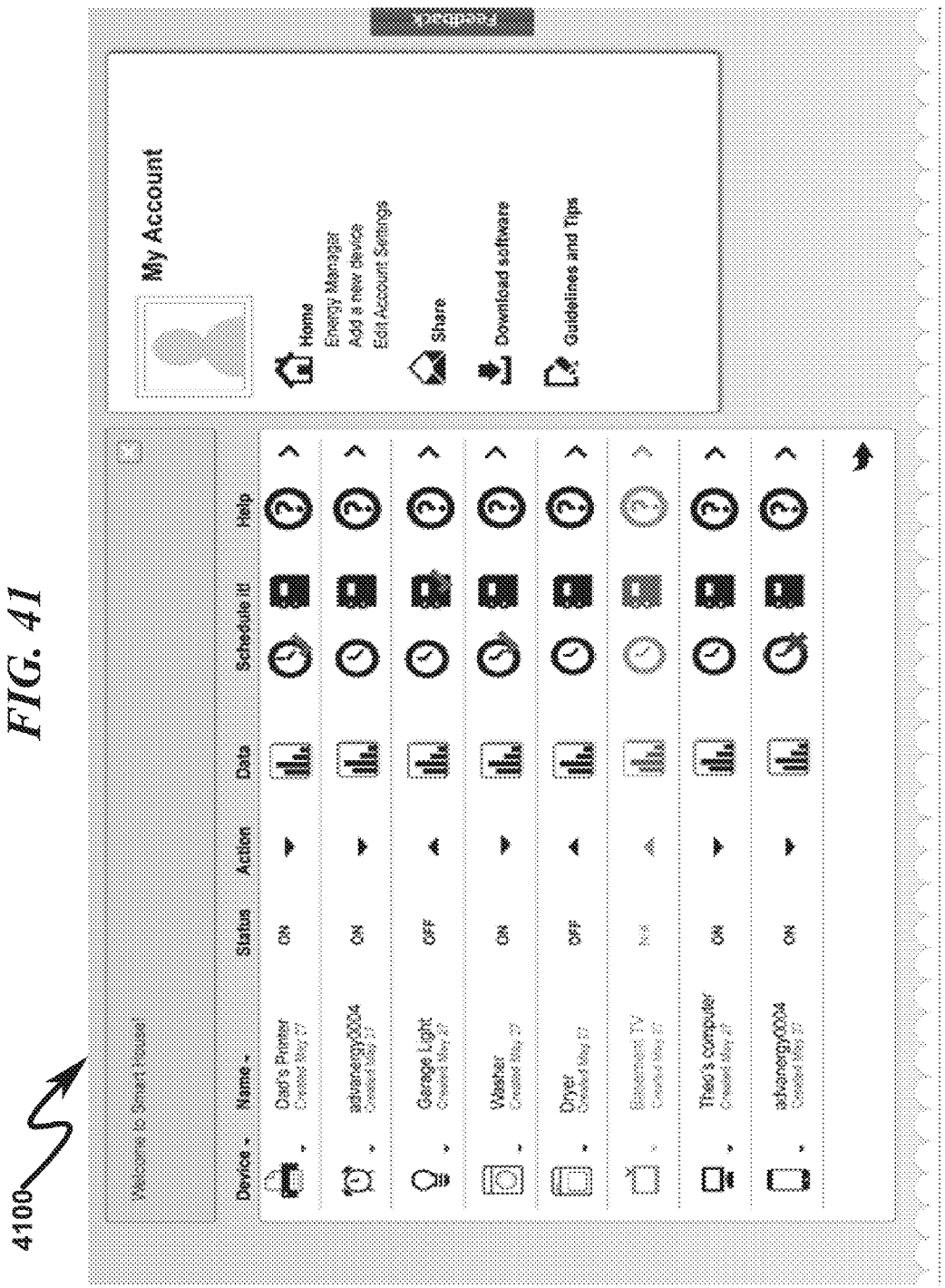
FIG. 41 illustrates an exemplary status screen and configuration dialog useful in some preferred embodiments of the present invention.
Figure 42:
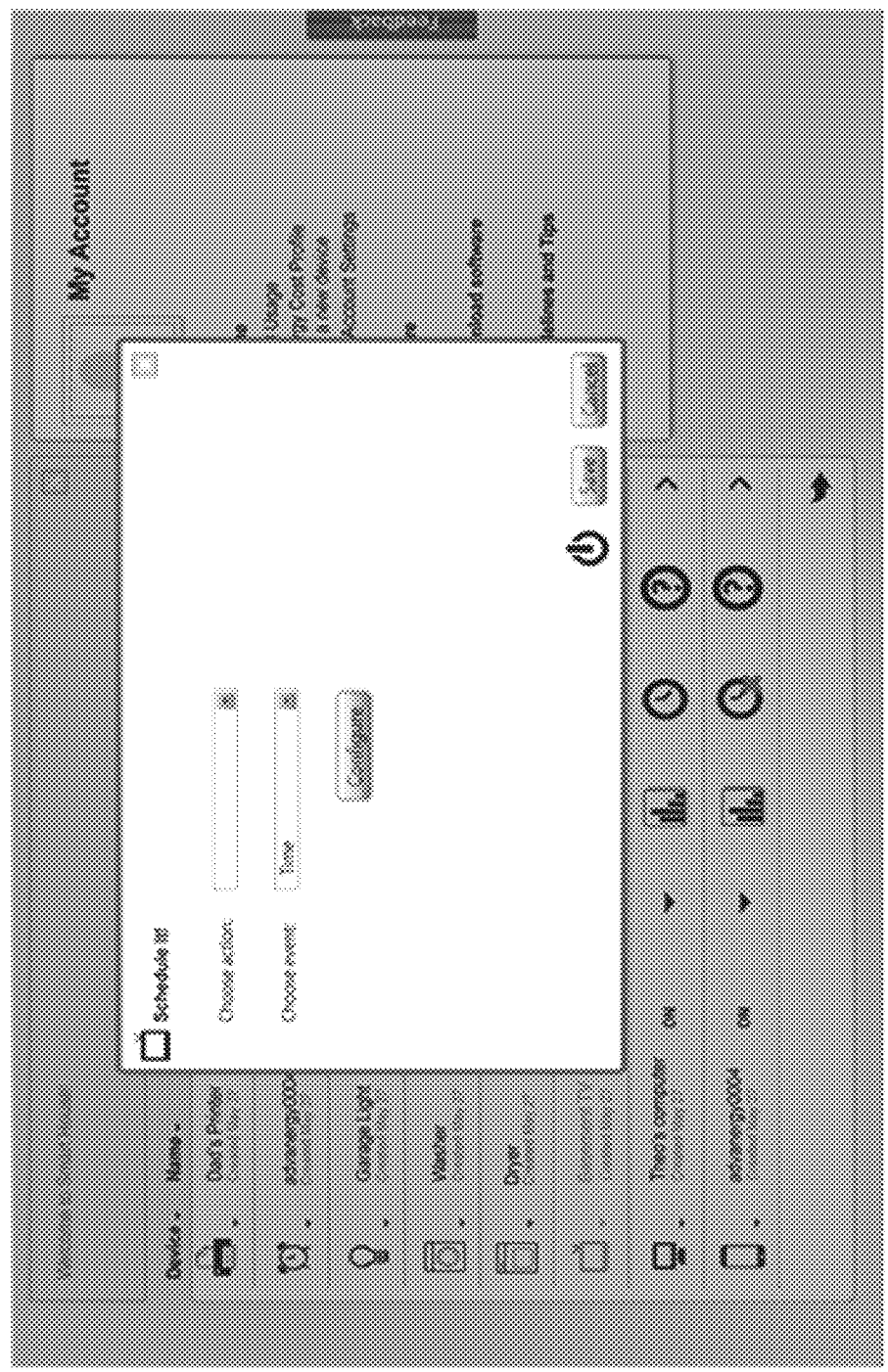
FIG. 42 illustrates an exemplary switch action/event scheduling configuration dialog useful in some preferred embodiments of the present invention.
Figure 43:
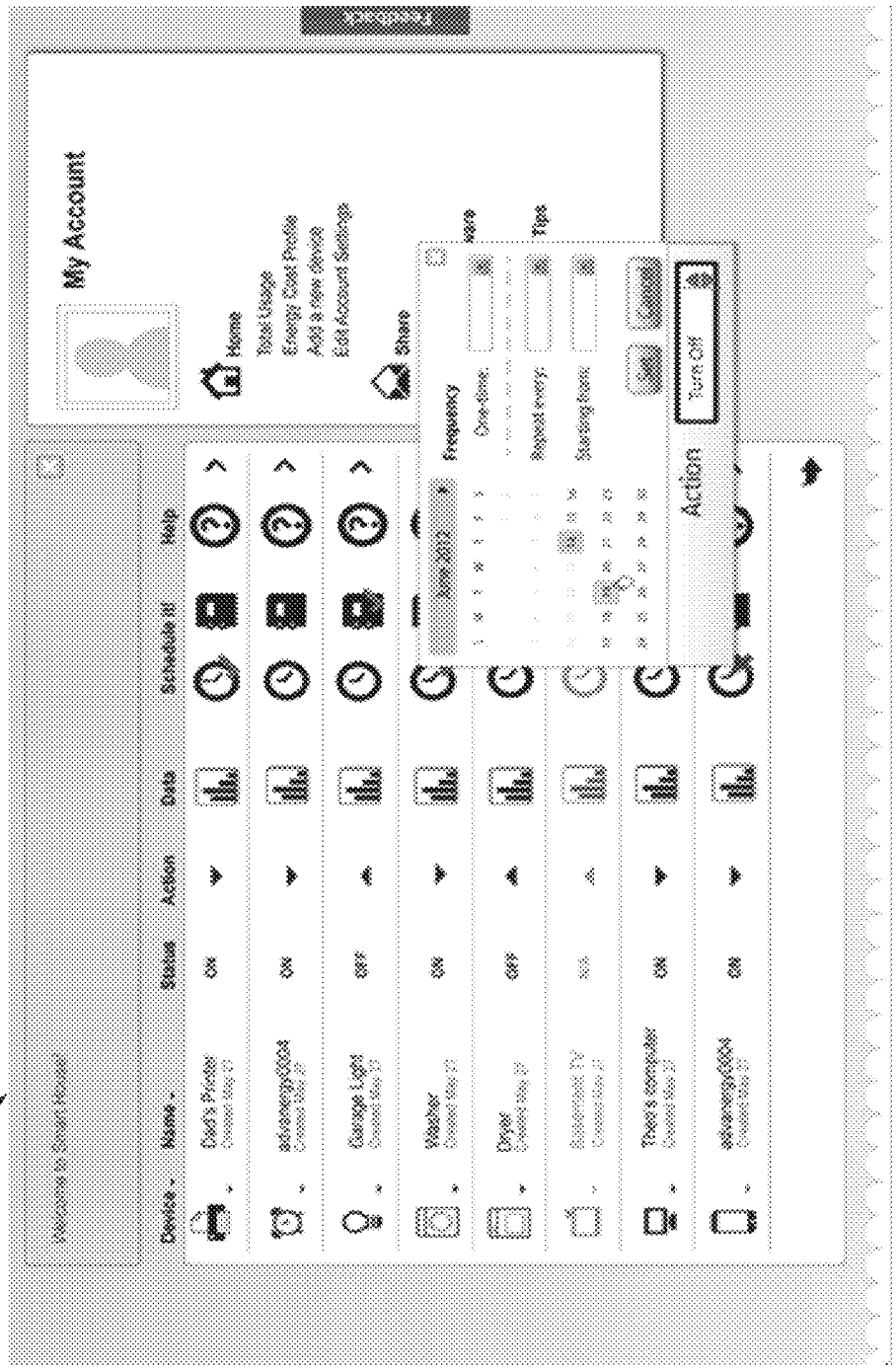
FIG. 43 illustrates an exemplary calendar based switch action/event scheduling configuration dialog useful in some preferred embodiments of the present invention.
Figure 44:
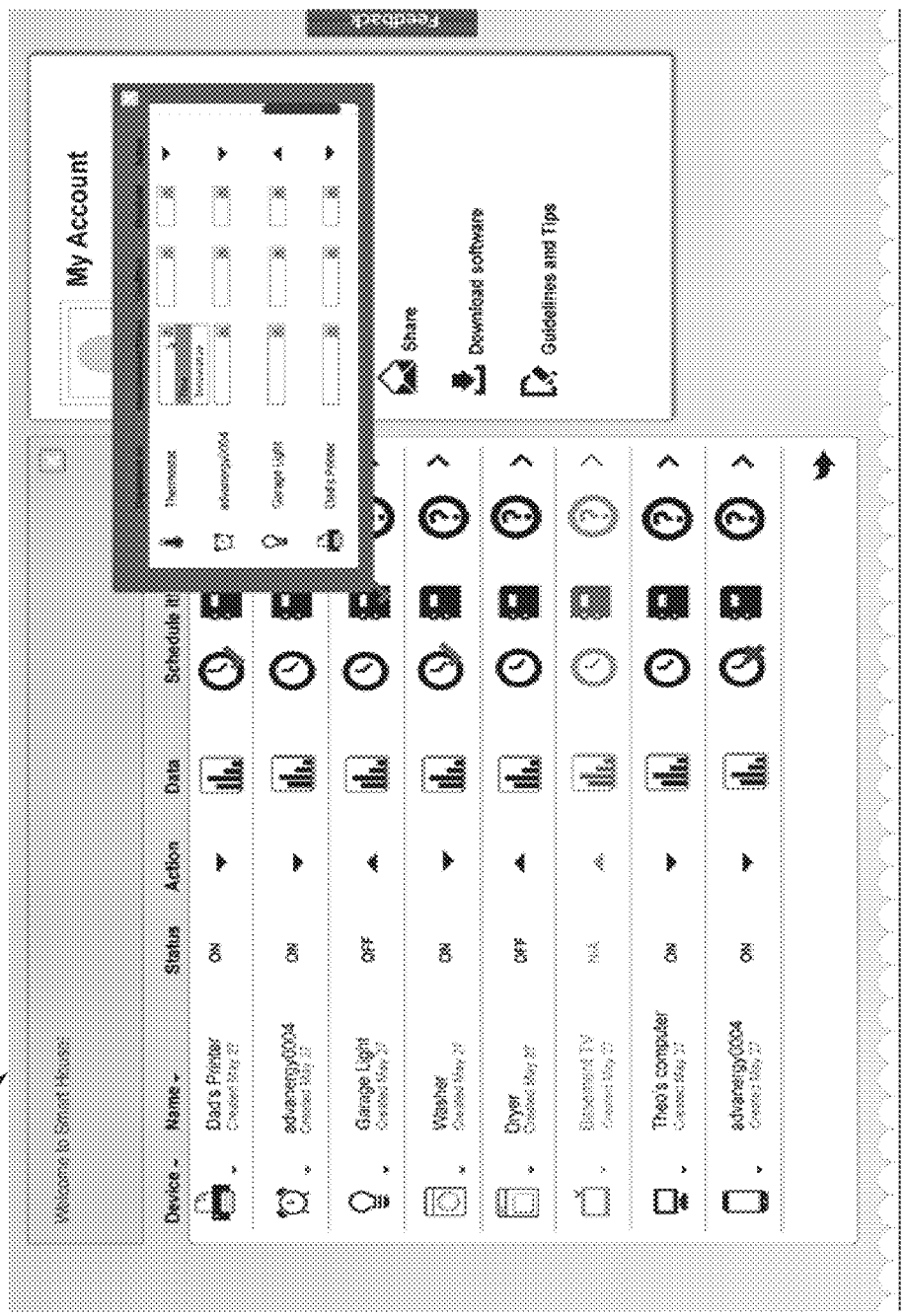
FIG. 44 illustrates an exemplary control scheduling dialog useful in some preferred embodiments of the present invention.
Figure 45:
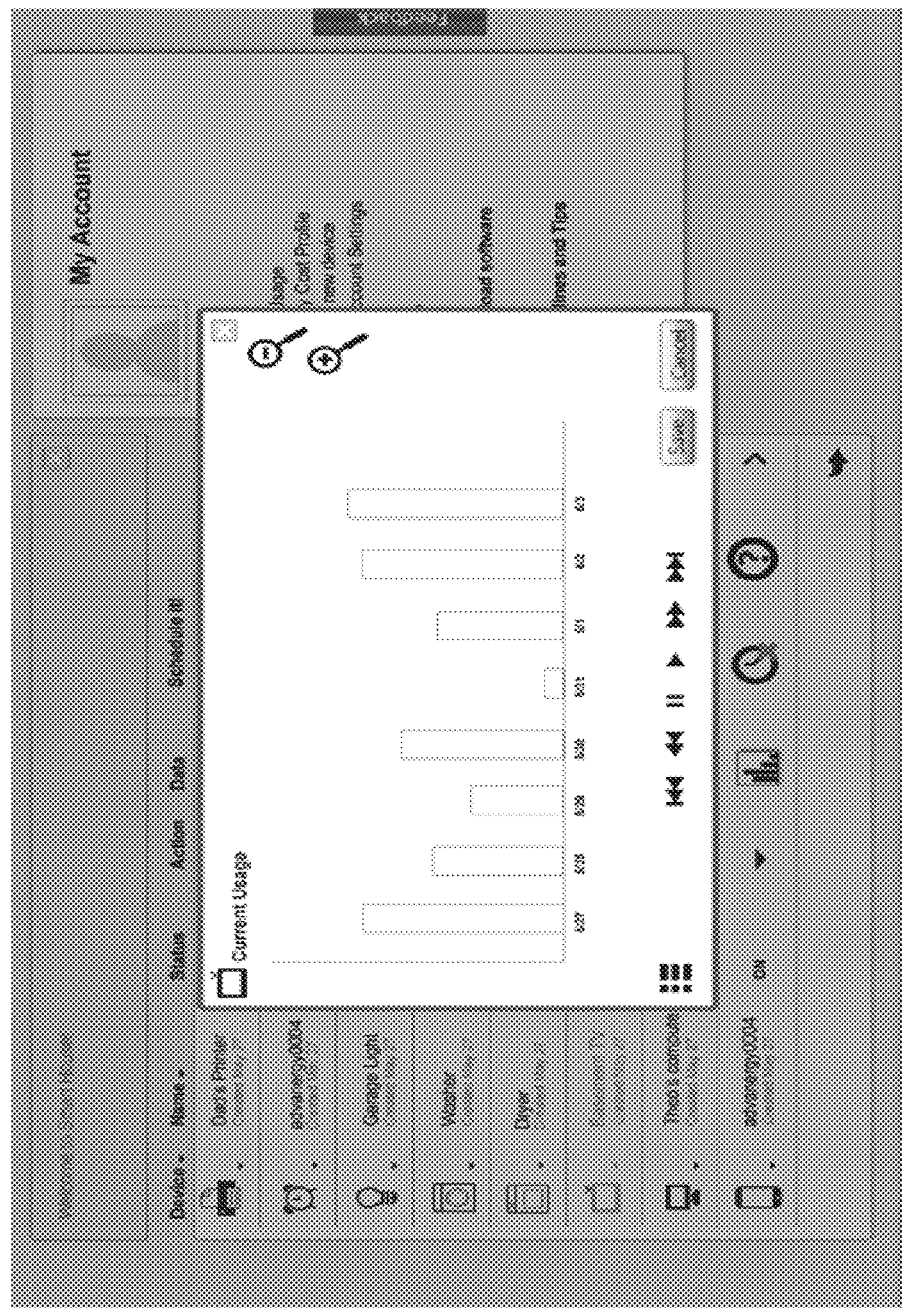
FIG. 45 illustrates an exemplary energy consumption status dialog useful in some preferred embodiments of the present invention.

While the present invention may be embodied using a wide variety of graphical user interface (GUT) methodologies, several preferred. GUIs are generally illustrated in FIG. 41 (4100)-FIG. 47 (4700). These exemplary screen dialog interfaces may be generally described as follows:
FIG. 41 (4100) illustrates a typical SGPC web page user interface that permits users to monitor status and configure the SGPC. As can be seen in this GUI dialog, the devices controlled by the SGPC may be represented by graphical icons, given identifying names, be provided a real-time status indicator, be available for on/off switch activation or scheduling, and be associated with real-time power consumption curves. On the right hand side of the dialog box a house wide information and setup configuration controls. The "download software" icon allows consumers to download software to their devices. The "Guidelines and Tips" icon opens a window that makes suggestions on energy usage. The "Edit Account Setting" icon allows password changes, etc. The "Add A New Device" icon allows adding devices from a list of all the available SGPC controlled devices to the list on the left of the GUI. A user may or may not want to put all SGPC controlled devices on the GUI. When adding a new device, the user may assign a name and an icon to the device, as shown in the FIG. 41 (4100). The "Share" and "Energy Manager" icons are discussed below. On the left hand side of the dialog screen associated with each device are buttons which allow control, setup, and monitoring of the device. Some of the buttons are self-explanatory. "Action" brings the device down or up depending on the direction of the arrow. "Help" pops up a window providing information on the device. The "Data" and "Schedule It!" icons are discussed below.
FIG. 42 (4200) generally illustrates an exemplary switch action/event scheduling configuration dialog used to trigger power control switching events. This dialog is a general entrypoint to the more detailed calendar event scheduling dialog of FIG. 43 (4300).
FIG. 43 (4300) generally illustrates an exemplary calendar based switch action/event scheduling configuration dialog used to trigger power control switching events. Selecting the clock icon under Schedule It! Invokes this dialog screen. This permits the user to set a one-time schedule or periodic schedule switching event. Once the schedule has been set, the action associated with the schedule can be selected from a menu.
FIG. 43 (4300) generally illustrates an exemplary device configuration dialog used to configure switched devices and monitor switch triggering events/sensors. Selecting the event icon button (the notebook symbol) associated with a SGPC controlled device (for example, a printer) activates this dialog screen. In this window the user may associate the dependencies between the devices (i.e., a printer) (and their measurements/status) and the SGPC controller. For example, the user may choose "Thermostat", and its "temperature" measurement, define a condition from a list of predefined conditions, for example, "greater or equal", define a threshold, for example, "98 degrees", and finally, define an action, say, "down off". Therefore, in this example, the printer will turn off, if the thermostat's measured temperature is greater or equal to 98 degrees. Note that this popup also allows an action to be associated with a status change. The dependent devices (the thermostat for example) may also be part of the devices listed on the main GUI page.
FIG. 45 (4500) illustrates an exemplary energy consumption status dialog that is used to monitor the current energy consumption of a switched device. Selecting the "Data" icon displays this dialog and generally displays energy consumption at some scale, permitting the user to select zoom-in and zoom-out buttons to see data at finer scale, for example, hours and minutes, and allowing the user to move right and left to see data in different time frames.

Figure 46:
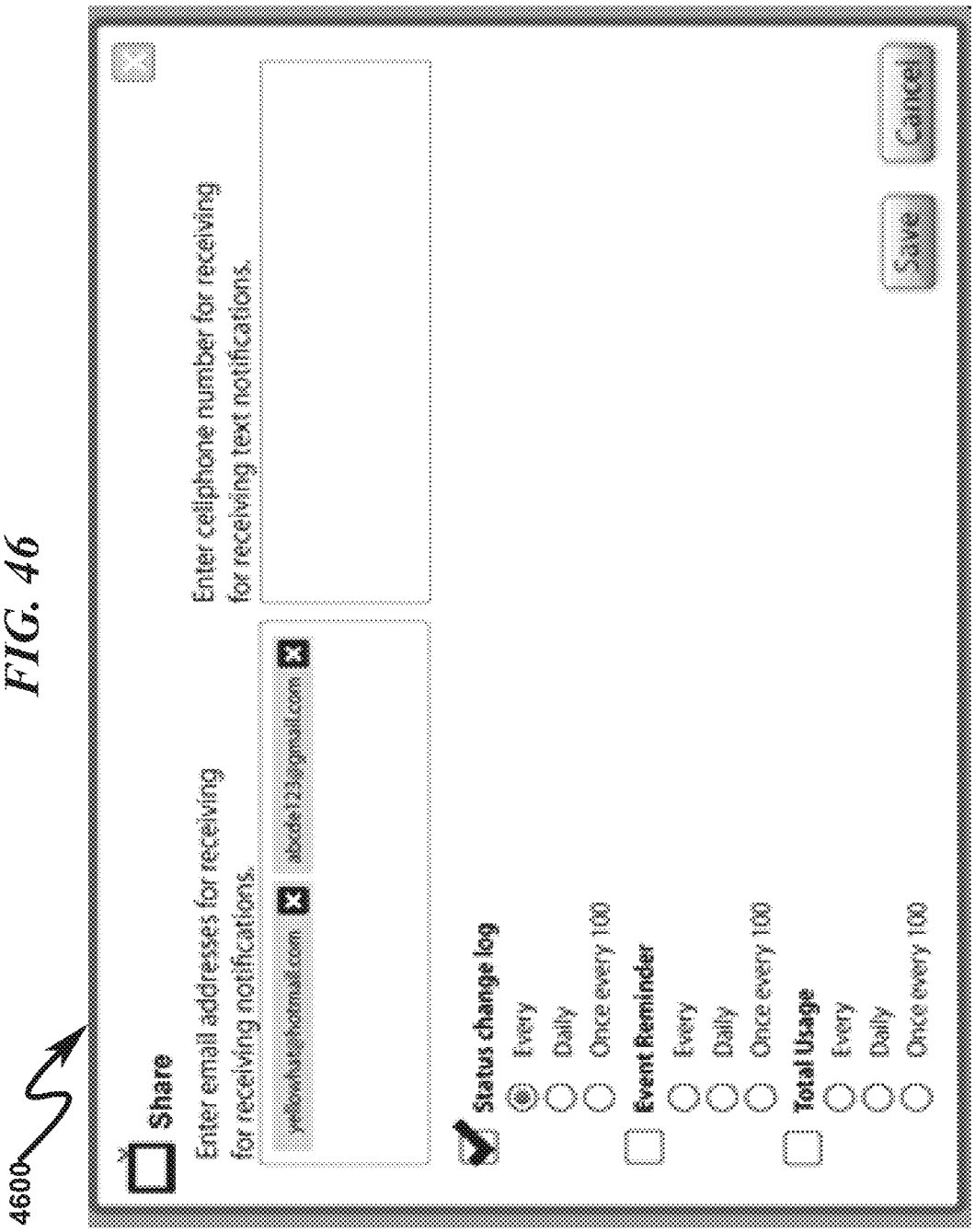
FIG. 46 illustrates exemplary notification configuration dialog useful in some preferred embodiments of the present invention.

FIG. 46 (4600) illustrates an exemplary notification configuration dialog useful used to push notification messages to users regarding switch functions and energy consumption. This dialog Permits access to data sharing features. The user may specify e-mail addresses and phone numbers as well as defining what information they would like to be notified of and at what frequency of notification.

Figure 47:
FIG. 47 illustrates an exemplary energy management status dialog useful in some preferred embodiments of the present invention.

FIG. 47 (4700) illustrates an exemplary energy management status dialog depicting trends in actual daily energy consumption. This dialog box illustrates the pop-up windows for the "Energy Management" button. The total energy consumption of the house is displayed and the user may be able to configure the time-of-day energy cost for the auto mode of control action described elsewhere herein.

One skilled in the art will recognize that these dialog interfaces are merely exemplary of a wide variety of GUI interfaces possible in implementing particular embodiments of the present invention.

Preferred Embodiment System Summary

The present invention preferred exemplary system embodiment anticipates a wide variety of variations in the basic theme of construction, but can be generalized as a power control system comprising:
(a) power source plug;
(b) power load receptacle;
(c) power switch;
(d) power monitor;
(e) computing device; and
(f) wireless communication interface;
wherein
the power switch comprises a primary and secondary contactor, the primary and secondary contactor electrically connected in response to a control input;
the power source plug is electrically connected to the primary contactor of the power switch;
the power load receptacle is electrically connected to the secondary contactor of the power switch;
the power monitor produces a power value output in response to the electrical power flowing through the power load receptacle;
the computing device is electrically connected to the power switch control input;
the computing device is electrically connected to the power monitor power value output; and
the computing device communicates to a computer network via the wireless communication interface and modulates the state of the power switch control input in response to commands received from a user interface communicating with the computer network; and
the computing device communicates with a computer network via the wireless communication interface and transmits the power value output through the computer network in response to commands received from a user interface communicating with the computer network.

This general system summary may be augmented by various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a power control method, the method operating in conjunction with a. SGPC power control system comprising:
(a) power source plug;
(b) power load receptacle;
(c) power switch;
(d) power monitor;
(e) computing device; and
(f) wireless communication interface;
wherein.
the power switch comprises primary and secondary contactor, the primary and secondary contactor electrically connected in response to a control input;
the power source plug is electrically connected to the primary contactor of the power switch;
the power load receptacle is electrically connected to the secondary contactor of the power switch;
the power monitor produces a power value output in response to the electrical power flowing through the power load receptacle;
the computing device is electrically connected to the power switch control input;
the computing device is electrically connected to the power monitor power value output; and
the computing device communicates to a computer network via the wireless communication interface and modulates the state of the power switch control input in response to commands received from a user interface communicating with the computer network; and
the computing device communicates with a computer network via the wireless communication interface and transmits the power value output through the computer network in response to commands received from a user interface communicating with computer network;
wherein the method comprises the steps of
(1) sending a periodic message from the SGPC to a proxy server containing the SGPC ID, password, router IP ADR, port, and subnet vector/path;
(2) storing the SGPC periodic message with a proxy server in an SGPC IL; translation database;
(3) requesting a SGPC ID translation by the proxy server from a user interface;
(4) validating the SGPC ID and password provided by the user interface using the proxy server;
(5) determining if the SGPC ID and password are valid, and if not, proceeding to step (7);
(6) returning the router IP ADR, port, and subnet vector/path for the SGPC to the requesting user interface and proceeding to step (8);
(7) returning an error code and ignoring the SGPC translation request; and
(8) terminating the method.

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment Method Summary

A present invention alternate preferred exemplary method embodiment anticipates a wide variety of variations in the basic theme of implementation, but can be generalized as a power control method, the method operating in conjunction with a SGPC power control system comprising:
(a) power source plug;
(b) power load receptacle;
(c) power switch;
(d) power monitor;
(e) computing device; and
(f) wireless communication interface;
wherein
the power switch comprises a primary and secondary contactor, the primary and secondary contactor electrically connected in response to a control input;
the power source plug is electrically connected to the primary contactor of the power switch;
the power load receptacle is electrically connected to the secondary contactor of the power switch;
the power monitor produces a power value output in response to the electrical power flowing through the power load receptacle;
the computing device is electrically connected to the power switch control input;
the computing device is electrically connected to the power monitor power value output;
the computing device communicates to a computer network via the wireless communication interface and modulates the state of the power switch control input in response to commands received from a user interface communicating with the computer network; and
the computing device communicates with a computer network via the wireless communication interface and transmits the power value output through the computer network in response to commands received from a user interface communicating with computer network;
wherein the method comprises the steps of:
(5) registering a communication device with the SGPC using an e-mail address, phone number, or other device identifier;
(6) notifying the communication device via the SGPC of any change in the SGPC IP address, port number, subnet vector by periodically sending update messages to the communication device;
(7) retrieve the latest. IP address/port for the SGPC from the received SGPC update messages and retain the latest IP address/port for use in communicating with the SGPC; and
(8) terminating the method.
One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
An embodiment wherein the computer network comprises the Internet.
An embodiment wherein the user interface comprises a graphical user interface (GUI) operating on a computing device selected from a group consisting of: a cellphone, smartphone, laptop computer, desktop computer, and tablet computer.
An embodiment wherein the wireless communication interface comprises multiple disparate wireless communication interfaces on separate subnets with each of the disparate wireless communication interfaces supporting different communication subnet protocols.
An embodiment wherein the wireless communication interface comprises multiple disparate wireless communication interfaces with each of the disparate wireless communication interfaces supporting different communication protocols with the system operating as a subnet sub-gateway between the disparate wireless communication interfaces.
An embodiment wherein the wireless communication interface comprises a ZIGBEE® wireless communication interface.
An embodiment wherein the computing device activates the power switch control input in response to a schedule defined by the user interface and received by the computing device via the wireless communication interface.
An embodiment wherein the computing device activates the power switch control input in response to a time-based schedule defined by the user interface and received by the computing device via wireless communication interface.
An embodiment wherein the computing device activates the power switch control input in response to an event-based schedule defined by the user interface and received by the computing device via the wireless communication interface.
An embodiment wherein the computing device transmits to an e-mail address defined by the user interface data responsive to the current status of the power switch control input and/or the current status of the power output value.
One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A power control system/method implementing Internet based access to hybrid home automation networks has been disclosed. The system utilizes a smart gateway power controller (SGPC) to selectively switch an AC power source to a load device under control of local or remote network commands that may be routed through a variety of network interfaces and protocols present within a home or other structure-local communications network. SGPC configurations may be nested within a home automation network to permit separation of control for load devices within a common home automation environment. Present invention methods may include routing protocols between disparate home automation networks as well as remote access protocols that permit control of disparate home automation networks via the Internet using a wide variety of remote access interfaces including mobile devices, tablet computers, laptops, desktop computers, and the like.

What is claimed is:

1. A Smart Gateway Power Control (SGPC) system comprising:
    (a) power source plug;
    (b) power load receptacle;
    (c) power switch;
    (d) power monitor;
    (e) computing device; and
    (f) wireless communication interface;
    wherein
    said power switch comprises a primary and secondary contactor, said primary and secondary contactor electrically connected in response to a control input;
    said power source plug is electrically connected to said primary contactor of said power switch;
    said power load receptacle is electrically connected to said secondary contactor of said power switch;
    said power monitor produces a power value output in response to the electrical power flowing through said power load receptacle;
    said computing device is electrically connected to said power switch control input;
    said computing device is electrically connected to said power monitor power value output;
    said computing device is configured to communicate to a first computer network via said wireless communication interface and modulates the state of said power switch control input in response to commands received from a user interface communicating with a second computer network using a communication device;
    said computing device is configured to communicate with said first computer network via said wireless communication interface and transmits said power value output through said second computer network in response to commands received from said user interface communicating with said second computer network using said communication device;
    said computing device is configured to send a periodic message from said SGPC to a proxy server containing the ID, password, router IP ADR, port, and subnet vector or path of said SGPC;
    said computing device is configured to store said SGPC periodic message with a proxy server in an SGPC ID translation database;
    said communication device is configured to request a SGPC ID translation by said proxy server from said user interface;
    said communication device is configured to validate said SGPC ID and password provided by said user interface using said proxy server;
    said communication device is configured to determine if said SGPC ID and password are valid, and if so, return the router IP ADR, port, and subnet vector or path for said SGPC to said user interface; and
    said communication device is configured to determine if said SGPC ID and password are valid, and if not, return an error code to said user interface.

2. The power control system of claim 1 wherein said second computer network comprises the Internet.

3. The power control system of claim 1 wherein said user interface comprises a graphical user interface (GUI) operating on a computing device selected from a group consisting of: a cellphone, smartphone, laptop computer, desktop computer, and tablet computer.

4. The power control system of claim 1 wherein said wireless communication interface comprises multiple disparate wireless communication interfaces on separate subnets with each of said disparate wireless communication interfaces supporting different communication subnet protocols.

5. The power control system of claim 1 wherein said wireless communication interface comprises multiple disparate wireless communication interfaces with each of said disparate wireless communication interfaces supporting different communication protocols with said system operating as a subnet sub-gateway between said disparate wireless communication interfaces.

6. The power control system of claim 1 wherein said wireless communication interface comprises a ZIGBEE® wireless communication interface.

7. The power control system of claim 1 wherein said computing device activates said power switch control input in response to a schedule defined by said user interface and received by said computing device via said wireless communication interface.

8. The power control system of claim 1 wherein said computing device activates said power switch control input in response to a time-based schedule defined by said user interface and received by said computing device via said wireless communication interface.

9. The power control system of claim 1 wherein said computing device activates said power switch control input in response to an event-based schedule defined by said user interface and received by said computing device via said wireless communication interface.

10. The power control system of claim 1 wherein said computing device transmits to an e-mail address defined by said user interface data responsive to the current status of said power switch control input or the current status of said power output value.

11. A tangible non-transitory computer usable medium having computer-readable program code means comprising a power control method wherein said method controls a Smart Gateway Power Control (SGPC) system comprising:
    (a) power source plug;
    (b) power load receptacle;
    (c) power switch;
    (d) power monitor;
    (e) computing device; and
    (f) wireless communication interface;
    wherein
    said power switch comprises a primary and secondary contactor, said primary and secondary contactor electrically connected in response to a control input;
    said power source plug is electrically connected to said primary contactor of said power switch;
    said power load receptacle is electrically connected to said secondary contactor of said power switch;
    said power monitor produces a power value output in response to the electrical power flowing through said power load receptacle;

said computing device is electrically connected to said power switch control input;

said computing device is electrically connected to said power monitor power value output;

said computing device communicates to a first computer network via said wireless communication interface and modulates the state of said power switch control input in response to commands received from a user interface communicating with a second computer network; and said computing device communicates with said first computer network via said wireless communication interface and transmits said power value output through said second computer network in response to commands received from said user interface communicating with said second computer network;

wherein said method comprises the steps of:

(1) sending a periodic message from said SGPC to a proxy server containing the ID, password, router IP ADR, port, and subnet vector or path of said SGPC;

(2) storing said SGPC periodic message with a proxy server in an SGPC ID translation database;

(3) requesting a SGPC ID translation by said proxy server from said user interface;

(4) validating the SGPC ID and password provided by said user interface using said proxy server;

(5) determining if said SGPC ID and password are valid, and if not, proceeding to step (7);

(6) returning the router IP ADR, port, and subnet vector or path for said SGPC to said user interface and proceeding to step (8);

(7) returning an error code and ignoring said SGPC translation request; and (8) terminating said method.

12. The computer usable medium of claim 11 wherein said second computer network comprises the Internet.

13. The computer usable medium of claim 11 wherein said user interface comprises a graphical user interface (GUI) operating on a computing device selected from a group consisting of: a cellphone, smartphone, laptop computer, desktop computer, and tablet computer.

14. The computer usable medium of claim 11 wherein said wireless communication interface comprises multiple disparate wireless communication interfaces on separate subnets with each of said disparate wireless communication interfaces supporting different communication subnet protocols.

15. The computer usable medium of claim 11 wherein said wireless communication interface comprises multiple disparate wireless communication interfaces with each of said disparate wireless communication interfaces supporting different communication protocols with said system operating as a subnet sub-gateway between said disparate wireless communication interfaces.

16. The computer usable medium of claim 11 wherein said wireless communication interface comprises a ZIGBEE® wireless communication interface.

17. The computer usable medium of claim 11 wherein said computing device activates said power switch control input in response to a schedule defined by said user interface and received by said computing device via said wireless communication interface.

18. The computer usable medium of claim 11 wherein said computing device activates said power switch control input in response to a time-based schedule defined by said user interface and received by said computing device via said wireless communication interface.

19. The computer usable medium of claim 11 wherein said computing device activates said power switch control input in response to an event-based schedule defined by said user interface and received by said computing device via said wireless communication interface.

20. The computer usable medium of claim 11 wherein said computing device transmits to an e-mail address defined by said user interface data responsive to the current status of said power switch control input or the current status of said power output value.

21. A tangible non-transitory computer usable medium having computer-readable program code means comprising a power control method wherein said method controls a Smart Gateway Power Control (SGPC) system comprising:

(a) power source plug;
(b) power load receptacle;
(c) power switch;
(d) power monitor;
(e) computing device; and
(f) wireless communication interface;

wherein said power switch comprises a primary and secondary contactor, said primary and secondary contactor electrically connected in response to a control input;

said power source plug is electrically connected to said primary contactor of said power switch;

said power load receptacle is electrically connected to said secondary contactor of said power switch;

said power monitor produces a power value output in response to the electrical power flowing through said power load receptacle;

said computing device is electrically connected to said power switch control input;

said computing device is electrically connected to said power monitor power value output;

said computing device communicates to a first computer network via said wireless communication interface and modulates the state of said power switch control input in response to commands received from a user interface communicating with said a second computer network; and said computing device communicates with said first computer network via said wireless communication interface and transmits said power value output through said second computer network in response to commands received from said user interface communicating with said second computer network;

wherein said method comprises the steps of:

(1) registering a communication device with said SGPC using an e-mail address, phone number, or other device identifier;

(2) notifying said communication device via said SGPC of any change in the SGPC IP address, port number, subnet vector by periodically sending update messages to said communication device;

(3) retrieve the latest IP address or port for said SGPC from said received SGPC update messages and retain said latest IP address or port for use in communicating with said SGPC; and (4) terminating said method.

22. The computer usable medium of claim 21 wherein said second computer network comprises the Internet.

23. The computer usable medium of claim 21 wherein said user interface comprises a graphical user interface (GUI) operating on a computing device selected from a group consisting of: a cellphone, smartphone, laptop computer, desktop computer, and tablet computer.

24. The computer usable medium of claim 21 wherein said wireless communication interface comprises multiple disparate wireless communication interfaces on separate subnets with each of said disparate wireless communication interfaces supporting different communication subnet protocols.

25. The computer usable medium of claim 21 wherein said wireless communication interface comprises multiple disparate wireless communication interfaces with each of said disparate wireless communication interfaces supporting different communication protocols with said system operating as a subnet sub-gateway between said disparate wireless communication interfaces.

26. The computer usable medium of claim 21 wherein said wireless communication interface comprises a ZIGBEE® wireless communication interface.

27. The computer usable medium of claim 21 wherein said computing device activates said power switch control input in response to a schedule defined by said user interface and received by said computing device via said wireless communication interface.

28. The computer usable medium of claim 21 wherein said computing device activates said power switch control input in response to a time-based schedule defined by said user interface and received by said computing device via said wireless communication interface.

29. The computer usable medium of claim 21 wherein said computing device activates said power switch control input in response to an event-based schedule defined by said user interface and received by said computing device via said wireless communication interface.

30. The computer usable medium of claim 21 wherein said computing device transmits to an e-mail address defined by said user interface data responsive to the current status of said power switch control input or the current status of said power output value.

* * * * *